United States Patent
Bladd-Symms et al.

(10) Patent No.: US 11,931,645 B2
(45) Date of Patent: *Mar. 19, 2024

(54) CASE OR COVER FOR HOBBY EQUIPMENT

(71) Applicant: Paua Trading Limited, Chichester (GB)

(72) Inventors: Peter Bladd-Symms, Chichester (GB); Michael Titley, Chichester (GB)

(73) Assignee: PAUA TRADING LIMITED, Chichester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,584

(22) Filed: Jan. 10, 2023

(65) Prior Publication Data
US 2023/0142428 A1    May 11, 2023

Related U.S. Application Data

(63) Continuation of application No. 17/125,964, filed on Dec. 17, 2020, now Pat. No. 11,576,473, which is a
(Continued)

(30) Foreign Application Priority Data

Oct. 21, 2015 (GB) ........................... 1518661
Sep. 16, 2016 (GB) ........................... 1615819
(Continued)

(51) Int. Cl.
*B65D 81/02* (2006.01)
*A45C 11/00* (2006.01)
(Continued)

(52) U.S. Cl.
CPC ............ *A63C 17/002* (2013.01); *A45C 11/00* (2013.01); *A45C 11/24* (2013.01); *A63C 11/027* (2013.01);
(Continued)

(58) Field of Classification Search
CPC ..... A63C 17/002; A63C 11/027; A45C 11/00; A45C 11/24; A45C 11/027; A45C 11/08;
(Continued)

(56) References Cited

U.S. PATENT DOCUMENTS 4,210,230 A     7/1980  Weiner
4,719,952 A *   1/1988  Geronimo ............... B63B 32/70
                                                    441/74
(Continued)

FOREIGN PATENT DOCUMENTS

CN    1051496    5/1991
CN    2105890    6/1992
(Continued)

OTHER PUBLICATIONS

Cabrera et al., Filament Winding of Co-Extruded Polypropylene Tapes for Fully Recyclable All-Polypropylene Bomposite Products, Appl Comps Matter (Apr. 4, 2008).
(Continued)

*Primary Examiner* — Jacob K Ackun

(57) ABSTRACT

The invention relates to a cover or case for goods, in particular for use as a cover or case for hobby or sports equipment. In an embodiment, the case has an inner portion, formed of expanded polypropylene (ePP) and defining a cavity for receiving at least part of the item. The case also includes an outer layer, formed of self-reinforcing polypropylene (srPP), arranged to cover an outer surface of at least part of the inner portion. In further embodiments, the cover is formed of two or more sections that may be arranged to at least partially overlap, wherein adjusting the overlap of the at least two sections changes the dimensions of an inner cavity within the cover or case. The case may be telescoping, in order to provide adjustable dimensions for a cavity within the case.

20 Claims, 33 Drawing Sheets

Related U.S. Application Data continuation of application No. 15/769,986, filed as application No. PCT/GB2016/053303 on Oct. 21, 2016, now Pat. No. 10,882,590.

(30) Foreign Application Priority Data

| Sep. 16, 2016 | (GB) | ..................................... | 1615821 |
| Oct. 5, 2016 | (GB) | ..................................... | 1616944 |
| Oct. 17, 2016 | (GB) | ..................................... | 1617576 |

(51) Int. Cl.

| A45C 11/24 | (2006.01) |
| A63C 11/02 | (2006.01) |
| A63C 17/00 | (2006.01) |
| B32B 5/18 | (2006.01) |
| B32B 27/08 | (2006.01) |
| B32B 27/32 | (2006.01) |
| B63B 32/80 | (2020.01) |
| A45C 11/08 | (2006.01) |
| A45C 11/38 | (2006.01) |
| B63B 32/87 | (2020.01) |

(52) U.S. Cl.
CPC ............... *B32B 5/18* (2013.01); *B32B 27/08* (2013.01); *B32B 27/32* (2013.01); *B63B 32/80* (2020.02); *B65D 81/02* (2013.01); *B65D 81/022* (2013.01); *A45C 2011/003* (2013.01); *A45C 11/08* (2013.01); *A45C 11/38* (2013.01); *B32B 2266/025* (2013.01); *B32B 2439/40* (2013.01); *B32B 2553/02* (2013.01); *B63B 32/87* (2020.02)

(58) Field of Classification Search
CPC ... A45C 11/38; A45C 2011/003; B65D 81/02; B65D 81/022; B32B 2439/40; B32B 2553/02

See application file for complete search history.

(56) References Cited

U.S. PATENT DOCUMENTS

| 4,781,278 | A | 11/1988 | Sadow |
| 4,929,094 | A | 5/1990 | Becker |
| 5,344,056 | A | 9/1994 | Challoner |
| 5,394,913 | A | 3/1995 | Zezza, Jr. |
| 5,620,069 | A | 4/1997 | Hurwitz |
| 6,210,037 | B1 | 4/2001 | Brandon, Jr. |
| 6,244,399 | B1 | 6/2001 | Birkestrand |
| 8,912,105 | B2 | 12/2014 | Böttger et al. |
| 9,155,359 | B1 | 10/2015 | Bailey |
| 9,846,323 | B2 | 12/2017 | Kim |
| 10,882,590 | B2 * | 1/2021 | Bladd-Symms ........ A45C 11/00 |
| 11,330,877 | B2 | 5/2022 | Bladd-Symms |
| 11,576,473 | B2 * | 2/2023 | Bladd-Symms ..... A63C 17/002 |
| 2002/0104725 | A1 | 8/2002 | Dexheimer |
| 2003/0102361 | A1 | 6/2003 | Terashima |
| 2003/0201198 | A1 | 10/2003 | Gantert |
| 2005/0218171 | A1 | 10/2005 | Bellerive |
| 2005/0279797 | A1 | 12/2005 | Martin |
| 2007/0296117 | A1 | 12/2007 | Taeye |
| 2009/0032153 | A1 | 2/2009 | Burnett |
| 2009/0165193 | A1 | 7/2009 | Michel |
| 2009/0183301 | A1 | 7/2009 | Brown |
| 2012/0196104 | A1 | 8/2012 | Yeh |
| 2013/0087424 | A1 | 4/2013 | Pratt |
| 2013/0134058 | A1 | 5/2013 | Boyles |
| 2013/0140120 | A1 | 6/2013 | Rasmussen |
| 2014/0065335 | A1 * | 3/2014 | Chen ........................ A45C 5/02 428/36.5 |
| 2014/0202814 | A1 | 7/2014 | Collins |
| 2014/0339109 | A1 | 11/2014 | Van Emden |
| 2015/0010525 | A1 | 1/2015 | Wells |
| 2015/0122677 | A1 | 5/2015 | Norrie |
| 2015/0175310 | A1 | 6/2015 | Lassoff |
| 2015/0197320 | A1 * | 7/2015 | Ventura ................ A45C 7/0022 220/7 |
| 2015/0230571 | A1 | 8/2015 | Godshaw |
| 2016/0083055 | A1 | 3/2016 | Coleman |
| 2016/0113366 | A1 | 4/2016 | Sijmons |
| 2017/0042302 | A1 | 2/2017 | Farrelly |
| 2017/0318626 | A1 | 11/2017 | Kazemi |
| 2020/0187610 | A1 | 6/2020 | Bladd-Symms |
| 2021/0114696 | A1 | 4/2021 | Bladd-Symms |
| 2021/0274902 | A1 | 9/2021 | Bladd-Symms |
| 2021/0274903 | A1 | 9/2021 | Bladd-Symms |
| 2022/0079312 | A1 | 3/2022 | Bladd-Symms |

FOREIGN PATENT DOCUMENTS

| CN | 1071064 | 4/1993 |
| CN | 101486404 A | 7/2009 |
| CN | 103112224 | 5/2013 |
| CN | 203246156 | 10/2013 |
| CN | 104323554 | 2/2015 |
| CN | 204994805 | 1/2016 |
| CN | 105566744 | 5/2016 |
| EP | 0199993 | 11/1986 |
| EP | 1852938 | 11/2007 |
| FR | 2867986 | 9/2005 |
| FR | 2886273 | 12/2006 |
| FR | 2903579 | 1/2008 |
| GB | 2018580 | 10/1979 |
| GB | 2236174 | 3/1991 |
| JP | H03120468 | 5/1991 |
| JP | 2002199921 | 7/2002 |
| JP | 2008502503 | 1/2008 |
| NL | 1029570 | 1/2007 |
| WO | 2005123369 | 12/2005 |
| WO | 2011029223 | 3/2011 |
| WO | 2013150472 | 10/2013 |
| WO | 2015108775 | 7/2015 |
| WO | 2015110667 | 7/2015 |
| WO | 2016044184 | 3/2016 |
| WO | 2016112987 | 7/2016 |
| WO | 2017068369 | 4/2017 |

OTHER PUBLICATIONS

CN Office Action in Patent Application 201680074042.7 (dated Sep. 17, 2020) (16 pages).

EPO Search Report for U.S. Appl. No. 16/787,544 (dated Feb. 24, 2021) (4 pages).

Extended European search report for Application 22194107.3 (dated Jan. 3, 2023) (9 pages).

SR & Written Opinion for PCT/GB2018/051132 (dated Sep. 21, 2018).

JP Office Action in Patent Application 2018-540228 (dated Oct. 6, 2020) (11 pages).

Kmetty et al., "Self-reinforced polymeric materials: A review", Progress in Polymer Science (2010).

Morgan et al., "Self reinforced polymer composites: coming of age", ICCM17, Jul. 27, 2009.

Notice of Allowance dated Nov. 30, 2021 for U.S. Appl. No. 17/330,392 (pp. 1-9).

Office Action (Notice of Allowance and Fees Due (PTOL-85)) dated Jan. 26, 2022 for U.S. Appl. No. 17/330,397 (pp. 1-9).

Office Action (Notice of Allowance and Fees Due (PTOL-85)) dated Apr. 19, 2022 for U.S. Appl. No. 17/330,397 (pp. 1-3).

Office Action (Notice of Allowance and Fees Due (PTOL-85)) dated May 9, 2022 for U.S. Appl. No. 17/330,392 (pp. 1-6).

Office Action (Notice of Allowance and Fees Due (PTOL-85)) dated Oct. 13, 2022 for U.S. Appl. No. 17/125,964 (pp. 1-5).

Office Action (Notice of Allowance and Fees Due (PTOL-85)) dated Dec. 9, 2022 for U.S. Appl. No. 16/608,347 (pp. 1-10).

Office Action (Notice of Allowance and Fees Due (PTOL-85)) dated Dec. 15, 2021 for U.S. Appl. No. 17/330,392 (pp. 1-2).

(56) References Cited

OTHER PUBLICATIONS

Office Action dated Oct. 5, 2021 for U.S. Appl. No. 17/330,397 (pp. 1-12).
Office Action forCN201880042766.2 dated Sep. 8, 2021.
Soldier Systems Blog Entry, Sneak Peek—Dyneema Tegris Kit System "Ripper" by Honorpoint USA, posted Dec. 6, 2017, https://soldiersystems.net/2017/12/06/sneak-peek-dyneema-tegris-kit-system-ripper-by-honopoint-USA/ (accessed Mar. 3, 2022) (7 pages).
UKIPO Search Report for Application No. GB1706749.7 (dated Oct. 26, 2017).
UKIPO Search Report for Application No. GB1709087.6 (dated Oct. 18, 2017).

* cited by examiner

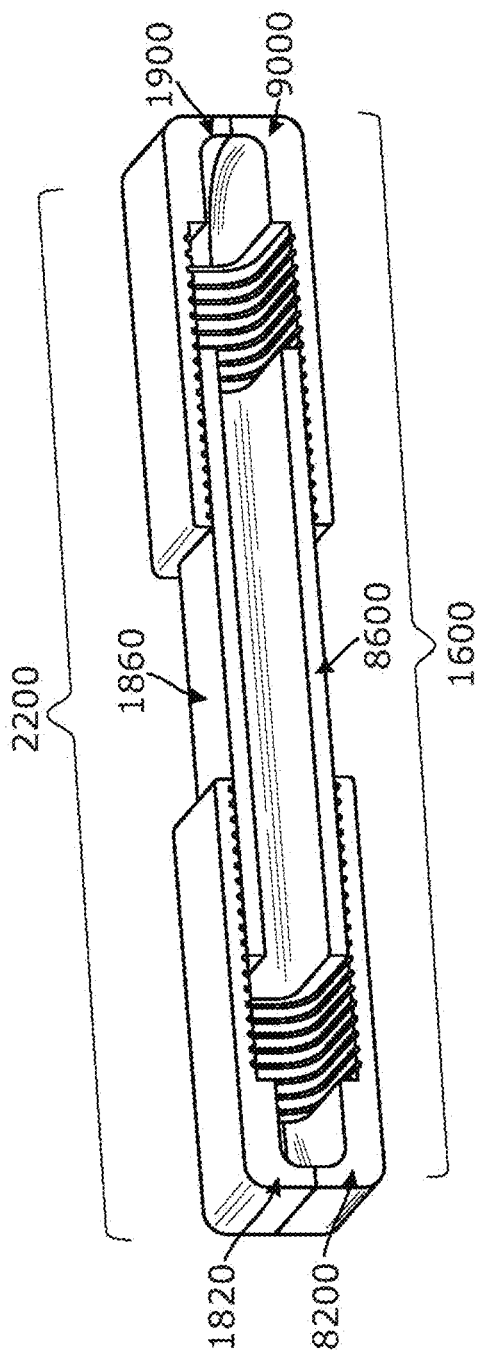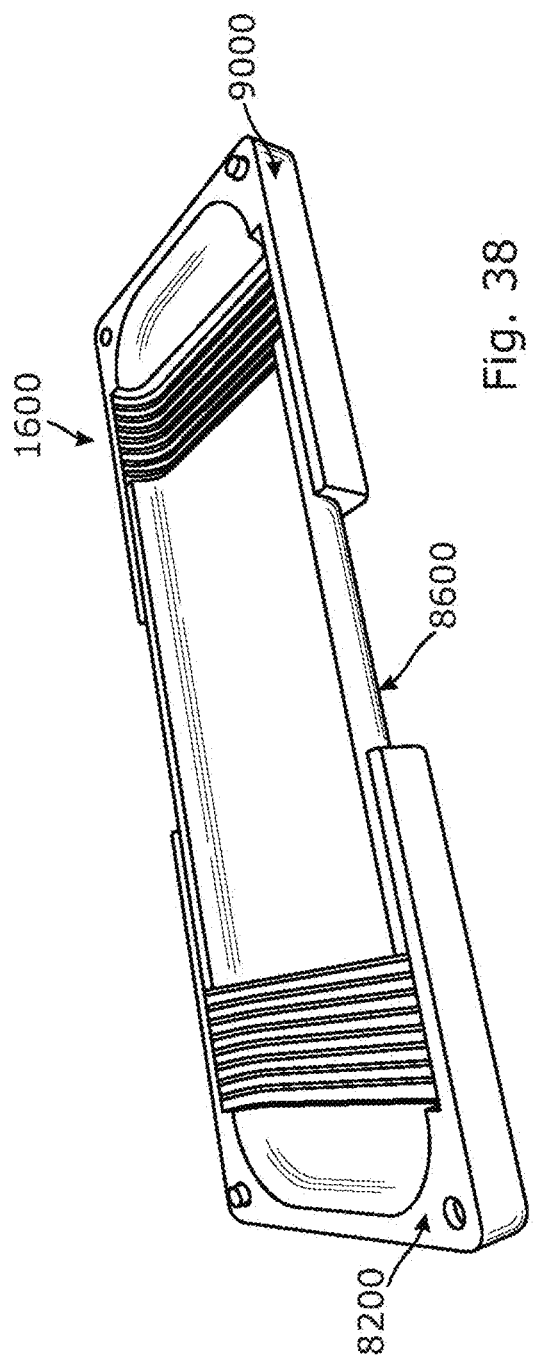

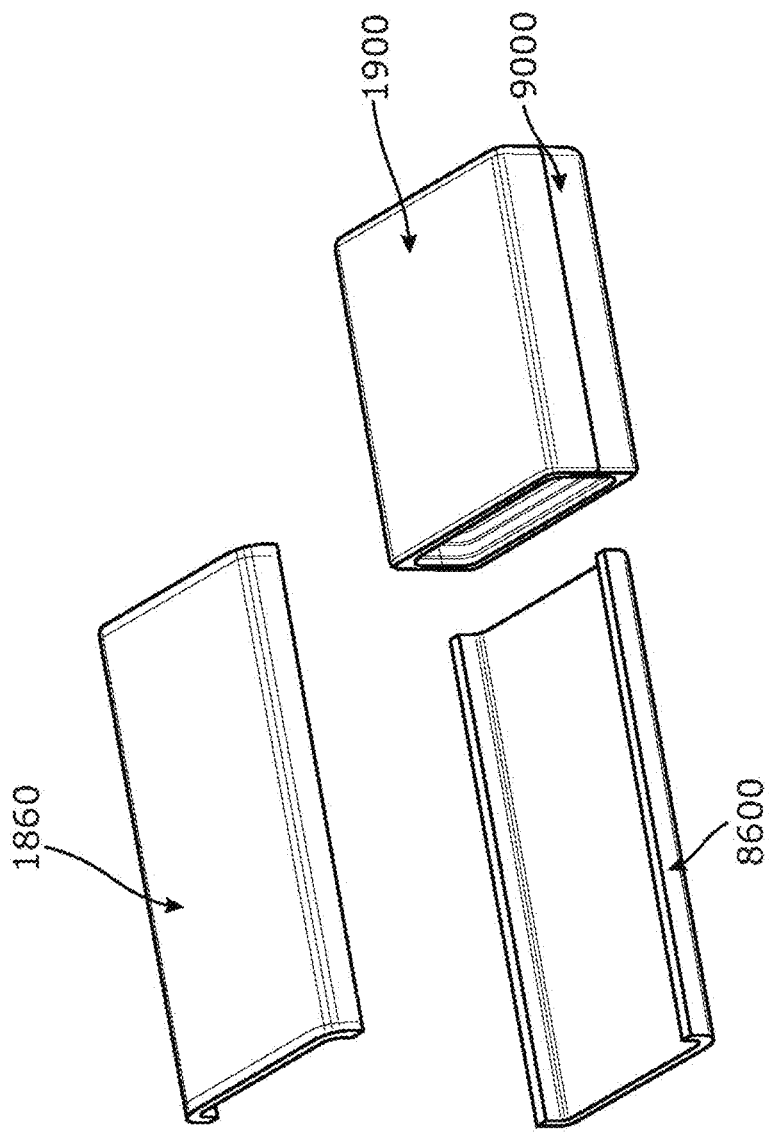
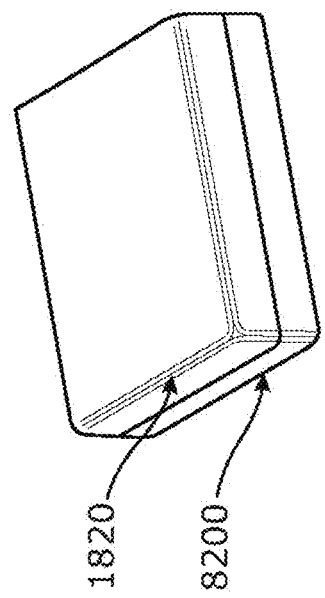
Fig. 39

CASE OR COVER FOR HOBBY EQUIPMENT

FIELD OF THE INVENTION

The invention relates to a cover or case for goods, in particular for use as a cover or case for hobby or sports equipment. The cover or case may be for transportation or storage of goods. In some examples, the cover or case may be especially suitable for use as a cover or case for specialised sports equipment such as a board used in sports such as a surfboard, windsurfing board, paddleboard, skis, a snowboard, and bicycles such as road cycling bicycles and mountain bicycles. However, some examples of the case may be suitable for containing other hobby equipment, such as types of sports equipment, musical equipment, or photography equipment.

In some examples, the cover can be adjusted in order to conform to the dimensions of the sports equipment or board. Therefore, the cover is particularly useful to accommodate different sizes and shapes of sports equipment or board. The case may be telescoping, in order to provide adjustable dimensions for a cavity within the case.

BACKGROUND TO THE INVENTION

Many sports require use of specialised equipment. In particular, sports such as road cycling, mountain biking, surfing, kiteboarding, paddleboarding, windsurfing, skiing or snowboarding require use of specialised and fragile equipment in order to participate in the sport. Often, such equipment is carried or transported to a new location for participation in the sport. Such transportation poses a risk of damage to the equipment, which can often be bulky or unwieldy due to their size and shape.

An additional consideration when transporting such a sports equipment (such as a board) is that of weight. Some methods of transporting the equipment (for example, via an air carrier) impose restrictions or additional costs on the user based on the weight or size of the transported items. As such, it is desirable that any cover designed to protect the equipment (such as a board) during transportation weighs as little as possible and does not add unnecessary bulk.

Commonly, sports boards may be transported enclosed in a board bag or cover. The cover may be a purpose built, soft fabric bag or be a hard case with a rigid outer shell. The fabric bags may comprise a fabric cover with one or more foam inner liners arranged to surround the board. Once the board has been placed inside the bag, the bag may be sealed using a Velcro or zip fastener running around the edge of the opening into the bag or a drawstring at one end of the bag, the other end being stitched shut.

As an alternative, hard cases may be used. The hard case may be made with an outer shell of moulded plastic and also include an inner layer comprising soft padding. The hard cases are commonly opened with a lid at the nose or tail end, or by forming the case in two halves in the manner of a suitcase (in other words, hinged along one edge of the board bag or cover). The two halves may be joined by a closure (such as a latch or zip). The board may then be enclosed within the hard shelled case between the soft padded layers.

Soft bags or cases may be beneficial in that they are less unwieldy to carry than a hard case. Nevertheless, a hard case may provide a more robust shielding for the board compared to a soft case, although it is heavier and can be more bulky and cumbersome to carry. Furthermore, hard cases are often substantially more expensive than soft cases.

To ensure the best protection for the board, it is preferable to have a tight, snug fit of the inner surfaces of the case or bag against the board itself. Accordingly, bags or cases must be large enough to accommodate the board, but not so large that the board can move or slide around within the bag (which could result in damage). Ideally, the inner padding of the bag will readily conform to the shape of the board, in order to cushion or hold the board in place.

In view of this, the types of covers for boards that are currently available are produced in different sizes (lengths and widths) or are designed for different shapes or types of board. As such, it is usually necessary for an individual to buy a specific cover of particular dimensions for each board owned, significantly increasing the costs of owning multiple boards. Furthermore, boards can vary widely in shape and size, and board covers not specifically designed to carry a particular board do not necessarily fit well. For example, it can be particularly difficult to obtain a well-fitting bag for custom made boards which have non-standard dimensions. One solution to this problem is to increase the amount of internal padding within the bag in order to fill any gaps between the board and the case. However, this approach will significantly increase the overall weight of the bag or board cover.

To accommodate standard sizes of sports board, a sports board cover or bag (the 3DxFit Dayrunner by FCS) has been provided having an elasticated section in the lengthways direction of the board. This maintains a tight fit for the cover around a particular size of board, but does not allow for substantial adjustment of the size of the cover. Alternatively, a board bag has been produced (the Adjustable Dayrunner by FCS) which allows the length of the bag to be adjusted by modifying the coupling between two halves of a bag using Velcro straps. However, the Velcro straps are placed at intervals, and so only offer a specific selection of lengths for the board bag. The cover also cannot by adapted to accommodate different widths of sports board.

As such, there is a need for an adjustable board bag that is both lightweight and well-fitting and therefore capable of providing superior protection for any board it contains.

Many sports, hobbies and consumer or industrial items require the use of specialised and fragile equipment. The proper storage, carriage and delivery without damage of these items is of paramount importance to the owner or the transporting parties (e.g. retailers or carrier companies). Some such items are particularly susceptible to shock impact damage or temperature variation damage whilst in transit. Furthermore, weight restrictions (or costs imposed as a consequence of the weight of the item to be transported) mean that it is often of interest to reduce the weight of the packaged item. This can be achieved by minimising the weight of any packaging.

Commonly items are transported either in bags that lack rigidity or in rigid packing cases or boxes. For instance, soft shell or non-rigid bags can be made from various materials—commonly polyester, PVC, cotton, cardboard or nylon materials. Alternatively, hard or rigid cases or boxes may be manufactured from plastics materials such as acrylonitrile butadiene styrene, ABS. The inside of either the soft or rigid versions of a carry case are often padded with commonly available types of foams such as ethylene-vinyl acetate (EVA) or expanded polyethylene (EPE). Thus the fragile item is carried in some form of padded bag or box. Nevertheless, these commonly used materials may only offer relatively limited protection and may also degrade after a low number of impacts.

A hard or rigid case may provide better protection for the item than a soft case. Nevertheless, the hard case may result in an increased cost of manufacture. Hard boxes may also have considerably more weight—this in turn brings more ongoing cost with air and road haulage which are often charged by weight. For these reasons, although the protection may be less, soft bags or cases may be preferred by a user as they are generally less unwieldy and weigh less than a hard case.

Therefore, there is a need for a case or cover for containing an item that is lightweight for transportation, but that is robust to protect an item from damage.

Transportation of consumer goods, both locally and internationally, is commonplace. Secure and robust packaging during transportation is of primary importance in order to prevent damage to the freighted goods, and also to allow transportation of bulk quantities. Not only must the packaging be robust however, it must also be space efficient. As the costs of transportation increase with the volume of the freighted goods, it is beneficial for any packaging box or case to take up the minimum volume for any given packaged article. Furthermore, providing a 'snug' fit to a packaged product holds the product in place and so further protects against damage.

Despite the advantages for providing a well-fitting case or box to carry goods, articles to be stored or transported make take any size or shape. As such, it can be a challenge to provide a well-fitting case for transportation or storage of a given article. In some circumstances, a packaging box may be specifically designed to fit a particular item ergonomically, and with effective use of space. However, this may only be economic where large quantities of a product are transported or stored. In situations where different, specialised products are transported or carried, the ideal dimensions for a packaging case or box may differ for each individual item. Therefore, a supplier wishing to transport and package a range of goods may need to obtain a number of different cases or boxes of different size or shapes.

In other circumstances, a user may make use of a box or packaging case that does not provide a tight fit to an item. In this case, the user will then 'bespoke' package the item in order to better fit the packaging case. For example, the extra space within the packaging case may be filled with foam chips or resilient packaging, bubble wrap or other types of air pocket. Alternatively, a cardboard retainer may be use to hold the item in place within the packaging case. In some cases, the item itself may be wrapped in various layers until the item is securely fitted within the packaging case. This type of bespoke packaging for each individual item can substantially increase the time required for packaging each item on the part of the sender. Furthermore, this type of bespoke packaging often leads to extra waste, as the additional packaging is often immediately disposed of by the end receiver of the goods.

Accordingly, there is a need for a case, box or enclosure that can be used to transport or store an item, which provides robust protection whilst also being convenient and space efficient. In particular, there is a need for a case that is adaptable, so that the dimensions of the case can be adjusted to fit the item to be placed therein.

SUMMARY OF THE INVENTION

The invention relates to a cover for sports equipment, in particular a cover for a sports board such as a surfboard, a kiteboard, a paddleboard, a windsurfing board or a snowboard. The cover comprises at least two sections or portions. The sections are concave shell portions which each conform to the shape of the board in order to closely hold and encase at least a section of the board.

In one embodiment, the board is enclosed between two concave shell portions. Each shell portion covers or receives around half to two thirds of the volume of the board. In one embodiment, each shell portion extends along the full length of the board and across approximately half the width of the board. The shell portions wrap around the sides of the board to extend across each substantially planar surface of the board. The first shell portion is arranged to fit around at least a first half of the board, and the second shell portion is arranged to fit around at least a second half of the board. The two shell portions can then be fitted together around the board to enclose the board in the shell. The two shell portions are fitted together such that the second shell portion is received within the first shell portion, with at least a portion of each of the shell portions overlapping along the centre of the board where the two shell portions meet. The two shell portions may be secured together, for example by using a fastener or buckle, and/or by providing a pivot connection between the first and second shell portion at one end.

In another embodiment, the cover is comprised of four concave shell portions, with each shell portion covering or enclosing slightly more than a quarter of the board. The four shell portions can then be arranged in two pairs such that each pair encloses around half the board. A first pair of the shell portions (a first and second shell portion) encloses a first half of the board by arranging the first shell portion to surround approximately a quarter of the board, and the second shell portion to surround around approximately an adjacent quarter of the board. The first and second shell portions are then connected together, with the edges of the second shell portion partially received by the first shell portion such that the edges overlap. The connected first and second shell portions define a cavity which receives around half the board when the cover is in use. The second pair of shell portions (the third and the fourth shell portion) may then be arranged around the remaining half of the board such that the edges of the fourth shell portion overlaps with the edges of the third shell portion. The third and fourth shell portions also define a cavity which receives around half the board when the cover is in use. The two pairs of shell portions may be pushed together to surround or enclose the board, and provide a cover giving robust protection. The edges of the first pair of shell portions will overlap with the edges of the second pair of shell portions, in order to enclose the cavity or volume within. The arrangement of the shell portions can be adjusted by changing the amount by which the different sections overlap. Advantageously, this will increase or decrease the size of the cavity defined within the cover and allow the cover to be fitted to boards of different dimensions.

To allow for easier arrangement of the four shell portions around the board, the first pair of shell portions (the first and second shell portion) may be connected via a pivot at one end. The second pair of shell portions (the third and fourth shell portion) may also be connected via a pivot at one end. In other words, the two pairs of shell portions each act as a "clamshell" enclosure around approximately half the board each. The two pairs of shell portions may then close around the board in a "scissor" action, such that the two pairs cooperate to encapsulate the board in between. Once the cover is closed around the board, the first pivot is adjacent to the nose of the board and the second pivot is adjacent to the tail of the board. The four shell portions can then be secured relative to each other using fasteners (such as buckles or straps), in order that the cover is firmly held to encapsulate the board and prevent the board from moving within the cover. As such, the board is afforded improved protection by the cover or case.

In a first aspect, there is provided a cover for sports equipment such as a sports board, comprising a first and a second shell portion each having an inner surface, the first and second shell portion arranged with the inner surfaces facing each other, and the second shell portion formed to be at least partially received within the first shell portion so as to form a first part of an enclosure having an open end. There is further provided a third and a fourth shell portion each having an inner surface, the third and fourth shell portion arranged with the inner surfaces facing each other, and the fourth shell portion formed to be at least partially received within the third shell portion so as to form a second part of an enclosure having an open end. The open end of the second part of the enclosure is configured to be at least partially received into the open end of the first part of the enclosure to define a cavity for receiving the sports equipment.

Ideally, the shell portions are configured such that their inner surfaces conform to the shape of the sports equipment or board. The shell portion has a curved inner surface which forms a hollow or cavity to receive a portion of the board. The depth of the cavity is ideally approximately the depth of the board, such that the shell portion wraps around the sides of the board and covers an area of both substantially planar surfaces of the board. Preferably, the shell portions are not identical in size and shape as they are configured to allow for connection with each other as described below.

In some embodiments, each shell portion or shell portion encloses slightly more than one quarter the volume of the board. For example, each shell portion has a length slightly more than half the length of the board and a width slightly more than half the width of the board. However, the shell portions will not necessarily enclose a quarter of the board, and may include more or less of the board.

The first and second shell portions are arranged such that the inner surfaces face each other. In other words, the first and second shell portions are arranged such that the cavities formed by the shell shape of the first and second shell portions are arranged adjacent and opposite each other. When the first and second shell portions are joined, a single cavity is formed which is configured to receive around half the volume of the board when the cover is in use. The third and fourth shell portions are arranged in a similar fashion with respect to each other.

The first and second shell portions are joined by the insertion of the second shell portion at least partially into the cavity of the first shell portion. In other words, some of the open edge regions of the first and second shell portions at least partially overlap. In a particular example, the first and second shell portions join together to form a cover around approximately half the volume of the board. In a similar way, the third and fourth shell portions join to define a cavity to receive at least a portion of the board. The fourth shell portion is partially received into the cavity of the third shell portion in order that the open edges overlap. Together, the third and fourth shell portions define a cavity which receives approximately half the volume of the board. In other embodiments, more or less than half the board may be enclosed by the first and second or by the third and fourth shell portions (for example, the first and second portions may cover two-thirds of the board, and the third and fourth portions may cover the remaining third of the board so as to encase the board).

The two pairs of shell portions (the first and second, and the third and fourth shell portions) can be joined by inserting the open edges of the third and fourth shell portions into the cavity of the first and second shell portions. When the two pairs are pushed together, they enclose the board to form a cover.

The two pairs of shell portions (which form a first and second enclosure part) are joined such that the first enclosure part at least partially overlaps with the second enclosure part. In other words, the first pair of shell portions (the first and second shell portions, or first enclosure part) are configured to have an open edge region that partially overlaps with a region at the open edge of the second pair of shell portions (the third and fourth shell portions, or second enclosure part). When the pairs are pushed together, the two enclosure parts can co-operate and enclose a volume suitable to contain a board.

It will be understood that, although the cover is described herein with reference to a sports board, a cover or case could be provided in a similar manner for other goods or item. This will require an appropriate choice for the shape and sizes of the concave portions. For instance, the case or cover could be for cycling equipment, or other sports equipment or hobby equipment.

Preferably, the size and/or dimensions of the cavity or volume are adjustable by varying the amount by which the second shell portion is received into the first shell portion, by varying the amount by which the fourth shell portion is received into the third shell portion and/or by varying the amount by which the second part of the enclosure is received into the first part of the enclosure. As an example, the first and second shell portion may be pushed closer together to overlap more (so as to reduce the size of the cavity defined), or moved apart so as to overlap less (so as to increase the size of the cavity defined). Similarly, the third and fourth shell portions can be made to overlap more or less, or the first and second enclosure portions may be made to overlap more or less. All of these adjustments change the dimensions of the cavity or volume defined. Advantageously, adjusting the dimensions of the cavity allows the cover to be adaptable to suit many types, shapes and sizes of board or other equipment (for example, having different lengths and widths). Beneficially, providing a closely fitting cover provides improved protection for a range of boards, as movement or slipping of the board within the cover is reduced.

Preferably, the first, second, third and fourth shell portions may be concave and have a substantially U-shaped cross-section. In one example, the concave shell portions have a U-shaped cross-section in an axis which, when the cover is in use, is across the width of the board, as well as in the axis which, when the cover is in use, is along the length of the board. In other words, the concave shell portions have a curved inner surface which defines a cavity into which the board is received, such that the concave portion folds around the edges of the board and extends across the large planar surfaces of the board. Beneficially, this encases the board, and so provides good protection. The U-shaped cross-section may be configured to define a cavity having a depth that is approximately the same as the board, in order to encase the board with a snug fit. However, the shell portions are not necessarily rigid or semi rigid, and may be formed from a flexible material which can maintain some shape or which forms a U-shaped cross-section when the board is received within the shell portions.

Advantageously, the first part of the enclosure and the second part of the enclosure have a closed end distal to the open end. The first part of the enclosure (formed by the first and second shell portions) and the second part of the enclosure (formed by the third and fourth shell portions) each have an open edge or end. In other words, the enclosure parts define a cavity having a lip or edge to define an opening through which the board can be received into the cavity. The cavity is preferably a closed cavity (having an open end, and an opposite closed end) as this provides improved protection for the board. Nonetheless, in some embodiments an opening or hole may be provided in the shell portions in a region away from the open end. For example, the shell portions may incorporate a vent to allow moisture to escape form the cover.

Preferably, the first shell portion is pivotably connected to the second shell portion to form the first part of the enclosure, the pivot point being arranged at an end of the first part of the enclosure distal to the open end. In one example, the first and second shell portions are joined at an end. For example, the pivot may be arranged such that it is located adjacent the nose or the tail of the board when the cover is in use. Beneficially, the pivot improves the ease of handling and operation of the cover. The first and second shell portions can be closed (in the manner of a clam shell) around at least a portion of the board. The relative positions of the first and second shell portions allow the cover to be modified to accommodate different widths of the board.

Preferably, the third shell portion is pivotably connected to the fourth shell portion to form the second part of the enclosure, the pivot point being arranged at an end of the second part of the enclosure distal to the open end. In other words, the second closure part is arranged in a similar manner to the first enclosure part (like a clam shell). As noted with respect to the first enclosure portion, this improves usability and causes the cover to be easier to operate. Furthermore, it aids the ability of the cover to be adjusted to modify the volume of the cavity enclosed by the cover, as the shell portions may be pushed together (or rotated further apart) in order to allow the cover to contain different sizes of board.

Advantageously, the first and second shell portions and/or the third and the fourth shell portions and/or the first and the second part of the enclosure cooperate with each other to provide an interference fit. Each edge of a shell portion which overlaps with an edge of another shell portion may be configured to provide an interference fit. For example, this could be provided by co-operating ridges and valleys on the corresponding faces of the shell portions, in order they can be pushed together but then released only upon mechanical manipulation. In some examples, the shell portions may have an interconnecting lip and sill at the open edge regions of the shell portions which are designed to interconnect with one another.

The inner surface of the first part of the enclosure may at least partially comprise teeth and the outer surface of the second part of the enclosure may at least partially comprise teeth, the teeth at the first part of the enclosure configured to interlock with the teeth at the second part of the enclosure. Interlocking teeth could also be provided at other surface regions where different shell portions overlap. For example, the interlocking teeth may comprise at opposing surfaces steps and valleys which cooperate to act as a connection or fastening mechanism between the two enclosure parts or two shell portions. The steps and valleys may be configured so that they engage to form a ratcheting mechanism (in other words, the surfaces can be moved with respect to each other easily in one direction, but with much more opposition in the other direction). For example, each of the teeth may have a steep step at one side, and a gradual slope on the other side. A mechanism or tool may be provided to separate the surfaces comprising the interlocking teeth, in order that the surfaces can be moved apart with respect to each other to open the cover. The use of interlocking teeth may act to secure the shell portions firmly in place around the board.

Preferably, the cover comprises at least one fastener for connection of the first shell portion to the second shell portion and/or the third shell portion to the fourth shell portion and/or the first part of the enclosure to the second part of the enclosure. The fastener may be used to securely hold the shell portions in position relative to each other, in order to maintain a volume within the cover suitable for enclosing and securely encapsulating the board. The fasteners will ideally hold the shell portions tightly around the board.

Advantageously, the fastener is adjustable to vary the amount by which the second shell portion is received into the first shell portion and/or to vary the amount by which the fourth shell portion is received into the third shell portion and/or to vary the amount by which the second part of the enclosure is received into the first part of the enclosure. This allows the fastener to be adjusted so than the shell portions can be moved relative to each other, whilst still being held in place by the fastener. In other words, the fastener is adjustable such that the cover can be modified from a first configuration to contain a narrow board to a second configuration to contain a wider board. Accordingly, the board cover can be easily modified to be used with a variety of boards having different dimensions and shapes.

Optionally, the fastener is selected from the group consisting of: a self-locking mechanism, a tie strap, a Velcro strap, a strap and buckle, Velcro, a zip, a tension clasp, a ratchet clasp. The fastener may be any type of fastener, clasp or clip which allows the shell portions to be tightly connected together. Ideally, the fastener provides a secure fastening that will not accidentally be opened during transportation or handling of the cover. However, the fastener will be able to be opened by the user without great difficultly at the time they intend to open the cover (for instance, by using suitable mechanical manipulation, or by use of a key or other appropriate device). Preferably, the fastener will also be adjustable, such that the shell portions secured by the fastener can be held in different positions with respect to each other. This allows the cover to accommodate boards of differing sizes or dimensions.

The shell portions may comprise a plurality of layers. Preferably, the plurality of layers comprises at least a robust outer layer and a resilient inner layer. In some examples, the shell portions may comprise two, three, four or more layers. In general, the outer layers will be more robust and provide a higher-strength barrier than the inner layers. For example, the outer layer may be a rigid, semi-rigid or flexible shell. The outer layer may be comprised of a reinforced composite. In one example, one or more layers may comprise srPP material. An important purpose of the outer layer or layers is to prevent penetration from the outside into the cover (which could puncture, break or otherwise damage the board). The outer layer may also provide an attractive appearance at the outside of the cover, and may cause the board bag or cover to be weatherproof or waterproof. In contrast, the inner layers may primarily be provided to cushion the board and to better hold the board in position. The inner layers may be deformable to better conform to the shape of the board. As a result, the inner layers help reduce damage from impact to the board (for example, if the board and case were dropped in transit). For the same reason, the inner layers ideally look to prevent the board slipping and moving within the cover. Advantageously, both the inner and outer layers are kept as thin and lightweight as possible (whilst still performing their intended function), in order to avoid adding unnecessary bulk or weight to the bag. Accordingly, the cover is easier and less cumbersome to transport. As will be understood by the skilled person, the shell portions do not necessarily comprise a plurality of layers and may only comprise one layer or one material type.

Optionally, the robust outer layer comprises a material selected from the group consisting of: fiberglass; carbon fibre; Kevlar; high density foam; polystyrene; polyester; epoxy; para-aramid synthetic fibre composite; self-reinforcing polypropylene (srPP) fabric, although other suitable materials may also be used. Beneficially, each of these materials is relatively high-strength, hard wearing and durable, whilst also being relatively light-weight.

Optionally, the resilient inner layer comprises a material selected from the group consisting of: foam; wadding. For example, the foam may be an expanded polypropylene foam, or the wadding may be made of a fabric or material layer. Beneficially, each of these materials is resilient and able to absorb some impact to protect the board from damage when in use. These materials will also conform to the shape of the board, in order to hold a board contained within the cover firmly in place.

According to a second aspect there is provided a cover for a sports board, the board being elongate and having a length and a width, the cover comprising a first and a second concave portion each having an inner surface, the first and second concave portion arranged with the inner surfaces facing each other and pivotably connected at an end, the second concave portion arranged to be at least partially received within the first concave portion so as to define a cavity having an open end distal to the end comprising the pivot and the open end configured to receive at least part of the board. The extent to which the second concave portion is received into the first concave portion is adjustable in the direction of the width of the board so as to change the size and dimensions of the cavity.

In other words, the first and second concave portion may close lengthways around the board in the manner of a clam shell. The first and second portion may be rotated around the pivot such that the amount by which the first and second portions overlap can be adjusted. In this way, the dimensions of the cavity enclosed within the joined first and second portion can be modified, in particular in the axis of the width of the board. As such, the cover may be used to accommodate boards of different widths whilst still providing a tight, snug fit for the cover around the board. The pivot may be any fulcrum around which the first and second concave portions can be rotated relative to each other. For example, the pivot may be a screw or axis, or may be a joining section of flexible material.

It will be understood that, although the cover is described herein with reference to a sports board, a cover or case could be provided in a similar manner for other goods or item. This will require an appropriate choice for the shape and sizes of the concave portions. For instance, the case or cover could be for cycling equipment, or other sports equipment or hobby equipment.

Preferably, the cover further comprises a third and a fourth concave portion each having an inner surface, the third and the fourth concave portion arranged with the inner surfaces facing each other and pivotably connected at an end, the fourth concave portion arranged to be at least partially received within the third concave portion so as to define a cavity having an open end distal to the end comprising the pivot, the open end configured to receive at least part of the board. The extent to which the fourth concave portion is received into the third concave portion is adjustable in the direction of the width of the board so as to change the size and dimensions of the cavity. The open end of the cavity defined by the first and second concave portion is configured to at least partially receive the open end of the cavity defined by the third and fourth concave portion so as to define a volume for receiving at least part of the board. The extent to which the cavity defined by the first and second concave portions is configured to receive the third and fourth concave portions is adjustable in the direction of the length of the board so as to change the size and dimensions of the volume.

In a particular example, the first, second, third and fourth concave portion may each enclose a different region of the board. The first and the second concave sections may together form a first part of the enclosure, and the third and fourth concave portions may together form a second part of the enclosure. Each part of the enclosure may be closed around the board (in the manner of a clam shell or in a scissor action), and then the two enclosure parts may be pushed together so as to overlap and enclose a volume suitable for containing the board.

Advantageously, the cover further comprises at least one fastener to secure the position of at least one concave portion relative to another concave portion. In other words, the fasteners may be useful to hold the first concave portion in a position relative to the second concave portion, or the third concave portion in a position relative to the first concave portion, or another combination. Ideally, the fastener is adjustable such that it can be modified to hold the concave portions at different relative positions compared to each other (for instance, ideally the fastener can be adjusted to change the amount by which the concave portions overlap). In any case, the fasteners hold the concave portions firmly into position.

Optionally, the fastener is selected from the group consisting of: a self-locking mechanism, a tie strap, a Velcro strap, a strap and buckle, Velcro, a zip, a tension clasp, a ratchet clasp. Ideally, the fastener firmly holds the concave portions into position, but can also be released relatively easily under correct mechanical manipulation by the user (or by release of a lock using an appropriate tool). Preferably, the fastener is adjustable such that the distance between the anchor of the fastener at one of the concave portions can be moved further apart from the anchor of the fastener at another of the concave portions. This allows the cover to be easily assembled to enclose the board or disassembled to remove the board form the cover.

Preferably, the first, second, third and fourth concave portions have a hollow U-shaped cross-section. In one example, the concave portions have a U-shaped cross-section in an axis across the width of the board, as well as in the axis along the length of the board. In other words the concave portions have a curved inner surface to define a cavity into which the board is received, such that the concave portion folds around both sides of the board. Beneficially, this encases the board tightly, and so provides better protection.

Optionally, the cavity defined by the first and second concave portion and/or the cavity defined by the third and fourth concave portion is closed at the pivot end. The first part of the enclosure (formed by the first and second concave portions) and the second part of the enclosure (formed by the third and fourth concave portions) join to define a cavity configured to receive at least part of the board. In a preferred embodiment, the cavity will receive approximately half the board, although the cavity could be configured to receive a smaller or larger proportion of the board. The cavity has an opening defined by an open edge. In other words, the opening to the cavity is defined by a lip or edge of the first part of the enclosure, and the board is received through the opening into the cavity. The cavity is preferably a closed cavity such that the end of the enclosure opposite the open end is closed. This provides improved protection for the board. Nonetheless, in some embodiments an opening or hole may be provided in the concave portions in a region away from the open end. For example, the concave portions may incorporate a vent region.

Advantageously, the first and second concave portions and/or the third and the fourth concave portions cooperate with each other to provide an interference fit. Each surface near the open edge (or edge region) of a concave portion (which overlaps with an adjoining edge region of another concave portion) may be configured to cooperate with the adjoining region of the other concave portion to provide an interference fit. For example, this could be provided by ridges and valleys on the corresponding faces of the concave portions. In some examples, the concave portions may have an interconnecting lip and sill designed to interlock with one another.

The inner surface of the first and second concave portion may at least partially comprise teeth and the outer surface of the third and fourth concave portion may at least partially comprise teeth, wherein the teeth at the inner and outer surfaces interlock. For example, the opposing surfaces at different concave portions may include steps and valleys which cooperate to act as a connection or fastening mechanism between the two enclosure parts. The steps may be designed to provide a ratcheting mechanism so that the surfaces can be moved with respect to each other more easily in a first direction than in a second, opposite direction. A mechanism may be provided to separate the surfaces comprising teeth, in order that the concave portions can be moved apart and the cover opened. Beneficially, use of interlocking teeth secures the position of the concave portions so as to be firmly fastened in place around the board.

Advantageously, the concave portions comprise a plurality of layers. Preferably, the plurality of layers comprises at least a robust outer layer and a resilient inner layer. In some examples, the concave portions may comprise two, three, four or more layers. In general, the outermost layers will be robust and provide a high-strength barrier. For example, the outer layer may be a rigid, semi-rigid or flexible shell and/or may be comprised of a reinforced composite. In one example, the layers may comprise one or more layer of srPP material. The outer layer may provide a robust protective layer, but may also have other functions such as an attractive appearance or waterproofing or sealing of the cover. The inner layers are provided to cushion the board and to better hold the board into position when in transit (such that the board does not move or slide within the bag). The inner layers may be deformable to better conform to the shape of the board. Advantageously, both the inner and outer layers are kept as thin and lightweight as possible (whilst still performing their intended function), in order not to add unnecessary bulk to the bag. Accordingly, the cover is easier and less cumbersome to transport. However, the concave portions do not necessarily comprise a plurality of layers and in some examples may only comprise one layer or one material type.

Optionally, the robust outer layer comprises a material selected from the group consisting of: fiberglass; carbon fibre; Kevlar; high density foam; polystyrene; polyester; epoxy; para-aramid synthetic fibre composite; self-reinforcing polypropylene (srPP) fabric, although other suitable materials may also be used. Beneficially, each of these materials is relatively high-strength, hard wearing and durable. An example of a self-reinforcing polypropylene (srPP) fabric is Armordon™.

Optionally, the resilient inner layer comprises a material selected from the group consisting of: foam; wadding. For example, the foam may be an expanded polypropylene foam (ePP), or the wadding maybe made of a fabric or material layer. Beneficially, each of these materials is resilient, and so able to absorb some impact to protect the board from damage when in use. These materials will also conform to the shape of the board, in order to hold the board more firmly in place within the cover.

Preferably, the cover is for a sports board. The cover may be particularly useful as a cover or bag for any type of board used within a sporting activity. Optionally, the cover is for a surfboard, a kiteboard, a paddle board, a windsurfing board or a snowboard. Alternatively, the cover may be for other types of sports or hobby equipment, such as cycling equipment (including bicycles or parts of bicycles) or photography equipment. In a further alternative the cover may be for one or more Hydo foils, surf fins, carbon surf fins, guns, fishing equipment, paddle covers (SUP, Kayak etc.), binoculars, telescopes, video cameras, laptops, external hard drive cases or batteries. For example for batteries, there may be particular advantages, for instance to maintain a stable temperature, and to avoid damage.

In a third aspect, there is provided a cover for a sports board or other types of hobby equipment, the board being elongate and having a length and a width, the cover comprising an enclosure defining a cavity, the cavity arranged to receive the sports board through a closable opening, wherein the enclosure is configured to be adjustable in the direction of the width of the sports board and in the direction of the length of the sports board.

The enclosure surrounds a sports board placed within the cavity defined by the enclosure. In this way, the cover provides a protective layer or shell surrounding the sports board. The enclosure may provide a soft shell, for example being made from a hardwearing but flexible material. The soft shell may be bendable so as to be able to conform to the shape of a board within the enclosure; however the soft shell may also be sufficiently stiff to retain some shape when the board is removed. Alternatively, the enclosure may comprise four rigid portions each having a u-shaped cross-section and configured to enclose approximately half the board. The four rigid portions may be joined by connective panels of a more flexible material (for example, aligned lengthways and widthways on the cover) in order to form an enclosure which encases the board. In other words, the enclosure may be a mixture of more solid and more flexible material portions.

The closable opening is a mouth or other opening into the cavity defined by the enclosure. The sports board may be passed through the opening in order to insert the sports board into the enclosure. The opening may be closed by a use of a fastener such as Velcro, a zip fastener, or a drawstring (although other suitable fasteners could also be used). The closable fastener secures the sports board within the cavity of the enclosure.

The dimensions of the cover are adjustable by the user, such that the cavity defined by the enclosure can be provided having different lengths or widths. This allows the user of the cover to adjust the enclosure to a length and width appropriate for a specific board. The ability to adjust the cover in two dimensions increases the utility and convenience of the cover. In particular, it allows the cover to be adapted to encase or enclose many different sizes, shapes and types of sports board whilst still providing a snug or close fit to prevent damage to the board when the cover is in use. The described adjustable board cover provides excellent protection without needing to be custom made for a board having specific dimension.

Preferably, the enclosure further comprises a first expandable panel arranged in a longitudinal direction of the sports board to allow expansion of the cavity defined by the enclosure in the direction of the width of the sports board; and a second expandable panel arranged in the direction perpendicular to the longitudinal direction of the sports board to allow expansion of the cavity defined by the enclosure in the direction of the length of the sports board. In other words, the expandable panels are arranged in perpendicular directions to each other. In one example, the expandable panels form a cross on one face of the enclosure. However, the expandable panels do not necessarily need to be arranged perpendicular to each other. Provision of expandable panels arranged to extend in two different directions allows both the width and length of the enclosure to be adjusted to fit the dimensions of a specific sports board. By altering or adapting the adjustable panels in two directions a particularly close or snug fit of the cover to the board can be achieved, thereby reducing the likelihood of damage to the board when in transit.

Preferably, the first and/or the second expandable panel comprises a portion arranged to form at least one pleat to expand or to fold so as to adjust the dimensions of the cavity defined by the enclosure. For example, the portion may be a corrugated portion. The portion is arranged to form at least one pleat which can be gathered or folded to retract or compress the expandable panel. When the expandable panel is in a retracted or reduced configuration, the distance between one edge of the expandable panel in the longitudinal direction and the opposite edge is decreased compared to the distance between these edges when the expandable panel is expanded and the pleats are unfolded or spread out. For example, when the expandable panel is retracted the pleats may fold and "stack" to reduce the distance between one edge of the expandable panel to the opposite edge.

The pleats may be placed in a pre-determined position by provision of a crease or fold in the structure of the material. This will cause the fold always to occur in the same position in the expandable panel, and so may provide a more effective retraction of the one or more pleats. Alternatively, the material may form one or more folds or pleats in any natural position when the two sides of the expandable panel are gathered together. In some examples, the pleats may fold to form a concertina of the material within the expandable panel. However in a preferable example, the excess material in the expandable panel may fold to provide a seam or dart of material to give a region in which three layers of the material are stacked (in other words, the fold forms a zig-zag which is folded back upon itself).

Optionally, the cover further comprises a width fastener arranged to maintain the portion in the first expandable panel to be at least partially folded so as to conform the enclosure to the width of the sports board. Optionally, the cover further comprises a length fastener arranged to maintain the portion in the second expandable panel to be at least partially folded so as to conform the enclosure to the length of the sports board.

At least one fold, gather or wrinkle is formed in the respective first or second expandable panel when the length or width fastener is fastener or secured. More than one fold may be formed resulting in a concertina of material in the expandable panel. In some examples, preformed folds will be present in the expandable panel in a specific position. This may increase the uniformity of the folds. In other examples securing the fastener will cause the expandable panel to be gathered or drawn together to form folds freely without a pre-determined position for the folds. In some circumstances, pre-determined folds will result in a concertina being formed in the expandable panel. The fastener may be a zip, Velcro or a buckle and strap, for example. However, other suitable fasteners could be used.

Preferably, the portion of the first and/or second expandable panel is arranged to form at least two or more pleats. The portion may be arranged to form at least two folds when the expandable panel is gathered or retracted (in other words, the portion may be corrugated, or in the form of a concertina). The expandable panel can also be expanded such that the folds in the portion are smoothed out or drawn out. By expanding the portion, two opposing edges of the expandable panel are moved apart so that the distance from one side of the expandable panel to the other is increased. Alternatively, by compressing, retracting or gathering the folds in the corrugations to form two or more pleats, the two sides of the expandable panel are moved together and the distance from one edge of the expandable panel to the other is decreased. In this way, the overall length and/or width of the enclosure can be modified, thereby changing the size of the cavity into which the sports board can be inserted.

Preferably, the width fastener and/or the length fastener comprises a first coupling, a second coupling and a third coupling, wherein the first coupling couples with the second coupling to fold a first pleat of the corrugated portion, and the first coupling couples with the third coupling to fold a second pleat of the corrugated portion. The first, second and third coupling are spaced at intervals to each other within the expandable panel. The first, second and third coupling extend in the direction of the expandable panel (in other words in the lengthways or widthways direction on the enclosure). The first, second and third coupling may be approximately parallel to each other. By connecting the first and second coupling, the portion of the expandable panel between the first and second coupling is folded into a pleat. Accordingly, the overall width of the enclosure is reduced by the distance between the first and second coupling. When the first and third coupling is coupled, the portion of the expandable panel between the first and third coupling is folded to form a pleat. The overall width of the enclosure is reduced by the distance between the first and third coupling. The portion of the expandable panel between the first and third coupling may also comprise the second coupling (in other words, the second coupling may be folded into the pleat). By coupling the different parts of the fastener, the expandable panel is maintained or secured in a particular arrangement providing a specific dimension for the expandable panel and consequently the cavity defined by the enclosure. By selecting whether the first coupling is coupled to the second or third coupling, the user can select a specific size for the expandable panel (and so the cavity defined by the enclosure) in order to provide the best fit fora particular sports board.

The first coupling may be a first set of interlocking teeth of a zipper, and the second and third coupling may each be reciprocal interlocking teeth of the zipper. Therefore, the first and second or first and third coupling may be interlocked together to provide a zip fastener. Alternatively, the fastener may comprise a Velcro strip, in which the first coupling comprises the "hooks" of the Velcro and the second and third coupling comprises the "loops".

Optionally, the enclosure comprises a first shell portion and a second shell portion having inner surfaces, the inner surface of the first shell portion arranged facing the inner surface of the second shell portion, and the second shell portion received within the first shell portion to define the cavity to receive the sports board; and at least one of the first or the second expandable panel comprising a closure having a first coupling at the first shell portion and a second and third coupling at the second shell portion, wherein the first coupling couples with the second coupling such that the second shell portion is received by the first shell portion to overlap by a first amount, and the first coupling couples with the third coupling such that the second shell portion is received by the first shell portion to overlap by a second amount, the first amount being more than the second amount. For example, the enclosure may be formed of two shell portions, each of which may be configured to receive around half the sports board. The two shell portions may be fitted together, to enclose the sports board within the enclosure. The two shell portions may be fitted together so that the open edge of the first shell portion is fitted inside the open edge region of the second shell portion, so that the open edges overlap. By moving the two shell portions with respect to each other (to increase or decrease the region of overlap or expandable panel), the dimensions of the enclosure can be adjusted. The fastener may comprise a first and second coupling member connected to the first and second shell portion respectively, so as to maintain or hold the first and second shell portions in position relative to each other. In a direction perpendicular or substantially perpendicular to the overlapping edges a further expandable panel can be provided, for instance comprising a portion of folded material as described in above examples.

Preferably, the fastener is selected from the group consisting of: a self-locking mechanism, a tie strap, a Velcro strap, a strap and buckle, Velcro, a zip, a tension clasp, a ratchet clasp. These types of fastener can securely fasten or connect portions of the enclosure, but are also separable and so can allow the position of the fastener to be adjusted. Use of a strap and buckle or ratchet clasp may be particularly advantageous, as these may allow the expandable panel to be continuously adjusted (rather than at intervals). Therefore, the adjustment of the dimensions of the bag may be more flexible.

Preferably, the enclosure comprises a plurality of layers. Preferably, the plurality of layers comprises at least a robust outer layer and a resilient inner layer. In some examples, the enclosure structure may comprise two, three, four or more layers. In general, the outermost layers will be robust and provide a high-strength barrier. For example, the outer layer may be a semi-rigid or semi-flexible shell and/or may be comprised of a reinforced composite. In one example, the layers may comprise one or more layer of srPP material. The outer layer may provide a robust protective layer, but may also have other functions such as an attractive appearance or waterproofing or sealing of the cover. The waterproof layer may be bendable, but also maintains a predetermined shape even when the board is not within the cover.

The inner layers are provided to cushion the board and to better hold the board into position when in transit (such that the board does not move or slide within the bag). The inner layers may be deformable to better conform to the shape of the board. Advantageously, both the inner and outer layers are kept as thin and lightweight as possible (whilst still performing their intended function), in order not to add unnecessary bulk to the bag. Accordingly, the cover is easier to handle and less cumbersome to transport. However, the enclosure does not necessarily comprise a plurality of layers and in some examples may only comprise one layer or one material type.

Preferably, the robust outer layer comprises a material selected from the group consisting of: fiberglass; carbon fibre; Kevlar; high density foam; polystyrene; polyester; epoxy; para-aramid synthetic fibre composite; self-reinforcing polypropylene (srPP) fabric although other suitable materials may also be used. Beneficially, each of these materials is relatively high-strength, hard wearing and durable. An example of a self-reinforcing polypropylene (srPP) fabric is Armordon™.

Optionally, the resilient inner layer comprises a material selected from the group consisting of: foam; wadding. For example, the foam may be an expanded polypropylene foam (ePP), or the wadding maybe made of a fabric or material layer. Beneficially, each of these materials is resilient, and so able to absorb some impact to protect the board from damage when in use. These materials will also conform to the shape of the board, in order to hold the board more firmly in place within the cover.

The cover may be for a sports board. The cover may be particularly useful as a cover or bag for any type of board used within a sporting activity. Optionally, the cover is for a surfboard, a kiteboard, a paddle board, a windsurfing board or a snowboard. Alternatively, the cover may be for other types of sports equipment, including cycling equipment.

Preferably, the cover is for protecting any type of hobby equipment, more preferably for sports equipment. In particular, the cover may be beneficially for use with sports equipment that is easily damaged, such as sports boards (surfboards, paddle boards, windsurfer boards, snowboards). In other examples, the cover may be for hobby equipment such as photography equipment or musical instruments. The cover may be for one or more Hydo foils, surf fins, carbon surf fins, guns, fishing equipment, paddle covers (SUP, Kayak etc), binoculars, telescopes, video cameras, laptops, external hard drive cases or batteries. For example for batteries, there may be particular advantages, for example to maintain a stable temperature, and to avoid damage.

The covers may also comprise a number of additional features. For example, the bags may be vented, to allow a flow of air into the internal compartment within the cover. Handles, wheels or carry straps may be added to the covers, in order to facilitate moving and carrying of the cover and contents. The sleeves or bags may be sealed with a push fit closure, or a zip or Velcro fastener.

In a particular example, there is described a case for an item formed using a combination of at least two polypropylene derivative materials (for example, self-reinforcing polypropylene, srPP, and expanded polypropylene foam, ePP).

The case may be a box, bag or cover, and may be especially configured for packaging or carrying particular items or products. The case may be shaped or contoured to provide a close or 'snug' fit for the product within. In particular, the case may be for packaging sports or other special interest hobby equipment. For example, it is generally expected that items such as a sports board, skis, bicycles, skateboards or camera equipment will be transported within specialist cases that are shaped and contoured to fit the particular item. Such cases may also provide particular protective features for specific portions of the item that are more prone to damage (such as the nose of a surfboard, or the lens of a camera).

In particular, the case comprises an outer layer of self-reinforcing polypropylene (srPP) fabric together with an inner portion comprising an expanded polypropylene (ePP) foam. SrPP is a material which, when thermoformed, compressed and layered, exhibits a range of beneficial properties—particularly high impact strength and very low density. The outer layer may surround or enclose the inner portion, and the inner portion may enclose a volume to provide a cavity into which an item can be placed or contained.

The outer layer comprises a compressed, layered and/or self-reinforcing polypropylene fabric. The outer layer may comprise two or more layers of the given polypropylene material, or may comprise a composite of two or more layers of different types of polypropylene materials. In one example, one or more layers of the outer layer comprise srPP material.

In general, the outer layers should be more robust and provide a higher-strength barrier than the inner portion. The outer layer may be a rigid, semi-rigid or flexible shell. An important purpose of the outer layer or layers is to prevent penetration from outside the case into the inner portion and cavity therein (which could thereby puncture, break or otherwise damage the item held in the case). This function is especially important as the inner portion may not otherwise be resistant to cuts or similar penetrative damage. Compared to other materials, relatively thin layers of srPP are required to provide strong protection to the packaging article to shield the inner portion (and consequently the enclosed item) from rips or cuts.

The outer layer may also provide an attractive appearance. This is beneficial not least because the inner portion, when formed of expanded foam, is often moulded and may have unsightly moulding marks which may not be attractive to the consumer. The outer layer may also cause the case to be weatherproof or waterproof.

The inner protective portion (or foam core) may be formed from expanded polypropylene foam (ePP). ePP is a closed cell foam made from fused beads of low density polypropylene, and provides outstanding energy absorption, thermal insulation and a very high strength-to-weight ratio. The inner portion of ePP, provides energy absorption and can withstand multiple impacts without damage. The elasticity and resilient properties of the ePP means that the inner portion can return to its original shape without compression shape damage in the event that a force is applied. Therefore, compared to packaging articles making use of srPP alone or making use of srPP in conjunction with foams such as ethylene-vinyl acetate (EVA) or expanded polyethylene (EPE), the combination of the srPP outer cover with the ePP inner portion should not allow the transfer of force causing damage or shock to the item within.

In contrast to the outer layer, the inner portion may primarily be provided to cushion the item in the case and to better hold it in position. The inner portion may be resilient but also deformable to better conform to the shape of the item within the case. As a result, the inner layers help to both reduce damage from impact to the item (for example, if the item and case were dropped in transit), but also to prevent the item slipping and moving within the cover.

Advantageously, both the inner portion and outer layer are kept as thin and lightweight as possible (whilst still performing their intended function), in order to avoid adding unnecessary bulk or weight to the bag. Accordingly, the cover is easier and less cumbersome to transport.

The particular combination of a srPP outer layer and an ePP inner portion can provide a number of benefits. The srPP material for the outer layer is particularly robust and can protect against damage such as tears in the packaging article. However, such an outer layer may still be slightly flexible. The ePP material for the inner portion may be more rigid (although still with some resilience or elasticity). This allows the material to absorb shocks, but also to be contoured and shaped to best fit a particular item. Overall, the packaging article formed from the combination of the described materials may give an improved outcome against transport, carriage, and storage risks. The particular combination described may also give improved end of life recyclability of the case.

Beneficially, the ePP of the inner portion can be shaped so that the outer contours of the case (once the outer layer is applied) have a particular shape, different from the shape of the item the case contains. This may be advantageous to provide a case having an outer shape suitable for stacking during transportation or for otherwise more space efficient transportation.

For manufacture of the case, the combination of ePP and srPP materials may be loosely coupled and sewn, glued, stapled, or riveted together. In other words, the outer layer and the inner portion can be bonded together using fasteners that penetrate through the layers to bind them together. The cases can be made using additional layers such as polypropylene webbing or similar materials, and/or an optional inner finishing or lining fabric if required.

Sewing, stitching, riveting or stapling may be particularly advantageous to combine or bond the inner ePP and outer srPP layers. Beneficially, the reinforcing fibres of srPP are not interwoven in the same way as some other types of reinforced materials, so srPP can be stitched, riveted or stapled through without the thread, rivet or staple pulling through or causing damage to the reinforcing fibres. Furthermore, a case can be formed that is semi-rigid and having complex bag shapes. For example, curved walls or walls having negative angles or contours are possible using a manufacturing method comprising stitching, sewing, stapling or riveting the ePP and srPP layers. Furthermore, very thin sheets of ePP can be used within this method of manufacture. In one example, an ePP sheet of around $5mm$ can be used. This would be much more difficult if using alternative techniques for manufacture (such as molding).

In another example, the case may be manufactured by thermoforming in a mould the srPP outer layer and the ePP inner portion. The outer layer and the inner portion may be moulded separately, and then connected via a compression fitting or with an adhesive layer. This may result in a rigid or semi-rigid shape for the packaging article. Alternatively, the outer layer and inner portion may be formed in a mould together. In this case, the two materials may intermingle under pressure and heat to form a co-joining melt layer therebetween, resulting in combination material sheets.

The case may be formed to contain particular items, or designed for specific purposes. For instance, the case may be formed to carry sports equipment (including a bicycle, skis, paddles, or types of sports board such as snowboards, skateboards, surfboards, windsurfer boards or paddle boards, etc.). The case may also be configured to carry other delicate specialist equipment, such as photography equipment or musical instruments. The case may be used to house cycling equipment, such as a bicycle or parts of a bicycle. The case can be designed and shaped to provide protective packing to almost any product or item.

Overall, the use of a combination of an srPP outer layer and an ePP inner portion provides a case with a number of significant advantages. These advantages include:

1) The combination of materials is lightweight. Transportation of goods is generally determined by the weight of the article, with heavier items being more expensive to transport. Therefore, decreasing the weight of the packaging reduces the cost for transportation of an article overall. This can be particularly beneficial when the described combinations are used for travel bags for specialist equipment such as bicycles, surfboards, photography equipment, or musical instruments.

2) The combination of material provides improved prevention from impact damage. EPP has a very high strength-to-weight ratio, which provides load bearing structural support in a range of applications. EPP is capable of handling significant loads with little loss in form or shape, and is an excellent energy absorbing material that withstands multiple impacts without damage. These properties are offered whilst still being lightweight. When ePP is combined with the highly durable and penetration resistant material srPP outer layer or skin (which is also very low density and durable), the combination gives good characteristics to prevent high impact damage per density unit of combined materials.

3) The combination of materials gives adequate rigidity for the user, whilst also providing improved overall material performance. srPP by itself can lack rigidity. Therefore, where srPP has been used in protective packaging alone (such as for srPP only suitcases or mono skin bicycle boxes), the packaging articles have been found to lack rigidity. Rigidity can be important for ease of customer use (i.e. to allow the item to be more easily placed within the packaging), but also during transportation, where items within the case may need to be stacked or layered for efficient use of transport volume.

4) The combination of materials offers improved heat insulation and/or heat retention. For example, the packaged item may be kept at a more stable temperature, as the item will be insulated from hotter or colder temperatures in the outside environment. This may be especially important when transporting particular items. For instance, when transporting a surfboard, users require the wax on the board not to melt. In another example, musical instruments may go out of tune if subjected to high variations in temperature. Therefore, the presently described case may prevent extremes in temperature for the packaged items, even if the ambient, outside temperature fluctuates. The combination of materials discussed may also be advantageous to keep the packaged item hot or cold. In one example, the case may be for food delivery (such as a case for enclosing pizza boxes for a takeaway delivery). In this case, the described combination of materials has particular properties for good insulation of the food.

As well as providing these advantages, the combination of ePP and srPP within the case provides a material combination that is recyclable at the end of life. Furthermore, the described combination is made from the same polyolefin materials throughout, and so would not require separation before recycling.

As will be understood by the skilled person, a number of applications can be envisaged for the packaging article. For instance, specific examples include packaging of surfboards, kiteboards, stand up paddleboards, musical instruments, medical samples, bicycles with carbon frames, bicycle wheels, golf clubs, rifles and gun cases, photography equipment, laptops, mobile phones and other computer equipment, or delivery of food where appearance and temperature are key). Other specific examples could include packaging of windsurf boards, bicycles with aluminium, composite or carbon frames, bicycle accessories, cricket pads and so on.

In a fourth aspect, there is provided a case for containing an item, comprising an inner portion formed of expanded polypropylene (ePP) and defining a cavity for receiving at least part of the item, and an outer layer, formed of self-reinforcing polypropylene (srPP), arranged to cover or enclose at least part of the inner portion.

The case is a bag, box or other packaging or transportation peripheral item. The case may be specifically designed to contain a particular item. In particular, the cavity may be shaped or contoured to fit a particular item or part of the item.

The inner portion forms or defines a cavity, volume or enclosure in which at least part of the item can be enclosed, inserted or received. The cavity may be shaped to closely follow the outside shape or contours of the item, to give a good fit. The inner walls of the inner portion at least partially surround the item. The cavity may be arranged to receive the whole item, or only a portion of the item. The item may be completely enclosed within the inner portion, or may be substantially enclosed except of some vents or gaps in the inner portion. The inner portion and outer layer may act as a protective case or enclosure for the whole item.

Alternatively, the inner portion and outer layer may only surround a particularly delicate portion of the item, for example the nose of a surfboard, or a lens of a camera case. In this example, the inner portion of expanded polypropylene (ePP) and outer layer of self-reinforcing polypropylene (srPP) may make up only part of the bag and can be incorporated as a panel portion into a case made up of other materials (or made up of a majority of either srPP or ePP).

Preferably, the outer layer is formed of srPP comprising a plurality of thermoformed, compressed layers. The outer layer encloses or surrounds the inner portion, so as to provide an outer 'skin'. The outer layer forms the outermost surface of the case. In some examples, intervening layers may be present between the inner portion and the outer layer. In other examples, the outer layer directly covers the outer surface of the inner portion.

Optionally, the outer layer is formed of srPP comprising between 1 and 8 consolidated thermoformed layers. The outer layer may be formed of srPP comprising between 2 and 6 consolidated thermoformed layers. This allows flexibility of the overall material, as well as weight optimisation.

Preferably, the inner portion is formed of expanded polypropylene (ePP) having a density of between 20 g and 80 g per litre. This is sufficient for the material to reform following impact damage and not to become crushed or permanently misshapen. Furthermore, this is sufficient to avoid directly transferring shock impact to an item within the packaging article. More preferably the ePP should be between 30 and 65 grams per litre density to exhibit optimal qualities.

Preferably, the inner portion comprises walls defining the cavity having a thickness between 3 mm and 50 mm. The inner portion may comprise walls defining the cavity having a thickness between 5 mm and 25 mm thick. This avoids the ePP adding too much bulk to the carriage item, whilst still offering good protection.

Preferably, the case further comprises a lining layer, arranged on the inner surface of the inner portion, in order to line the walls of the cavity. For example, the lining layer may be a soft fabric such as felt, to prevent surface damage and further cushion the item within the cavity.

Preferably, the inner surface of the inner portion is shaped to form a cavity substantially conforming to the shape of at least part of the item. For example, the cavity may have inner walls shaped to conform with the outer surface of a particular item. The walls of the cavity may provide notches or cavities for indentations or projections on the item. For example, the inner walls of the inner portion may be shaped to hold and fit around a musical instrument. In some cases, the shape of the cavity will not conform precisely to the shape of the item, but instead may approximately conform. In this case, it may be useful to provide an inner layer of the inner portion having sufficient resilience to cushion or compress to fit the shape of the item.

Optionally, the inner portion is formed by moulding the expanded polypropylene (ePP) material.

The inner portion may comprise a plurality of layers of ePP. In particular, a first layer of the plurality of layers of ePP may have a higher density than a second layer of the plurality of layers of ePP. The case may also include layers of other materials. For example, fabric layers or other foam or polypropylene layers (such as layers of foam having different densities and resilience) could also be used. This may allow the packaged item to be held more securely, and may provide greater cushioning for delicate items.

Preferably, at least a part of the inner portion and the outer layer are bonded together by at least one fastening mechanism selected from the group comprising: stitches, rivets, staples, a glue layer or an adhesive layer, a thermal bond, or a compression fitting. Stitching, riveting or sewing may be particularly advantageous, as the properties of the srPP mean that the reinforcing fibres do not 'pull through' the material when using these methods, but such methods allow more complex shapes to be formed.

The case may further comprise a closable opening to the cavity. For example, the case may have a closeable mouth or opening to the inner cavity similar to an entry into a pocket or pouch, or through a closeable flap. Alternatively, the case may be arranged so as to have a first and second segment joined at a pivot (in a similar manner to the covers of a book pivoting around the spine of a book), wherein when the first and second segment are bought together, the item is enclosed therebetween. For example, the inner portion (and correspondingly the outer layer) may be formed in two segments such that the cavity for the item is formed between a first and second segment of the inner portion.

Preferably, the closeable opening may be fastened closed using a fastener. The fastener may be selected from the group consisting of: a self-locking mechanism, a tie strap, a Velcro strap, a strap and buckle, Velcro, a zip, a tension clasp, a ratchet clasp, a push fitting. Other suitable fasteners will also be apparent to the person skilled in the art.

Optionally, the case is a hard case or a soft case, a cover, a bag or a box.

Preferably, the item is a hobby equipment.

More preferably, the hobby equipment is sports equipment, musical instrument or photography equipment. In particular examples, the hobby equipment may be sports boards, cycling equipment, Hydo foils, surf fins, carbon surf fins, guns, fishing equipment, paddle covers (SUP, Kayak etc), binoculars, telescopes, video cameras, laptops, external hard drive cases or batteries.

The case may be formed of a top panel, a bottom panel and a side panel. At least one of the top, bottom and side panel may be formed of a plurality of layers comprising at least in part an inner layer of ePP and an outer layer of srPP. When the case is formed, the top and bottom panel may be arranged in parallel to each other, with the side panels arranged therebetween and perpendicular to the top and bottom panels.

Preferably, the top and bottom panels are substantially planar, having a circumferential edge at the perimeter of the planar panels. Preferably, the side panel is a tubular portion, wherein the walls of the tubular cavity are arranged to fit the circumferential edges of the top and/or bottom panel, so that the side panel is configured between the perimeter of the top panel and the perimeter of the bottom panel.

Preferably, the top panel comprises a fastener, such as a zip, Velcro or poppers, around the circumferential edge of the panel. Preferably, the bottom panel comprises a fastener, such as a zip or Velcro, around the circumferential edge of the panel. Preferably, the top and bottom edge of the side panel (which could otherwise be considered the first and second end of the tubular portion, the second end of the tubular portion distal from the first end) each comprise fasteners, such as a zip, Velcro or poppers. The fasteners at the top and bottom edge of the side wall may be arranged to couple with the fasteners at the circumferential edge of the top and/or bottom panel. Advantageously, this allows the case to be formed by joining the fastener at the circumferential edge of the top panel to the fastener at the top of the side panel, and joining the fastener at the circumferential edge of the bottom panel to the fastener at the bottom of the side panel. This defines an inner cavity within the case for containing goods.

Preferably, the side panels may be interchangeable. For example, a plurality of side panels may be provided, each having different lengths for the tubular portion (i.e. the dimension in the longitudinal direction of the cavity within the tubular portion may be different for each, interchangeable side panel). In other words, each side panel may be arranged between the top and bottom panel, such that the different sizes of the side panel cause the spacing between the top and bottom panel to be adjusted, once the panels are joined. Beneficially, this provides a highly adaptable case or cover, wherein a side panel of a specific size can be selected by the user to provide a given dimension for the inner cavity within the case.

A number of optional features may be included at the case or cover, for instance, one or more optional features selected from the group consisting of: soft handles for lifting the case; removable wheels and/or attachments for removable wheels; a removable shoulder strap; lifting buckles; reinforcing sections at the panels; vents embedded into the panels, to allow moisture to be released from within the cavity of the bag; straps around the bag, to secure the panels in place; loops at the outer surface of the panels to retain said straps.

Preferably, an opening may be arranged at one end of the bag, to allow an easier access to the inner cavity without releasing the fasteners that couple the top, bottom and side panels.

Preferably, dividers may be provided within the case, cover or bag. Optionally, additional padding may be arranged at certain areas of the case, cover or bag to protect particular portions of an item therein.

In a fifth aspect, there is provided a method for manufacturing a case for containing an item, comprising forming an inner portion of expanded polypropylene (ePP), defining a cavity for receiving at least a portion of the item, and forming an outer layer of self-reinforcing polypropylene (srPP), arranged to cover or enclose at least part of an outer surface of the inner portion.

Preferably, the method also includes bonding together at least a part of the inner portion and the outer layer. This creates a laminated structure for the walls of the case.

The step of bonding may comprise at least one of: stitching, riveting, sewing, stapling, thermally bonding, applying an adhesive layer, applying a glue layer, or arranging a compression fitting.

Preferably, forming the outer layer comprises forming the outer layer from a plurality of thermoformed, compressed layers.

Optionally, forming the outer layer comprises forming the outer layer from between 1 and 8 consolidated thermoformed layers. Forming the outer layer may comprise forming the outer layer from between 2 and 6 consolidated thermoformed layers.

Optionally, forming the inner portion comprises forming the inner portion from expanded polypropylene (ePP) having a density of between 20 g and 80 g per litre. Forming the inner portion may comprise forming the inner portion from expanded polypropylene (ePP) having a density of between 30 g and 65 g per litre.

Preferably, forming the inner portion comprises forming walls defining the cavity having a thickness between 3 mm and 50 mm. Forming the inner portion may comprise forming walls defining the cavity having a thickness between 5 mm and 25 mm thick.

Preferably, forming the inner portion further comprises forming a lining layer, arranged on the inner surface of the inner portion, in order to line the walls of the cavity.

Preferably, forming the inner portion further comprises shaping the inner portion to form a cavity substantially conforming to the shape of at least part of the item.

Preferably, shaping the inner portion comprises forming the inner portion in a mould.

Preferably, the inner portion comprises a plurality of layers of ePP or other foam.

Optionally, a first layer of the plurality of layers of ePP or other foam has a higher density than a second layer of the plurality of layers of ePP or other foam.

Preferably, the method of manufacture further comprises forming a closable opening to the cavity. A fastener may be provided to fasten the closable opening.

Optionally, the fastener is selected from the group consisting of: a self-locking mechanism, a tie strap, a Velcro strap, a strap and buckle, Velcro, a zip, a tension clasp, a ratchet clasp, a push fitting.

Preferably, the case is a hard case or a soft case, a cover, a bag or a box.

Preferably, the item is a hobby equipment.

Optionally, the hobby equipment is sports equipment, a musical instrument or photography equipment. In particular examples, the hobby equipment may be sports boards, cycling equipment, Hydo foils, surf fins, carbon surf fins, guns, fishing equipment, paddle covers (SUP, Kayak etc), binoculars, telescopes, video cameras, laptops, external hard drive cases or batteries.

Any of the concave portions, shell portions or enclosures described above in relation to the adjustable bags can be formed according to the combination of materials using ePP and srPP, as described above.

In a sixth aspect there is described use of self-reinforcing polypropylene (srPP) fabric within a cover for an item, in particular sports equipment or other type of hobby equipment. An example of srPP is Armordon™. Advantageously, srPP is high-strength, robust and durable but is also relatively lightweight. Relatively thin layers of srPP may be used within the cover whilst still providing a strong shield from penetration or rips to the case (which could result in damage to an item carried inside). Furthermore, the material can be shaped as desired, providing a bendable material panel or a robust rigid or semi-rigid shell.

The srPP material may be particularly advantageous for use in a case or cover (in particular a board cover) due to its high-strength (which provides very durable protection) and flexibility (which permits simple manufacture, for example using known techniques for manufacture of fabric covers). In addition, the reinforcing fibres of srPP are not interwoven in the same way as some other types of reinforced materials, so srPP material can be stitched without the "pulling through" of the reinforcing fibres. The use of srPP also permits the case or cover to be lightweight and convenient.

The case may be used to provide a cover for any item, including sports equipment and hobby equipment. In particular, the srPP is particularly suitable for a cover for any items which are regularly moved and transported, including sports equipment such as sports boards and skis, as well as musical instruments, guns or photography equipment. The cover may be for cycling equipment, such as bicycles or parts of a bicycle.

Preferably, the sports equipment is a sports board. In view of the need to transport boards used in sports, use of a material such as srPP is particularly beneficial in a cover for a sports board. Furthermore, such boards are often carried on modes of transport (such as an air craft) where the weight of the cover and board is preferably minimised (to avoid additional carrier costs, for example). As such, use of srPP is particularly advantageous as this material is both high-strength and lightweight.

In particular examples, the cover for the sports equipment is a cover for a surfboard, a kiteboard, a paddleboard, a windsurfing board or a snowboard. However, the material would be useful for a cover for any sort of board, especially those used within a sport.

The srPP material can be used within a bag or cover (in one example, for a sports board) either in the form of panels, walls or as a separate sleeve. In one example, the panels may be stitched into the walls of an existing bag or cover (i.e. retro-fitted). In an alternative example the srPP panels could be included within a layered wall structure of a cover during manufacture. In another example, the srPP may form one or more walls of the cover.

In a still further example, the srPP may be used to form a separate, independent sleeve for the hobby equipment, or for sports equipment such as a sports board. Such a sleeve can then be used in conjunction with an existing bag, box or cover (which may or may not include the srPP material). The sleeve may also be used as a cover for day-to-day use, whilst only being used in conjunction with another bag or cover on certain occasions (during long distance transportation, for example). The sleeve may include an opening secured by a fastener (such as a zip or a Velcro strip) through which the item can be inserted into the sleeve.

In a still further example, moulded ePP portion could be formed defining a cavity for containing an item (such as a bicycle or other item of sports equipment or hobby equipment). The semi-rigidity of the ePP material at higher densities provides good protection of the item therein. The ePP moulded portion has areas on the inner or outer surfaces having an indented area for a panel of material to snap into. For instance the material may be held by a compression fitting. The panels may be srPP to provide lightweight, improved protection.

In a seventh aspect there is described a cover for a sports board or other type of hobby equipment (such as bicycles or cycling equipment) comprising self-reinforcing polypropylene (srPP) fabric panels. In other words, panels of srPP (for example, panels of Armordon™) can be fitted to the sides or faces of the cover, or the walls of the cover can be comprised of one or more srPP panels.

In one example, the panels are placed as one of a plurality of layers forming the cover. In another example, the srPP panels form the outermost layer of the cover. In some cases, the panels are applied during the original manufacture of the cover. In other cases, the panels may be retro-fitted to an existing cover such that panels of the srPP are sewn into the walls of the pre-existing cover. The panels may be connected such that the whole cover is formed from the srPP, or only certain walls or portions of the cover may comprise srPP. Advantageously, the srPP provides a particularly robust and strong layer, which helps to protect the item from damage.

The panels may be fitted within a cover, case or bag made of a material other than srPP, so that srPP panels protect only the most fragile or vulnerable portions of the item within the case. The panels could be formed to conform to the shape of the particularly fragile portion of the item. In a particularly beneficial example, the majority of the case or cover may be formed of ePP, with additional srPP panels arranged in selected regions of the case. For example, the srPP regions may be stitched into selected portions of the bag. In the example of a case or cover for one or more sports board, srPP panels may be arranged at the nose and tail portions of a mainly ePP case or cover.

In a beneficial example, there is described a sleeve for a sports board or other hobby equipment, the sleeve comprising srPP. Preferably, the sleeve may comprise srPP and expanded polypropylene (ePP). The sleeve may be used to provide a further protective layer for a board or other item, independently of existing bag. Furthermore, the sleeve may be used to ensure a tighter fit of a board or other item within an existing bag, already owned by a user. In relation to a sports board, the sleeve may be inserted into a ready-made board bag, or may be used as a day-to-day board bag. For example, the sleeve may be used as a day-to-day cover in general use, but then used in conjunction with a separate, pre-existing cover for situations when the board our other item is more likely to sustain damage (for example, during air travel).

The sleeve may comprise an inner layer of srPP, surrounded by a layer of ePP and further surrounded by an outer layer of srPP. Many combinations of layers using srPP and other materials will be apparent to the person skilled in the art.

The sleeve may be self-contained. For example, the sleeve may define a closed sleeve to encase or substantially encase the board. The sleeve may be provided with one or more openings to allow insertion of the board within the sleeve. Furthermore, the sleeve may comprise one or more fasteners to secure or close an opening in the sleeve. The fastener may comprise any type of fastener, including but not limited to zips, Velcro, a drawstring, or riveting.

The layers of srPP and ePP forming the sleeve may either be loose coupled or joined together by moulding, gluing, stapling or stitching methods.

In a particular example, the sleeve may be used for cycling equipment, including a bicycle or parts of a bicycle.

In another example, panels comprised of a plurality of layers including ePP and srPP could be formed. Such panels could be used within an existing bag or case, so as to be inserted within an existing bag or case to provide additional protection to certain areas of an item within this case. In this way, the panels can provide packing materials within the cavity of a case or cover, with superior properties to other packing materials.

In a particular example, the plurality of layers within such panels could comprise a woven polyethylene or polyethene sheeting (such as Tarpee), woven reinforced fabric (such as ripstop, for instance from nylon) or polyester sheeting or fabric. The plurality of layers within the panels could be stitched together. The panels could be shaped so as to fit optimally around areas of a particular item.

In the particular example of a sports board bag, the panels could be configured to be placed around the nose, tail and points of the rails of a board within an existing bag, as these are the particularly vulnerable areas that get damaged regularly. Often, users currently place towels or wetsuits for the same purpose within an existing bag, but this can be heavy and so increase the chances of the bag being dropped. Furthermore, this practice can unbalance the bag, causing the bag to fall or drop a certain way such that the heavier area hits the ground first, thereby sustaining damage to the most vulnerable parts of the board. The described panels are both lightweight and robust, so help to overcome this problem.

In yet another example, there is described use of expanded polypropylene (ePP) fabric within a cover for an item, in particular sports equipment or other type of hobby equipment. The ePP may be used alone, or in conjunction with one or more other material. In this example, the case is particularly lightweight, and provides superior cushioning to the item within the case. The ePP may be particularly beneficial when used within a case or cover for a sports bag.

This application further describes an adjustable case or box for transporting goods. The case is adjustable in at least one dimension, so that the volume within the case can be selected or modified by the user. Ideally, the walls of the case are fastened into position to select the dimensions of the case prior to placing the items within. The adjustment of the case is provided by a telescoping mechanism, in which at least a first part of a case, itself defining a cavity, is received within the cavity of a second part of the case. The two parts overlap, wherein adjusting the extent of the overlap changes the dimensions of the case and the volume of its inner cavity. Beneficially, the adjustable nature of the case allows the volume of the inner cavity of the case to be modified to give a close fit for specific goods or products to be contained in the case.

In an eighth aspect the invention comprises a case for transportation and storage of goods, comprising:

a first and a second telescoping enclosure section, the first telescoping enclosure section comprising a first and second portion each having an inner surface defining a cavity, the first and second portion arranged with inner surfaces facing in the same direction, the first portion arranged to at least partially overlap with the second portion, the cavity of the first and second portion together defining an open cavity for at least partially receiving the goods; and a second telescoping enclosure section, configured to close the open cavity so as to define an inner cavity for receiving goods.

The case may be a box, cover, enclosure or capsule (in other words, any cover or case for transporting goods or products). Each telescoping enclosure section is a section of the case which includes concentric parts that can overlap, so that a first portion of each telescoping enclosure section slides within (or is received within) a second portion of the telescoping enclosure section. The inner surface of the first portion maybe parallel with, but offset with respect to, the inner surface of the second portion. In this example, at least the first telescoping enclosure section comprises an open container having an open cavity (for instance, forming a half shell section of the case or box).

The first portion of the telescoping enclosure section slides within the second portion of the telescoping enclosure section. In its compressed or collapsed state, each telescoping enclosure section may have the first portion almost entirely received within the second portion. This reduces the cavity within the enclosure section to its smallest size. In its extended state, the first portion may be arranged to be only just overlapping with the second portion, thereby defining the largest possible volume for the cavity within the telescoping enclosure section.

In the present invention, a first and second telescoping enclosure section are arranged to enclose an inner cavity. In other words, the first and second telescoping enclosure sections are configured to face each other, so they can be closed together to define a volume therein. Often, this will require the first and second telescoping enclosure section to be arranged so that the outer walls of each section have the same dimensions at the surface where the telescoping enclosure sections join.

Beneficially, the case provides a robust and secure packaging for transportation and storage of items. However, the case is also adaptable according to the size and shape of the dimensions of the item. The ability to change the dimensions of the inner cavity of the case means that items can be held securely, without requiring customised packaging for each item. The dimensions of the case can be adapted at the point of use according to their own requirements. For instance, the case can be adapted to provide a tight fit for an item, thereby removing the requirement for additional packaging within the case such as bubble wrap, foam loose fill packing or cardboard retainers. As a result, use of the case can save on the costs of additional packaging. This in turn provides environmental benefits compared to traditional packaging methods, as less packaging is used overall. Furthermore, use of the case (particularly for packaging fragile items) can save time for the user in packaging the item compared to prior art methods. In particular, the case removes the need for bespoke packaging of each item, and the wrapping of each individual item before placing in the packing case.

Moreover, the case can be recycled and reused. The case can be opened and then fastened closed a number of times. The modular nature of the case means that, after transportation of a particular item, portions from the case can be reused and incorporated into another case having different dimensions and including different component portions. Each modular portion of the case can be reused again and again, in many configurations of the case.

Preferably, the size and/or dimensions of the inner cavity are adjustable by varying the dimensions of the first and second telescoping enclosure section. The first and second portion of the first telescoping section can move with respect to each other in order to change the dimensions of the cavity defined within the case. The first and second portions at least partially overlap so as to provide the telescoping mechanism. The first and second portions may form a base part of the case, having walls and a bottom portion. The upper surface of the first telescoping section comprises or defines the opening or entry to the open cavity.

The second telescoping enclosure section may be a lid arranged on the first telescoping section. The lid (second telescoping enclosure section) may be flat, or may itself define a cavity to partially receive the goods. The lid (second telescoping enclosure section) can be adjusted to change dimensions to correspond to changes in dimensions of the base (first telescoping enclosure section).

Optionally, the second telescoping enclosure section comprises a third and fourth portion, the third and fourth portion being arranged to overlap, and configured to close the open cavity of the first telescoping enclosure section so as to define an inner cavity within the case for receiving goods. For example, the second telescoping enclosure section may be a lid comprising two overlapping parts, sheets or sections, arranged on the first telescoping enclosure section to close or shut the open cavity. The third and fourth portion may not, themselves define a cavity, as the cavity in the first enclosure section may be arranged to be sufficient to receive the goods or products. For example, the second enclosure section (formed of the third and fourth portion) may provide a lid or closure only.

In a further example, the lid may not be telescoping, but may be configured to close the open cavity of the first telescoping enclosure section. In other words, the lid may not be adjustable, but instead have predetermined dimensions. A variety of lids of different sizes could be provided to be used with the first telescoping enclosure section arranged having open cavities of different sizes, the lids configured to close the open cavity.

In yet a further example, the second telescoping enclosure section could be provided as a piece identical to the first telescoping enclosure section. In this case, the two identical telescoping enclosure sections could be stacked, so that the outer surface of one of the telescoping enclosure sections (in other words, the surface that does not define a cavity) closes the open cavity of the other telescoping enclosure section. For instance, two telescoping enclosure sections according to the first telescoping enclosure section described above could be configured so that their inner surfaces face in the same direction, with one of the two sections arranged on top of the other to enclose a cavity therebetween. Any number of the described first telescoping enclosure sections could be stacked in order to close the open cavity of a telescoping enclosure section beneath.

Preferably, the second telescoping enclosure section has a third and fourth portion each having an inner surface defining a cavity, the third and fourth portion arranged having the inner surfaces facing in the same direction, the third portion arranged to at least partially overlap with the fourth portion, the cavity of the third and fourth portion together defining an open cavity for at least partially receiving the goods;

the first telescoping enclosure section and the second telescoping enclosure section configured having respective inner surfaces facing each other, so as to close the open cavities of the first and second telescoping enclosure sections and define an inner cavity for receiving goods.

In other words, the first telescoping enclosure section is arranged to have its open cavity facing the open cavity of the second telescoping enclosure section, so that the open side of each open cavity joins to define the inner cavity therebetween.

Ideally the second telescoping enclosure section comprises two portions (a third and fourth portion), similar to the first and second portion of the first telescoping enclosure section. The third and fourth portions at least partially overlap so as to provide the telescoping mechanism, and the inner surfaces of the first and second portion may be parallel, so that the third and fourth portions are concentric.

The first and second telescoping enclosure sections may be substantially identical, but arranged to face each other so that the second telescoping enclosure section is a mirror of the first telescoping enclosure section. The second telescoping enclosure section has the same telescoping mechanism as described above in relation to the first telescoping enclosure section. In other words, the third and fourth portion may be arranged so that the third portion is at least partially received by the cavity of the fourth portion.

Preferably, the size and/or dimensions of the inner cavity are adjustable by varying the amount by which the first portion overlaps with the second portion and by varying the amount by which the third portion overlaps with the fourth portion. For instance, the size and/or dimensions of the inner cavity are adjustable by varying the amount by which the first portion is received into the cavity of the second portion and by varying the amount by which the third portion is received into the cavity of the fourth portion.

In this example, the second telescoping enclosure section also defines a cavity to at least partially contain the goods. The cavity may be shallow (compared to the first telescoping enclosure section), or may be deeper than or equally as deep as the cavity of the first telescoping enclosure section. When the first and second telescoping enclosure sections are joined, their two open cavities join to form a closed inner cavity to enclose the goods contained in the case.

Preferably, the case further comprises at least one fastener for coupling the first portion to the second portion and/or for coupling the third portion to the fourth portion.

The fastener is used to fasten the first and second telescoping enclosure sections to prevent them from adjusting dimensions by virtue of their telescoping ability after the case has been configured to the required dimensions by the user. The fasteners hold each portion of the particular telescoping enclosure section in position relative to the other portion of the same telescoping enclosure section. The fasteners can be loosened to allow the relative positions of the portions of each telescoping enclosure section to be changed, and thereby change the dimensions of the telescoping enclosure sections. The fasteners can then be secured to fix the dimensions for each telescoping enclosure section. Beneficially, this allows the case to be completely adjustable to fit different size goods.

Preferably, the at least one fastener is adjustable to vary the amount by which the first portion overlaps with the second portion, and to vary the amount by which the third portion overlaps with the fourth portion. For instance, the at least one fastener is adjustable to vary the amount by which the first portion is received within the second portion, and to vary the amount by which the third portion is received within the fourth portion. The fasteners hold the third portion of the telescoping enclosure section in position relative to the fourth portion of the telescoping enclosure section. This allows the telescoping mechanism to vary the length of each telescoping enclosure section, by allowing the first and section portion, or third and fourth portion to be moved relative to each other when required, but then held in the chosen position by the respective fasteners.

Preferably, the at least one fastener is selected from the group consisting of: a self-locking mechanism, a tie strap, a Velcro strap, a strap and buckle, Velcro, a zip, a tension clasp, a ratchet clasp, dowel pins and receiving holes, a clip. Any suitable fastener could be used. The self-locking mechanism may be any type of compression fitting mechanism, such as cooperating protrusions and recesses at the opposing surfaces of the different portions of the telescoping enclosure sections.

Preferably, the inner surface of the second portion at least partially comprises protrusions and/or depressions and the outer surface of the first portion at least partially comprises depressions and/or protrusions, such that the protrusions and/or depressions of the second portion are configured to interlock with the depressions and/or protrusions at the first portion in order to couple the first and second portion; and the inner surface of the fourth portion at least partially comprises protrusions and/or depressions and the outer surface of the third portion at least partially comprises depressions and/or protrusions, such that the protrusions and/or depressions of the fourth portion are configured to interlock with the depressions and/or protrusions at the third portion in order to couple the third and fourth portion.

In other words, protrusions and depressions or recesses in the connecting surfaces interconnect or cooperate to hold each portion in place. This can give a compression fitting or self-locking mechanism. The projections may be rods or columns, or may be ridges or other patterns of protrusions. The depressions or recesses cooperate with the shape of the protrusions to provide a good fit. For example, protrusions such as ridges, rods or bumps could fit into valleys, holes or dimples in the opposing surface. In some cases the protrusions and recesses may also allow for surface decoration or product marking or branding.

Preferably, the case further comprises at least one fastener for connection of the first telescoping enclosure section to the second telescoping enclosure section. In other words a fastener can be used to secure the two parts or halves of the shell of the case together to enclose the cavity therebetween. Any suitable fastener could be used. In order to move the goods in and out of the case, the fastener will ideally be secure once fastened but convenient to open by the user.

Preferably, the at least one fastener for connection of the first telescoping enclosure section to the second telescoping enclosure section is selected from the group consisting of: a self-locking mechanism, a tie strap, a Velcro strap, a strap and buckle, Velcro, a zip, a tension clasp, a ratchet clasp, interlocking teeth, interlocking depressions or protrusions, dowel pins and receiving holes, a clip. The clip may be a C-clip that fits around the sides of the first and second telescoping enclosure sections, so as to push the telescoping enclosure sections together. In some examples, the C-clip could be retained by location of portions of the clip in channels at the outer surface of the case.

Preferably, the outer surface of the first telescoping enclosure section opposing the second telescoping enclosure section comprises protrusions and/or depressions, and the outer surface of the second telescoping enclosure section opposing the first telescoping enclosure section comprises depressions and/or protrusions; and wherein the protrusions and/or depressions at the first telescoping enclosure section are configured to interlock with the depressions and/or protrusions at the second telescoping enclosure section in order to couple the first telescoping enclosure section with the second telescoping enclosure section.

For instance, the particular surfaces of the first and second telescoping enclosure section that meet when the case is closed may have protrusions and recesses or depressions that cooperate or interlock to provide a fastening. These recesses or depressions may be used to hold together the first and second telescoping enclosure sections, to enclose the inner cavity.

Preferably, the case further comprises an expansion section, configured to be arranged between the first telescoping enclosure section and the second telescoping enclosure section, in order to space apart the first telescoping enclosure section from the second telescoping enclosure section.

Preferably, the expansion section has a cavity extending therethrough, the inner cavity of the case being defined by the first telescoping enclosure section, the second telescoping enclosure section and the expansion section therebetween.

The expansion section acts to space apart the first and second telescoping enclosure sections when the case in the closed configuration. The expansion section may be a tubular portion, having a cavity therethrough. The radial shape of the tubular portion may be configured to fit the shape of the walls of the first and second telescoping enclosure section, so that the expansion section is arranged between the opposing surfaces of the first and second telescoping enclosure sections when the inner cavity is enclosed. The longitudinal length of the expansion section (perpendicular to the radial direction) determines the extent to which the volume of the inner cavity is increased when the expansion sections are in place. Different sized expansion sections can be used to change the amount by which the inner cavity is expanded.

Beneficially, this would allow items of different size to be placed in the case. In a particularly advantageous example, a first and second telescoping enclosure section can be used provide an inner cavity designed to tightly hold a single sports board. However, expansion sections could be used between the first and second telescoping enclosure section so as to make the inner cavity deeper, and suitable for containing two sports boards stacked on top of each other. In this way, the expansion sections can be selected having a particular size to provide an inner cavity having any required depth. A range of expansion sections having different sizes could be available for selection by the user, according to their needs for the dimensions of the case. For example, the size of the expansion sections can be selected to house any number of sports boards tightly, without requirement for extra packaging (such as foam loose fill, or bubble wrap).

Preferably, the expansion section comprises a plurality of sections, portions or segments. For example, the expansion sections comprise a plurality of sections, portions or segments that can be inserted between each portion of the telescoping enclosure sections. The expansion sections change the dimensions of the walls of the case. Different expansion sections (or segments of the expansion sections) may be provided between the first and third portion, the second and fourth portion, or other portions of the telescoping enclosure sections, for example.

Preferably, wherein the first telescoping enclosure section further comprises a fifth portion having an inner surface defining a cavity, the fifth portion arranged having the inner surface facing in the same direction as the inner surface of the second portion, the fifth portion arranged to overlap with the second portion, the cavity of the first, second and fifth portion together defining the open cavity for at least partially receiving the goods; and wherein the second telescoping enclosure section further comprises a sixth portion having an inner surface defining a cavity, the sixth portion arranged having the inner surface facing in the same direction as the inner surface of the fourth portion, the sixth portion arranged to overlap with the fourth portion, the cavity of the third, fourth and sixth portion together defining the open cavity for at least partially receiving the goods.

In other words, the fifth portion is arranged to overlap with the second portion so that the cavity of the second portion at least partially receives the fifth portion, the cavity of the first, second and fifth portion together defining the open cavity for at least partially receiving the goods. Furthermore, the sixth portion is arranged to overlap with the fourth portion so that the cavity of the fourth portion at least partially receives the sixth portion, the cavity of the third, fourth and sixth portion together defining the open cavity for at least partially receiving the goods. The inner surface of the fifth portion may be arranged to be parallel with the inner surface of the second portion, and the inner surface of the sixth portion may be arranged to be parallel with the inner surface of the sixth portion.

The fifth portion is arranged with respect to the second portion in a similar arrangement to the first portion with respect to the second portion. In other words, the fifth portion telescopes with the second portion. Similarly, the sixth portion is arranged with respect to the fourth portion in a similar arrangement to the third portion with respect to the fourth portion. In other words, the sixth portion telescopes with the fourth portion. This results so that each telescoping enclosure section comprises three, telescoping portions.

Preferably, wherein the size and/or dimensions of the inner cavity are adjustable by varying the amount by which the fifth portion overlaps with the second portion and by varying the amount by which the sixth portion overlaps with the fourth portion. For instance, the size and/or dimensions of the inner cavity can be adjustable by varying the amount by which the fifth portion is received within the cavity of the second portion and by varying the amount by which the sixth portion is received within the fourth portion. Advantageously, this means that the dimensions of the inner cavity within the case is highly adjustable.

It will be understood that each telescoping enclosure section can comprise four, five or any number of portions, which may each be telescoping. In this way, a case can be formed which can be arranged to have almost any length, in order to enclose almost any goods. In other words, the first and second telescoping enclosure sections may each comprise any number of portions, each overlapping each other so as to provide a telescoping effect (e.g. to change the dimensions of the cavity within the case). In a particular example, the first and third portions may join to have a closed end, the second and fourth portions may form a tube, and the fifth and sixth portions may join to have a cavity with a closed end. The skilled person will appreciate that any number of portions may be joined, making the dimensions of the case very adaptable. The end of the case may also be removable, in order to provide easier access for the case.

Preferably, the case further comprises at least one fastener for coupling the fifth portion to the second portion and/or for coupling the sixth portion to the fourth portion. The fastener may hold the fifth portion in place relative to the second portion, and the sixth portion in place relative to the fourth portion. This means that, in use, the dimensions of the case are maintained as selected by the user.

Preferably, wherein the at least one fastener is adjustable to vary the amount by which the fifth portion overlaps with the second portion, and to vary the amount by which the sixth portion overlaps with the fourth portion. The fastener may allow coupling of the portions in any configuration of the telescoping portions. All of the portions of the telescoping enclosure sections should be appropriately joined, fastened and connected.

Preferably, wherein the at least one fastener is selected from the group consisting of: a self-locking mechanism, a tie strap, a Velcro strap, a strap and buckle, Velcro, a zip, a tension clasp, a ratchet clasp, dowel pins and receiving holes. The self-locking mechanism may be any type of compression fitting mechanism, such as cooperating protrusions and recesses at the opposing surfaces of the different portions of the telescoping enclosure sections. Any suitable fastener may be used to hold the portions of the telescoping enclosure sections in place relative to each other.

Preferably, wherein the inner surface of the second portion at least partially comprises protrusions and/or depressions and the outer surface of the fifth portion at least partially comprises depressions and/or protrusions, such that the protrusions and/or depressions of the second portion are configured to interlock with the depressions and/or protrusions at the fifth portion in order to couple the second and fifth portion; and the inner surface of the fourth portion at least partially comprises protrusions and/or depressions and the outer surface of the sixth portion at least partially comprises depressions and/or protrusions, such that the protrusions and/or depressions of the fourth portion are configured to interlock with the depressions and/or protrusions at the sixth portion in order to couple the fourth and sixth portion.

In other words, protrusions and depressions or recesses in the connecting surfaces interconnect or cooperate to hold each portion in place. This can give a compression fitting or self-locking mechanism between the portions within a particular telescoping enclosure section. The projections may be rods or columns, or may be ridges or other patterns of protrusions. The recesses cooperate with the shape of the protrusions to provide a good fit. For example, protrusions such as ridges, rods or bumps could fit into valleys, holes or dimples in the opposing surface. In some cases the protrusions and recesses may also allow for surface decoration or product marking or branding.

Preferably, the case further comprises surface protrusions and/or indentations at an outer surface of the first telescoping enclosure section and the second telescoping enclosure section. The surface protrusions and/or indentations can be configured to cooperate with surface protrusions and/or indentations at the outer surface of a second case according to the invention, so that the cases can be stacked.

Preferably, the case further comprises surface protrusions and/or indentations at an outer surface of the second and/or fourth portion, configured to cooperate with surface indentations and/or protrusions at the outer surface of the fourth and/or second portion. In particular, surface patterning (including protrusions and recesses) can be arranged at the outer surface of the case, in order to cooperate with surface patterning at another case. This can be useful when the cases are stacked during transportation, for example, as it can provide extra grip between the stacked cases.

Preferably, wherein the surface protrusions and/or indentations at an outer surface of a second portion of a first case as described herein are configured to cooperate with indentations and/or surface protrusions at an outer surface of a fourth portion of a second case as described herein. In fact, the surface protrusions and/or indentations or recesses at an outer surface of any of the portions of the first and second telescoping enclosure sections can be arranged to cooperate or interlock with surface protrusions and/or indentations or recesses at an outer surface of any of the other portions of the first or second telescoping enclosure sections of another case.

Preferably, a first case of the plurality of cases is stacked on a second case of the plurality of cases such that surface protrusions and/or indentations at an outer surface of a second portion of the first case cooperate with surface indentations and/or protrusions at the outer surface of the fourth portion of the second case. Beneficially, this improves the grip between cases, and allows the cases to be stably stacked during transportation, even if the cases are arranged to have different dimensions.

Preferably, a first case of the plurality of cases is stacked on a second case of the plurality of cases such that surface protrusions and/or indentations at an outer surface of the first telescoping enclosure section of the first case cooperates with surface indentations and/or protrusions at the outer surface of the second telescoping enclosure section of the second case.

Preferably, the case further comprises a spacer element arranged at the outer surface of the first portion and/or third portion, such that the outer surface of the spacer element is level with the outer surface of the second portion or fourth portion, respectively. The spacer elements may be a panel or other element, arranged to fill any gaps between portions of the telescoping enclosure sections when cases are stacked.

Preferably, the portions are concave portions having a substantially U-shaped cross-section. For example, the portions may have a base and walls, in order to define an open cavity. The surfaces walls of the portion (which form the surface of the cavity) may have a different cross-sectional shape than the outer surfaces of the portion. For example, the inner surface may be smooth, without hard corners, but the outer surface may form walls and base which meet at corners. In another example, the inner walls may be shaped to encase or hold a particular product, but the outer surface of the portions may be shaped to improve stacking with other cases.

Preferably, the first telescoping enclosure section and the second telescoping enclosure section have a closed end distal to the open face of the open cavity. In other words, one side of the telescoping enclosure sections may be open, with the other sides of the cavity enclosed by walls of the telescoping enclosure sections.

Preferably, there is provided retainers at the inner surface of the first and second telescoping enclosure portions. For instance, the inner surface of any or all of the first, second, third, fourth or further portions of the telescoping portions may have retainers provide as lugs formed on the inner surface. The lugs may comprise protrusions or elements designed to hold the item within the case. The lugs may be 'snap' off, in order to conform to the item within the case. As an alternative, the retainers may be wedges (for instance, of foam), arranged to fit into channels formed in the walls of the case. The foam wedges may be used to retain the item within the case firmly into place.

The case (in particular, the portions of the first and second telescoping enclosure sections) may be formed of many different types of material. Preferably, the portions are formed of foam, the foam having sufficient density to hold its shape during use, whilst providing sufficient resilience to provide cushioning to the item within the case. The foam may be polypropylene, for example expanded polypropylene. The foam may be polystyrene. In some examples, the portions of the case are formed by moulding. For example, the portions of the case can be formed according to the layered structure described with reference to other aspects of the invention described above. For instance, in a particular example, there each portion may be formed using a combination of at least two polypropylene derivative materials (for example, self-reinforcing polypropylene, srPP, and expanded polypropylene foam, ePP).

In a ninth aspect there is described a case for transportation and storage of goods, comprising:
    a first and a third portion each having a recessed inner surface defining a cavity, the first and third portion arranged with the inner surfaces facing each other so as to form a first part of an telescoping enclosure section having an open end;
    a second and a fourth portion each having a recessed inner surface defining a cavity, the second and fourth portion arranged with the inner surfaces facing each other, so as to form a second part of a telescoping enclosure section having an open end; and
    the open end of the first part of the telescoping enclosure section configured to be at least partially received into the open end of the second part of the telescoping enclosure section to define an inner cavity for receiving the goods.

In a tenth aspect there is described a case for transportation and storage of goods, comprising:
    a first and a second portion, a first end of the first portion and a first end of the second portion each comprising a cross-section through the recess, the first end of the first portion arranged to overlap with the first end of the second portion so that the cavity of the second portion at least partially receives the first portion, the cavity of the first and second portion together forming a first part of an telescoping enclosure section having an open end;
    a third and a fourth portion each having a recessed inner surface defining a cavity, a first end of the third and the fourth portion each comprising a cross-section through the recess, the first end of the third portion arranged to overlap with the first end of the fourth portion so that the cavity of the fourth portion at least partially receives the third portion, the cavity of the third and fourth portion together forming a second part of an telescoping enclosure section having an open end;
    the first part of the telescoping enclosure section and the second part of the telescoping enclosure section arranged with the open ends facing each other so as to define an inner cavity between for receiving goods.

In an eleventh aspect, there is a method for assembly of case for transportation and storage of goods according to the enclosed figures. The method of assembly may comprise:
    forming a first telescoping enclosure section by arranging a first portion to overlap with a second portion, each portion having an inner surface defining a cavity, the first and second portion arranged so that the inner surfaces are facing in the same direction;
    forming a second telescoping enclosure section by arranging a third portion to overlap with a fourth portion, each portion having an inner surface defining a cavity, the third and fourth portion arranged so that the inner surfaces facing in the same direction;
    arranging the first telescoping enclosure section and the second telescoping enclosure section so that their respective inner surfaces face each other, thereby enclosing an inner cavity for receiving goods.

In a particular example, the first portion is fastened in position relative to the second portion. The third portion may be fastened in position relative to the fourth portion.

Preferable, the first and second telescoping enclosure section may be fastened together.

In a twelfth aspect there is described a case for transportation and storage of goods, the goods having a length and a width, the case comprising:
    a first portion of an enclosure defining a cavity, the cavity arranged to receive at least a first portion of the goods through an open end, and
    a second portion of an enclosure defining a cavity, the cavity arranged to receive at least a second portion of the goods through an open end, the first portion of the goods and the second portion of the good comprising the whole of the goods, and
    wherein the open end of the second portion of the enclosure is configured to be at least partially received into the open end of the first portion of the enclosure so as to be adjustable in the direction of the length of the goods.

The skilled person will understand that any of the features described in relation to the eighth aspect may also be applied to the ninth, tenth, eleventh or twelfth aspect.

Preferably in the eighth, ninth, tenth, eleventh or twelfth aspect, the portions (of the first and second telescoping enclosure sections) comprise a plurality of layers. Preferably in the eighth, ninth, tenth, eleventh or twelfth aspect, the plurality of layers comprises at least a robust outer layer and a resilient inner layer. Any number of layers could be incorporated into each portion. For example, layers of foams of differing density could be used. In some examples, a felt or material layer could be used at the innermost surface of the portions. An outer skin or branding layer could be applied to the outermost surface of each of the portions. At least part of the robust outer layer may comprise srPP and at least part of the resilient inner layer may comprise ePP.

The inner layer may be softer, and provide cushioning for the goods within the case. The inner layer may be formed of a foam material such as expanded polypropylene. The outer layer may provide greater protection than the inner layer. For example, the outer layer may be provided to prevent cuts or rips at the outer surface of the case. The outer layer may be a reinforced composite material, such self-reinforcing polypropylene. In a particular Preferably in the eighth, ninth, tenth, eleventh or twelfth aspect, the first and second telescoping enclosure sections are rigid or semi-rigid. In other words, each portion may retain its shape, even when goods are not present within the case. However, the walls of the portions may be somewhat flexible.

Preferably in any aspect, and particularly the eighth, ninth, tenth, eleventh or twelfth aspect, the case further comprises an outer sheath, enclosing the first and second part of the telescoping enclosure section. For example, this may be a wrapping, cover or skin to at least partially wrap around or enclose the portions of the first and second telescoping enclosure sections. This may provide extra protection, and also securely fasten the portions together.

Preferably any aspect, and particularly in the eighth, ninth, tenth, eleventh or twelfth aspect, goods are hobby equipment. The hobby equipment may be sports equipment, a musical instrument or photography equipment.

In a particular example, the goods may be a sports board. Preferably in the eighth, ninth, tenth, eleventh or twelfth aspect, the sports board is a surfboard, a kiteboard, a paddleboard, a windsurf board or a snowboard.

In a particular example, the goods may be cycling equipment, including a bicycle or parts of a bicycle. The goods may be one or more Hydo foils, surf fins, carbon surf fins, guns, fishing equipment, paddle covers (SUP, Kayak etc), binoculars, telescopes, video cameras, laptops, external hard drive cases or batteries. For example for batteries, there may be particular advantages, for example to maintain a stable temperature, and to avoid damage.

In a further example, a case may be provided that comprises a first and second enclosure portion. The first and second enclosure portion may each have an inner surface defining an open cavity. The first and second enclosure portion may be arranged with the inner surfaces facing each other, the open end of the first enclosure portion configured to be at least partially received into the open end of the second enclosure portion, to define a cavity therebetween for receiving the sports board.

The first and second enclosure portions may be a first and second shell portions. For example, the first and second enclosure portions being arranged so as to be telescoping. This allows the first and second enclosure portions to be moved with respect to each other, in order to change the dimensions of the cavity within the case.

In particular, such a case may be for transportation or storage of a sports board such as a surf board.

Although a number of the aspects of the invention described herein are described in relation to a sports board or a surfboard, it will be understood that any of the aspects of the invention could be applied to provide a cover, bag or case for other hobby equipment or sports equipment. For instance, each of the aspects herein could be used to provide covers, bags or cases for cycling equipment (for example, mountain bicycles or road bicycles, or their constituent parts). Cases for other hobby equipment such as photography equipment or musical instruments could be formed according to the aspects of the invention described. Cases, covers or bags according to the described aspects of the invention could be formed for a host of items such as one or more Hydo foils, surf fins, carbon surf fins, guns, fishing equipment, paddle covers (SUP, Kayak etc), binoculars, telescopes, video cameras, laptops, external hard drive cases or batteries. None of the aspects described in the present application are limited for use in a cover or case for sports boards only.

BRIEF DESCRIPTION OF THE DRAWINGS

A cover or case for goods (for example, a sports board) in accordance with aspects of the present disclosure is described, by way of example only, with reference to the following drawings, in which:

FIG. 37 shows a further cross-sectional view of the case of FIGS. 33, 34A, 34B, and 35;

FIG. 38 shows a view of the first telescoping enclosure section of the case of FIGS. 33, 34A, 34B, and 35;

FIG. 39 shows a partially exploded view of the case of FIGS. 33, 34A, and 34B;

Where appropriate, like reference numerals denote like elements in the figures. The figures are not to scale.

DETAILED DESCRIPTION OF SPECIFIC EMBODIMENTS OF THE INVENTION

Referring first to FIGS. 1A, 1B, 1C and 1D, there is a cover 10 for sports equipment. In particular, the sports equipment is a sports board that is elongate and which has a length and a width that are greater than its depth. The board may be any type of board for use in a sport, for example, a surfboard, snowboard, paddle board, windsurfing board or kiteboard.

Figure 1A:
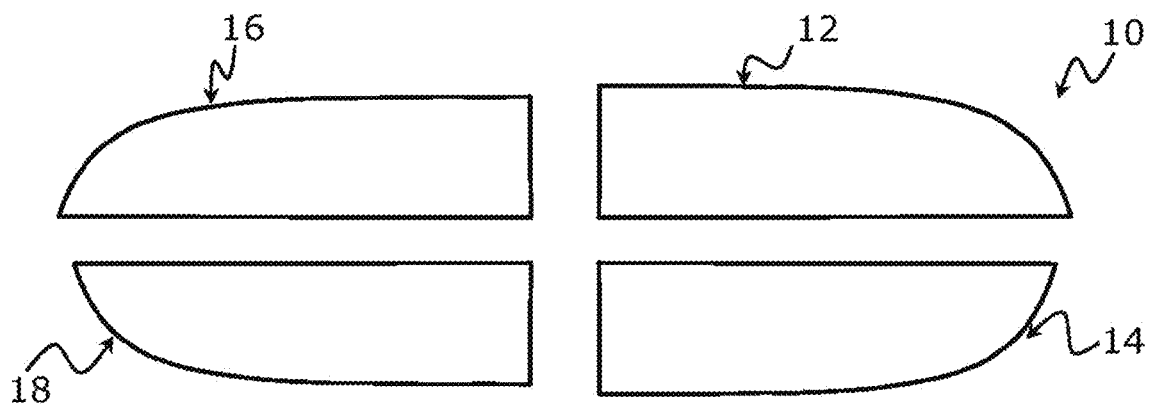
FIG. 1A is a schematic view of a first, a second, a third and a fourth concave portion when the cover is in a disassembled form.
Figure 1B:
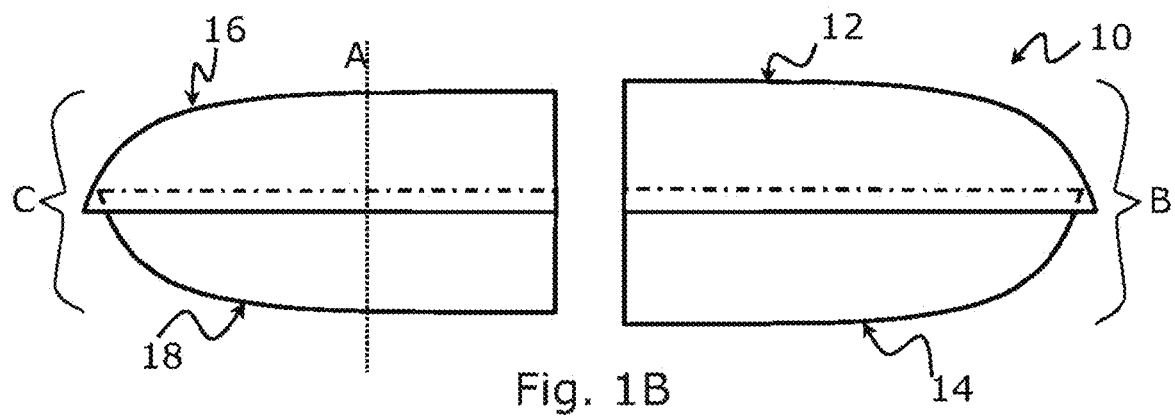
FIG. 1B is a schematic view of a part-assembled cover for a board.
Figure 1C:
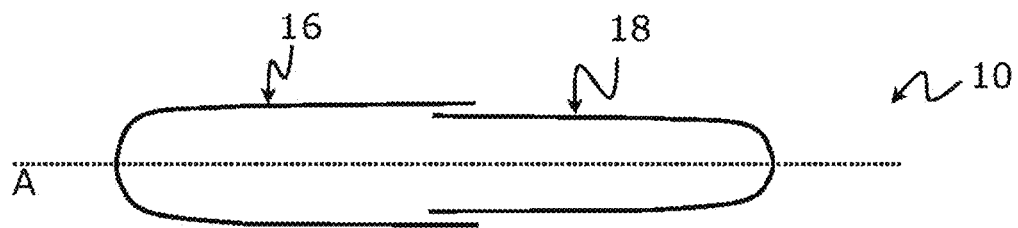
FIG. 1C is a cross-sectional view of the part-assembled cover for a board illustrated in FIG. 1B.

The cover comprises a first 12, a second 14, a third 16 and a fourth 18 concave portions. These are shown separated apart from each other in FIG. 1A in a configuration required to insert a board within the cover. Each concave portion in the example of FIGS. 1A, 1B, 1C and 1D is substantially rigid or semi-rigid (although may be somewhat flexible) and has a U-shaped cross-section. FIG. 1C illustrates the U-shaped cross-section of the third and fourth concave portions. The shape of the concave portions encapsulates or covers at least a portion of the board so as to provide a shell for that region of the board. The inner surfaces of the concave portions define a hollow cavity into which a portion of the board can be inserted. The inner surfaces of the concave portions conform to the shape of the board. In the particular example shown, each of the concave portions 12, 14, 16, 18 provides a shell to cover around one quarter of the board. However, it will be understood that different sizes and shapes of concave portion could be used.

The concave portions are configured to form a first part of an enclosure B and a second part of an enclosure C. For example, in the embodiment depicted in FIG. 1B, the first 12 and second 14 concave portions form a first part of an enclosure B to cover a first half of the board and the third and the fourth concave portions form a second part of the enclosure C to cover the second half of the board.

The first 12 and second 14 concave portions fit together or co-operate to form the first enclosure portion B. In particular, the second concave portion 12 fits partially inside the first concave portion 12 such that the open edges or the lip of the two concave portions overlap. A hollow or cavity is defined by the joined cavity of the first and second concave portion. This creates a cover configured to enclose approximately half the board.

The third 16 and fourth 18 concave portions are fitted together is a similar fashion. In other words, the open edges of the fourth concave portion 18 are received into the cavity or hollow of the third concave portion 16. The hollow of the third 16 and fourth 18 concave portion together define a cavity or volume which can receive approximately half the board. The edge of the fourth concave portion 18 fits closely within the third concave portion 16, so that their edges overlap. This is depicted in FIG. 1C, which shows a cross-sectional view along axis A of FIG. 1B.

Figure 1D:
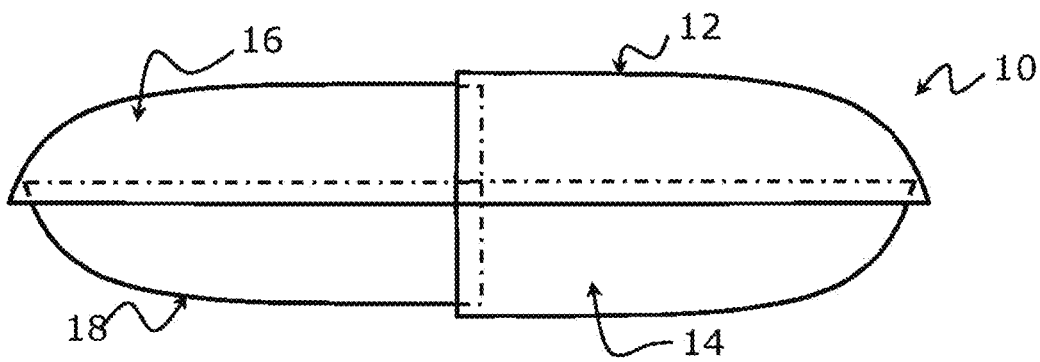
FIG. 1D is a schematic view of a fully assembled cover for a board.

The first 12 and second 14 concave portion (forming the first enclosure part B) and the third 16 and fourth 18 concave portion (forming the second enclosure part C) may be connected to form the cover 10. In other words, the two half-covers (enclosure parts B and C) may be closed around the board, so as to encapsulate the board. The cover 10 is formed by partially inserting the open end of the second enclosure part C into the open end of the first enclosure part B. As such, the open edge regions of the second enclosure part C overlap with the open edge regions of the first enclosure part B. As such, the first enclosure part B and second enclosure part C fit together to enclose a volume. The cover formed by connection of the first 12, second 14, third 16 and fourth 18 concave portions is depicted in FIG. 1D. A board can be contained in the volume (although the board is not shown in FIG. 1D).

Figure 1E:
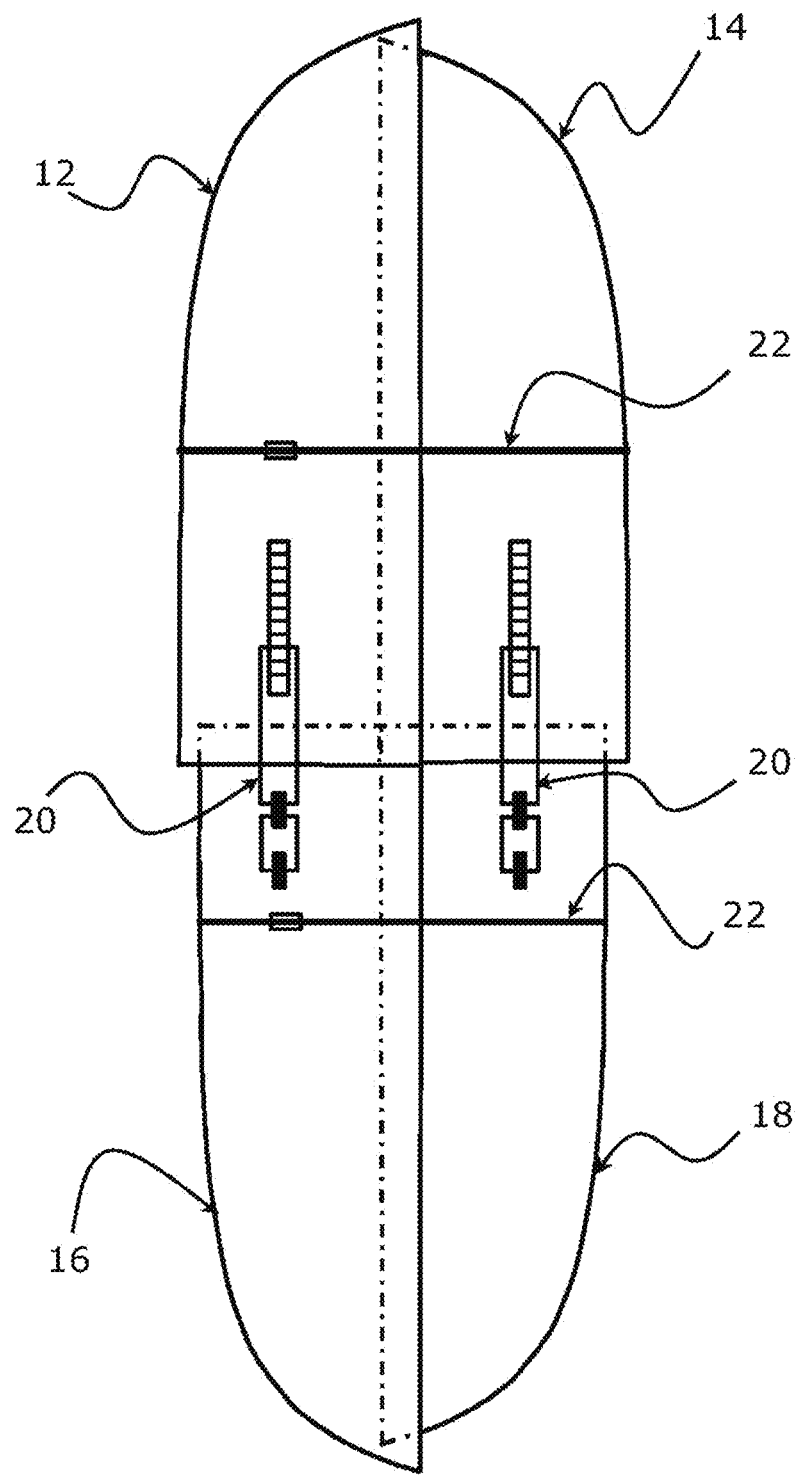
FIG. 1E is a schematic view of a further example of a fully assembled cover for a board.

In the example shown in FIG. 1E, the first 12 and second 14 concave portions are joined and secured in place using a fastener. Here the fastener is a quick release buckle and straps 22 (of the type found to secure a harness). A first strap and female portion of the buckle is attached or anchored to the first concave portion 12. A second strap and the male portion of the buckle is attached or anchored to the second concave portion 14. The male and female buckle may be connected to secure the first 12 and second 14 concave portion together. The straps 22 may be tightened at the buckle in order to pull the first 12 and second 14 concave portions together. Tightening the strap has the effect of pushing the second concave portion 14 further into the first concave portion 12, and can be used to cause the concave portions to tighten around a board contained in the volume. By this mechanism, the size and dimensions of the volume can be adjusted to fit boards of different width. Preferably, the fastener 22 is tightened until the snuggest possible fit of the concave portions around the board is achieved.

A fastener is also used to connect the third and fourth concave portions. The fastener shown in FIG. 1E is a strap 22 and quick release buckle fastener as described above in relation to the first and second portions. The buckle allows the adjustment of the fastener so that the third 16 and fourth 18 concave portion can be pulled more closely together (in other words, so that the fourth concave portion 18 is pulled further into the cavity defined by the third concave portion 16). This changes the dimensions of the cavity defined by the third 16 and fourth 18 concave portions, in order that the third 16 and fourth 18 concave portions conform to and fit more tightly around the board.

The first enclosure part B and the second enclosure part C are held securely together by a fastener. In this case, the fastener is a ratchet clip and buckle. A first part of the clip 20 is anchored at the first concave portion 12 and attached to a second part of the clip located at the third concave portion 16. A second ratchet clip 20 is anchored in the same way between the second concave portion 14 and the fourth concave portion 18. The ratchet clips 20 can be adjusted to pull the enclosure parts B and C together to tighten the cover around the board. For example, tightening the ratchet clips 20 causes the second enclosure part C to be pulled further into the first enclosure part B, in order to tighten the cover 10 lengthways around the board. As such, the cover can be adjusted to fit boards of different length. This ensures a snug fit of the cover for a particular board. A benefit of the design illustrated in FIG. 1E is that the cover 10 can be adjusted to fit tightly in a width-ways and in a length-ways direction around the board and is adaptable to many sizes and dimensions of board.

In use, the user arranges the first 12 and second 14 concave portions around a first and second quarter of the board. The first 12 and second 14 concave sections are joined using the fastener 22, which can be tightened to pull the first and second concave portion together and more closely fit around the width of the board. Next, the user arranges the third 16 and fourth 18 concave portions around the uncovered quarters of the board. These are then connected together and tightened to fit the width of the board. Finally, the first 12 and second 14 concave portion (or first enclosure part), and the third 16 and fourth 18 concave portion (or second enclosure part) are pushed together length ways in order to enclose the board. The four concave portions 12, 14, 16, 18 are held in position using the fasteners 20, 22. Once the fasteners 20, 22 are secured into place, the cover 10 effectively protects the board during transportation.

Figure 2A:
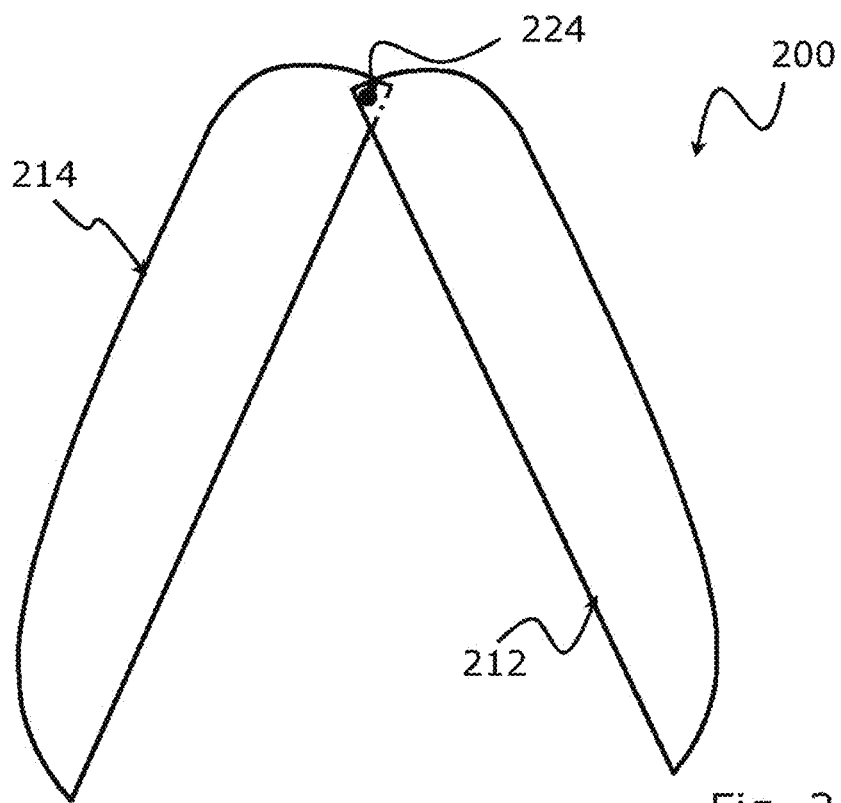
FIG. 2A is a schematic view of a further example of a cover for a board in an open position.
Figure 2B:
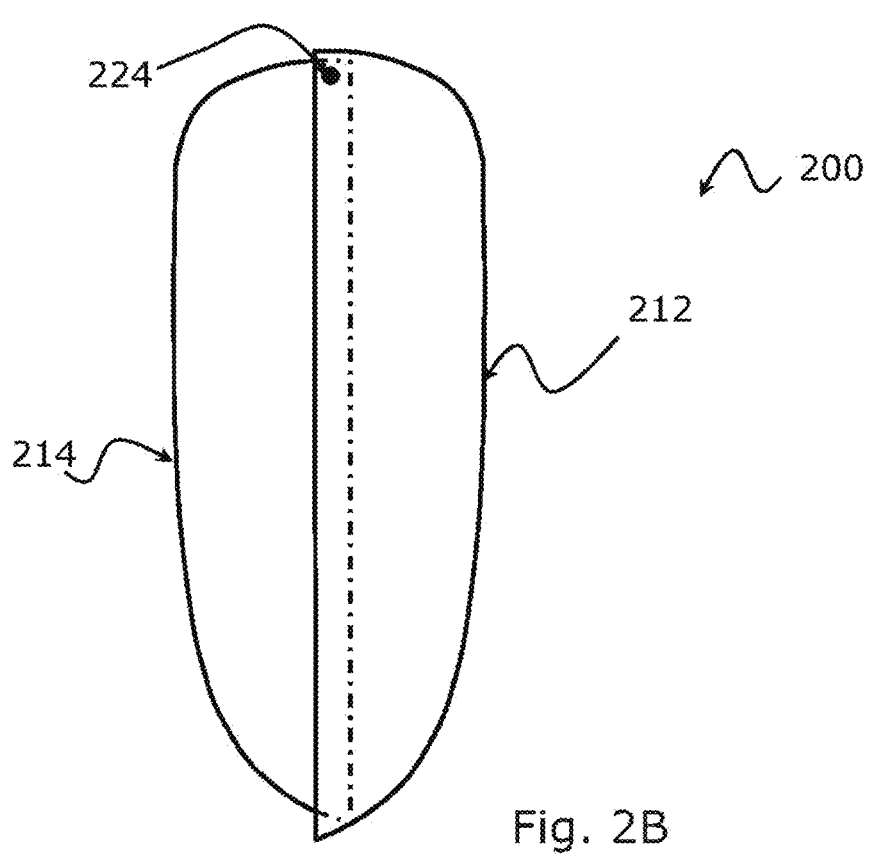
FIG. 2B is a schematic view of the example of a cover for a board shown in FIG. 2A in a closed position.

Referring next to FIG. 2A and FIG. 2B, there is shown a cover 200 for a sports board comprising a variation on the embodiment of the cover of FIG. 1A to 1E. The cover 200 comprises a first 212 and a second 214 concave shell portion. Each concave portion 212, 214 is substantially rigid. Each portion is shaped to enclose approximately the full length and half the width of the board. In other words, each concave portion 212, 214 is elongate, and has a substantially U-shaped cross-section. Each concave portion has an opening along one edge, extending the length of the concave portion. Each concave section 212, 214 is shaped so as to define a cavity which is configured to receive approximately half the volume of the board.

FIG. 2A shows the cover 200 in an open position ready to receive the board. The first 212 and second 214 concave shell portions are arranged having the open edges facing each other. In other words, the inner surfaces (or surfaces within the cavity) of the first 212 and second 214 concave shell portions face each other. The first 212 and second 214 concave shell portions are connected at one end via a pivot 224. The pivot 224 extends only through the outer walls of the shell portions 212, 214, in order that the first concave shell portion 212 may rotate relative to the second concave shell portion 214 without the pivot obstructing any portion of the volume within the concave portions.

The closed configuration of the cover 200 is shown in FIG. 2B. The first concave portion 212 is arranged to partially receive the second concave portion 214 so as to define a cavity or enclose a volume between. The size and dimensions of the cavity in the width-ways direction can be changed by causing the second concave shell portion 214 to be further received into the first concave shell portion 212. In this way, the volume or cavity can be adapted to receive different widths of board.

A fastener (not shown) is provided to secure the second concave shell portion 214 into position relative to the first concave shell portion 212. In other words, the fastener can be used to hold the shell portions into position to enclose the volume. The fastener is adjustable such that the first 212 and second 214 concave shell portions may be rotated around the pivot 224 to provide particular dimensions for the cavity.

In use, the first 212 and second 214 concave shell portions may be separated or opened by rotation around the pivot 224. This allows access to the volume within. The user may then position a board into the first concave shell portion 212, such that approximately a first half of the board is enclosed in the first concave shell portion 212 with a second half of the board is left exposed. The first 212 and second 214 concave shell portion may then be moved relative to each other by rotation around the pivot 224. In this way, the two concave shell portions 212, 214 can be moved together to enclose the board within. The first 212 and second 214 concave shell portions can be secured together by fixture of a fastener.

The first 212 and second 214 concave shell portion may be pushed more tightly together to reduce the width of the cavity in which the board is contained. This allows the cover 200 to be adjusted to suit the width of the board. As such, a tight fit can be provided for the cover 200 around the board, and so the board is less prone to movement within the cover or damage during use.

Figure 3:
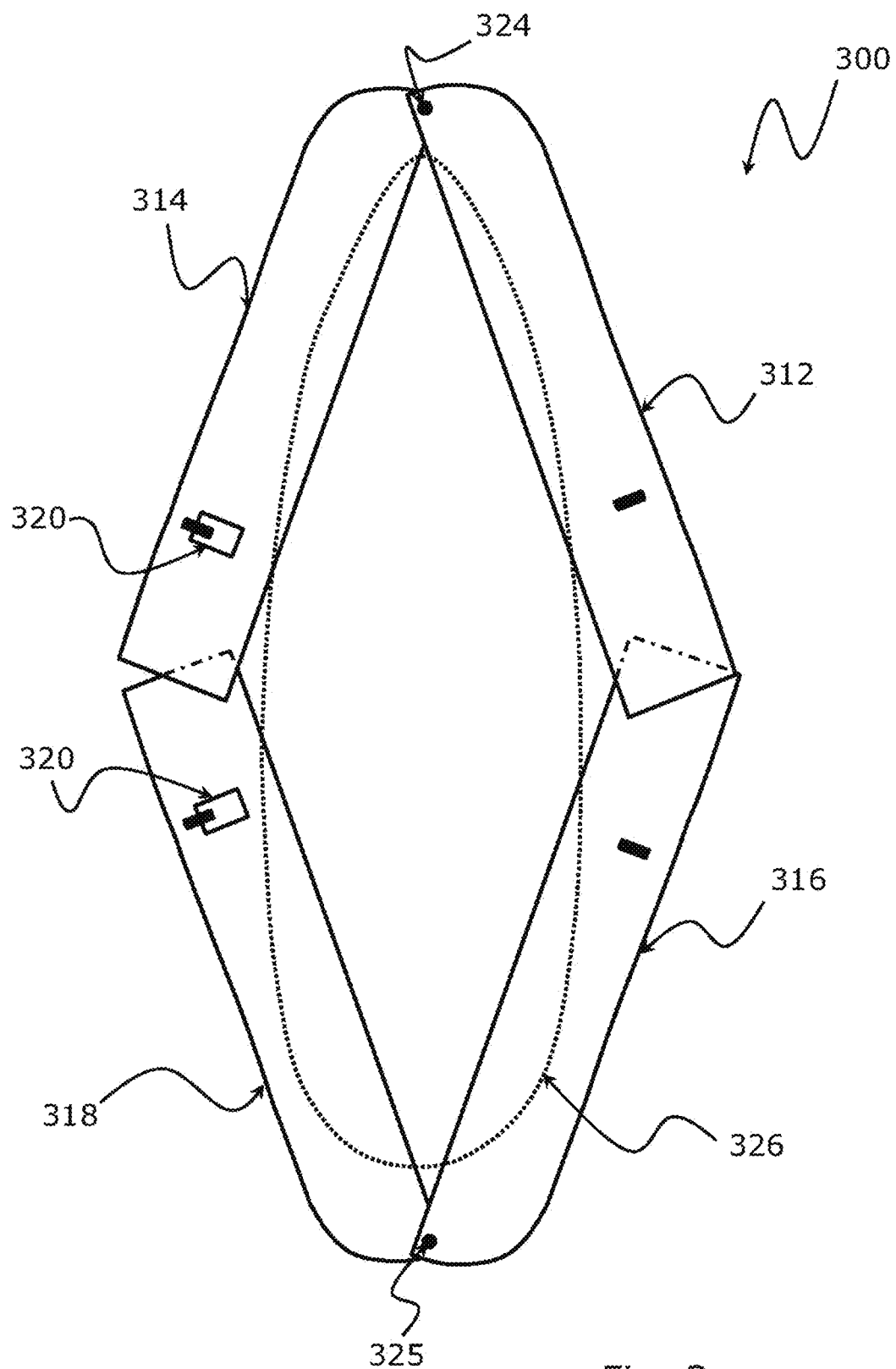
FIG. 3 is a schematic view of a further example of a cover for a board.

Referring next to FIG. 3, a further embodiment of the cover 300 is depicted. The cover is partially open, and is in a configuration used for insertion of the board.

In this embodiment, there is a first 312 and second 314 concave shell portion similar to that described above in relation to the embodiment of FIGS. 2A and 2B. However, in the embodiment of FIG. 3, the first 312 and second 314 concave shell portions enclose only half the length of a sports board. The outline of the sports board 326 is shown in FIG. 3, although this is not intended to form part of the invention. A corresponding third 316 and fourth 318 concave shell portion is provided to enclose the second half of the length of the board 326. The third 316 and fourth 318 concave shell portions fit together in the same manner as the first 312 and second 314 concave shell portions. In other words, the fourth concave shell portion 318 may be closed together to form a cavity to receive the second half to the board. The open edge of the fourth concave portion is received into a cavity defined by the third concave shell portion 316, such that regions near to the open edges of the third 316 and fourth 218 concave portions overlap. The third 316 and fourth 318 concave shell portions are connected via a pivot 325 at one end. The dimensions of the cavity formed between the third 316 and fourth 318 concave shell portion can be adjusted by rotation of the two portions around the pivot 325 in order to bring the two shell portions closer together. The third 316 and fourth 318 concave shell portion may be secured relative to each other using a fastener 320. The fastener 320 may be any type of catch, buckle, strap, or other fastener.

To close the cover in order to encapsulate the board, the third 316 and fourth 318 concave shell portions are received by the first 312 and second 314 concave shell portions. Specifically, the open edges of the third 316 and fourth 318 concave portion are received into the cavity defined by the first 312 and second 314 concave portion such that the regions of each concave portions adjacent the open edges overlap. When arranged appropriately, the first 312, second 314, third 316 and fourth 318 concave portions define a volume to receive a board 326. The two pivoted pairs of concave portions 312, 314, 316, 318 close and interlock with each other to enclose the volume using a 'scissor' action.

In use, each of the first 312, second 314, third 316 and fourth 318 concave portions is arranged around approximately one quarter of the board. The first 312 and second 314 concave portions are closed together by rotation around a pivot 324 in order to enclose approximately half the board. Likewise, the third 316 and fourth 318 concave portions are respectively rotated around a pivot 325, in order to enclose approximately half the board. The four concave portions 312, 314, 316, 318 may then be pushed together to entirely enclose the board.

By closing the first 312 and second 314 and also the third 316 and fourth 318 concave portions more tightly around the pivot 324, the cover can be adjusted to suit the width of the board. Furthermore, by moving the first 312 and second 314 concave portions relative to the third 316 and fourth 318 concave shell portions (so as to move each pair towards or apart from each other), the cover can be adjusted to suit the length of the board. Once the concave shell portions 312, 314, 316, 318 have been adjusted to closely fit the board, the shell portions can be secured into position using fasteners 320. The fasteners shown in FIG. 3 are clips and buckles which secure the concave shell portions tightly into position. In the example of FIG. 3, interlocking teeth (not shown) at the overlapping surfaces secure the first 312 and second 314 concave shell portions relative to the third 316 and fourth 318 concave portions. Nevertheless, the skilled person will appreciate that other types of fastener could be used. Each fastener is adjustable and so can be moved to accommodate different positions of each concave shell portion 312, 314, 316, 318 or each pair of concave portions relative to each other.

Figure 4:
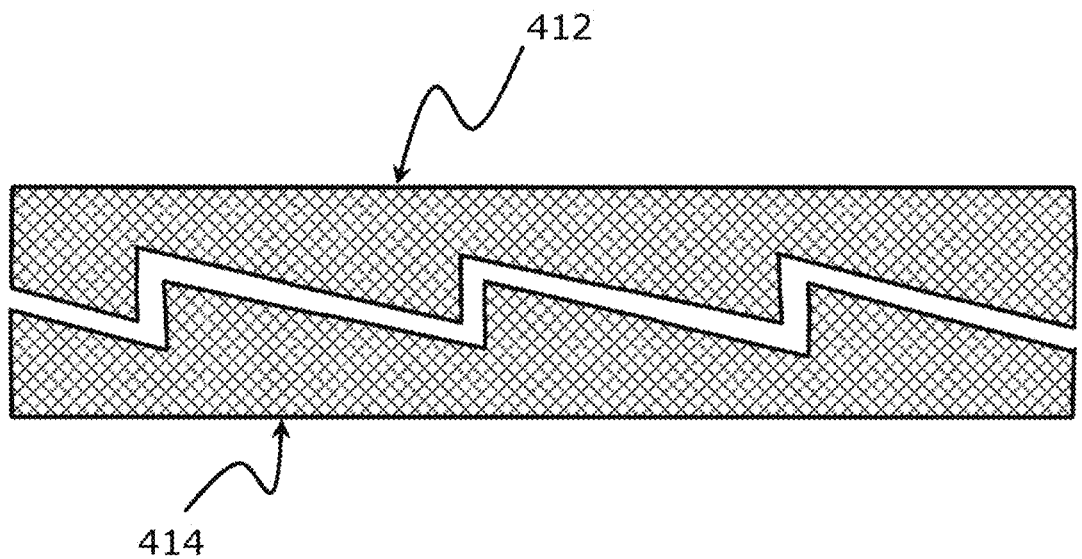
FIG. 4 is a cross-sectional view of the overlapping surfaces of two concave portions having interlocking teeth.

FIG. 4 illustrates an overlapping edge portion of a first 412 and a second 414 concave shell portion. The outer surface of the second 414 (or inner) shell portion comprises teeth. The inner surface of the first 412 (or outer) shell portion also comprises teeth. The teeth are arranged to cooperate with each other in order to interlock. The teeth have a first sloped side, and a second stepped side. As such, the teeth can be more easily moved with respect to one another in a first direction (from right to left in FIG. 4) than in a second direction. In a first direction the teeth side across each other using the sloped "ramp" portion of each tooth. However, if moved in the opposite direction (from left to right in FIG. 4) the steps of the teeth are abutting which prevents the two shell portions 412, 414 moving apart. As such, the teeth provide a fastening mechanism to hold the concave shell portions in place.

As will be understood by the person skilled in the art, a similar configuration could be used in respect of any pair of overlapping concave portions, in order to secure the concave portions more tightly around the board.

Figure 5:
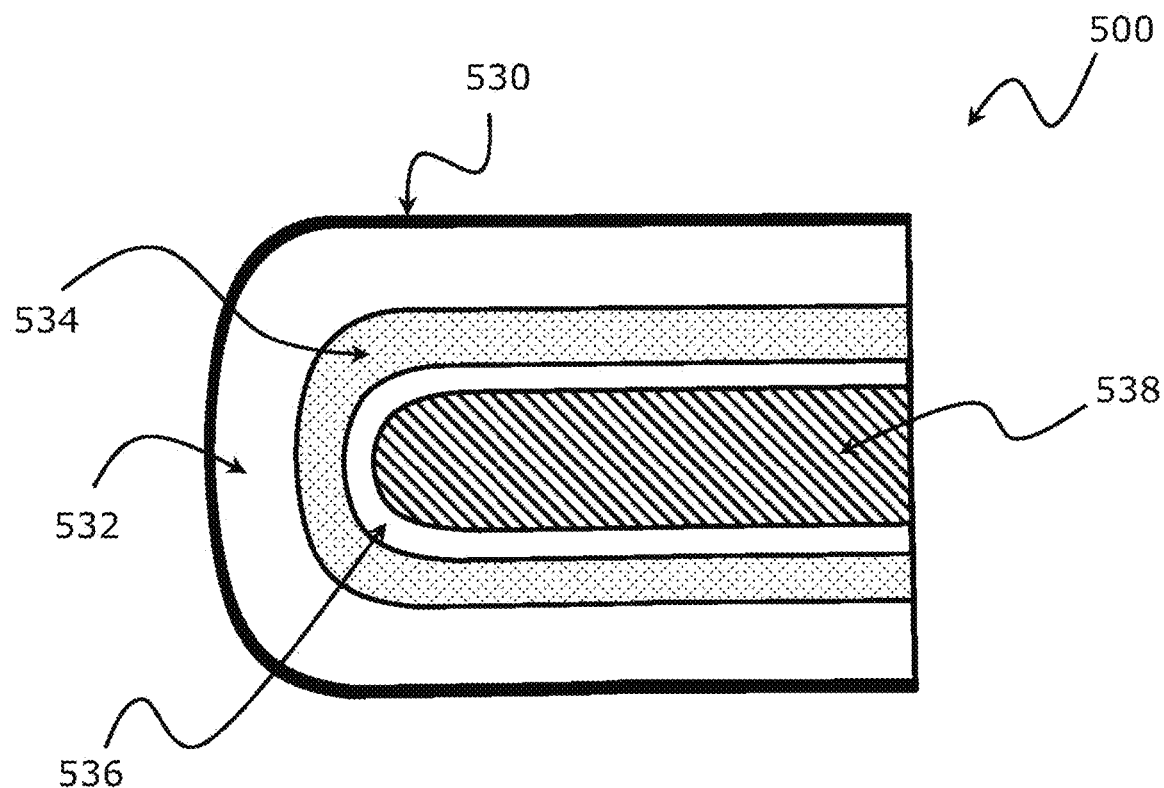
FIG. 5 is a cross-sectional view of a concave portion having a plurality of layers.

FIG. 5 shows a cross-section of an example concave shell portion 500. The concave portion includes a plurality of layers. An outer layer 530 comprises a robust outer shell. For example, the outer layer 530 may be comprised of self-reinforcing PolyPropylene (srPP) or another reinforced material. The outer layer 530 is designed to be high-strength, and yet be lightweight and as thin as possible.

Within the cavity of the outer shell 530, at least one resilient layer is provided. In the example of FIG. 5, the inner layers include a dense foam layer 532, together with a medium resilience foam layer 534 and a softer and more compressible inner wadding material layer 536. The innermost material layer 536 is malleable and conformable to the shape of a board 538 held within the cover. As such, the inner layers 532, 534, 536 cushion and hold the board in place. In one example, at least one of the inner layers 532, 534 and 536 comprise ePP. In another example, more than one of these layers comprise ePP of different densities.

Although FIG. 5 shows a concave portion having a plurality of layers, it will be understood that the concave portions described herein do not necessarily comprise a plurality of layers. Instead, the concave portions may be formed having walls of a single material, or a single layer. Alternatively, the concave portions may comprise walls formed of a plurality of layers of the same material. For example, the concave portions may comprise one layer, two layers or more than two layers of a reinforced material such as srPP.

Figure 6A:
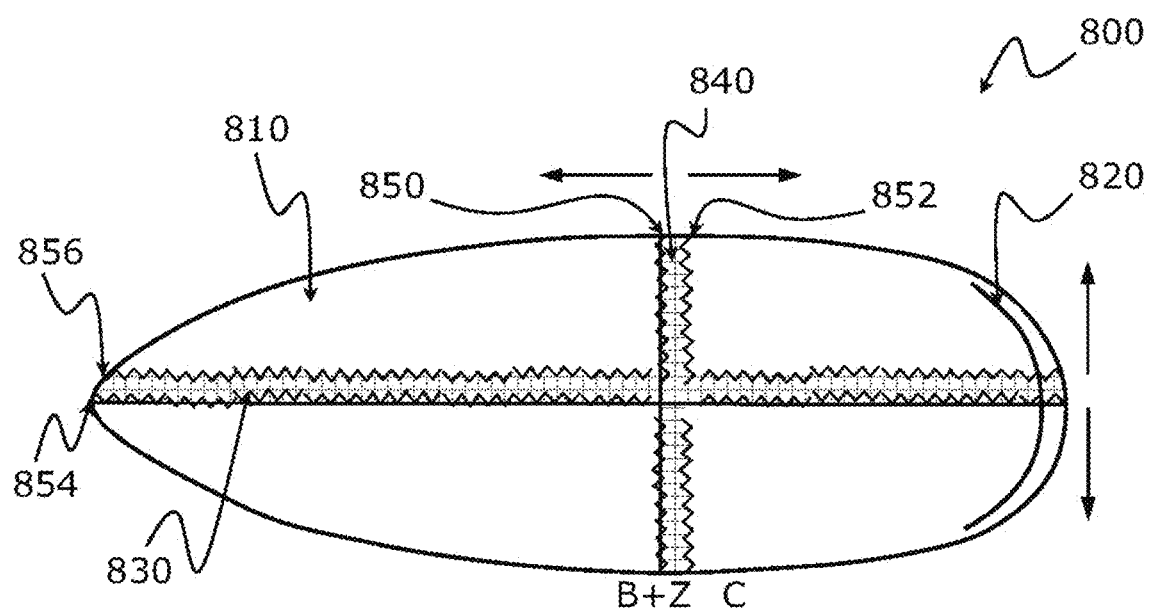
FIG. 6A is a plan view of a cover for a sports board according to a further example.

FIG. 6A shows a further example of a cover for a sports board which can be adjusted in two dimensions (in the direction of the length and width of the board). The board cover 800 may form a semi-rigid shell or enclosure 810 in which a sports board can be contained. A closable opening 820 provides an entrance to the cavity within the enclosure 810. The board can be inserted into the enclosure 810 through the closable opening 820. In this case, the closable opening 820 is positioned at one end of the enclosure 810 and is sealed using a zip.

A first expandable panel 840 is arranged extending across the enclosure 810 in the direction of the width of a sports board within the enclosure. In this case, the expandable panel 840 comprises a portion of material that may be folded, pleated or corrugated. For example, as shown in a cross-sectional view in FIG. 6B, the portion of material forms a concertina containing three pleats 816 when the expandable panel 840 is retracted or pulled together. By gathering or drawing together the material (for example by folding together the pleats) the expandable panel 840 may be reduced so that the distance between one side 812 of the expandable panel and the other 814 is decreased. As a result the overall dimensions of the enclosure 810 (and accordingly the dimensions of the cavity within the enclosure 810) are changed. Alternatively, the pleats 816 can be expanded or smoothed out in order to increase the distance between one side 812 of the expandable panel and the other 814 (as well as the dimensions of the enclosed cavity).

Figure 6B:
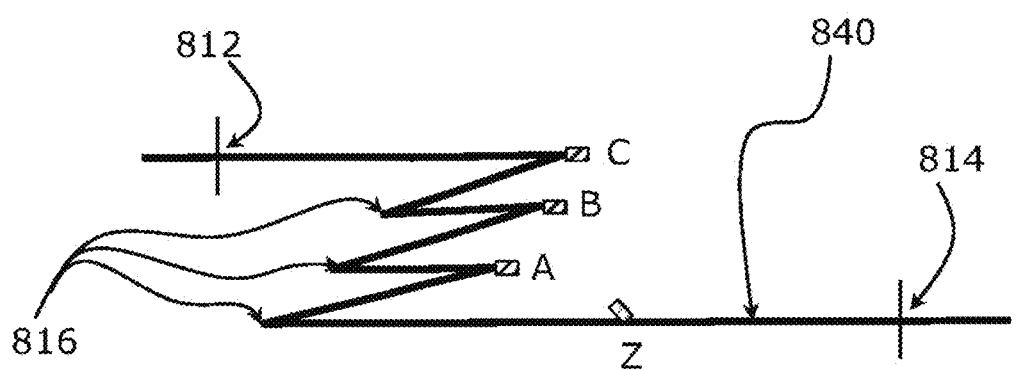
FIG. 6B is a cross-sectional view of a portion of the cover for a sports board according to the example of FIG. 6A.

The expandable panel 840 further comprises a fastener, in this case a zip. A first half of the zip 852 is arranged on the surface of the enclosure 810 at the edge of the expandable panel so as to be positioned to mate or couple with zips at the ridge of each pleat 850. For example, as shown in FIG. 6B, one half of a zip Z is arranged to couple with either zip A, B or C which are each attached at an edge of a pleat or corrugation in the expandable panel 840. By coupling zip Z with either of zip A, B or C, the width of the expandable panel 840 is adjusted. The expandable panel 840 is maintained at its minimum size when zip Z is attached to zip C. The maximum expansion of the expandable panel 840 is provided when none of the zips are coupled and the folds in the expandable panel are smoothed out. Coupling zip Z to zip A or zip B provides an intermediate width for the expandable panel 840. Each change in the dimensions of the expandable panel 840 results in a change of the dimensions of the cavity defined by the enclosure 810.

In the example illustrated at FIG. 6A, zip Z is coupled with zip B. As a result, the expandable panel 840 is maintained so as to have two folds, but the fold at which zip C is mounted is smoothed out. Accordingly, the overall length of the enclosure 810 (and the internal cavity) is reduced from its maximum length by the length of material between zip Z and zip B.

A similar, second expandable panel 830 is arranged at the enclosure 810 to extend along the direction of the length of a board received within the enclosure 810. This expandable panel 830 is equivalent to the expandable panel 840 extending across the width of the enclosure. As before, the second expandable panel 830 comprises a section of material which can be corrugated or pleated in the manner demonstrated in FIG. 6B. When the expandable panel 830 is arranged so that the pleats are extended or flattened out, the expandable panel 830 provides a maximum extension to the width of the enclosure 810. However, when the pleats or corrugations are gathered or folded, the expandable panel 830 reduces the width of the enclosure 810 to a minimum.

As before, the expandable panel 830 extending in the direction of the length of a board includes a first zip 856 which is arranged to couple to a plurality of other zips 854. In the same manner as shown in the example of FIG. 6B, the plurality of other zips may be arranged spaced at intervals connected to the ridge or fold of each pleat. As a result, coupling the first zip to each of the plurality of zips provides a number of different widths for the enclosure 810 as a result of the number of folds gathered at the expandable panel 830.

In use, the user can arrange the zips A, B, C, Z at the first 840 and second 830 expandable panel to select an appropriate length and width for the cover 800 according to the sports board to be enclosed. For example, a board having a longer length but a narrower width can be accommodated by connecting zips Z and C at the expandable panel 830 extending lengthways at the enclosure 810, whilst not coupling any of the zips at the expandable panel 840 extending widthways at the enclosure 810.

Figure 7A:
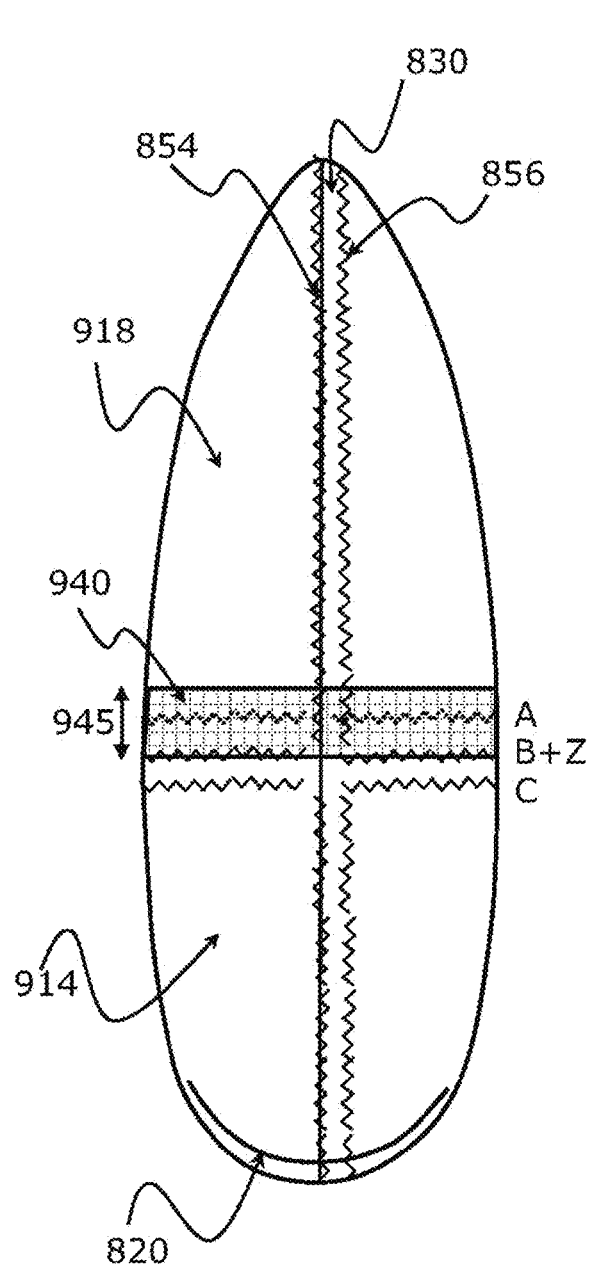
FIG. 7A is a plan view of a cover for a sports board according to a still further example.
Figure 7B:
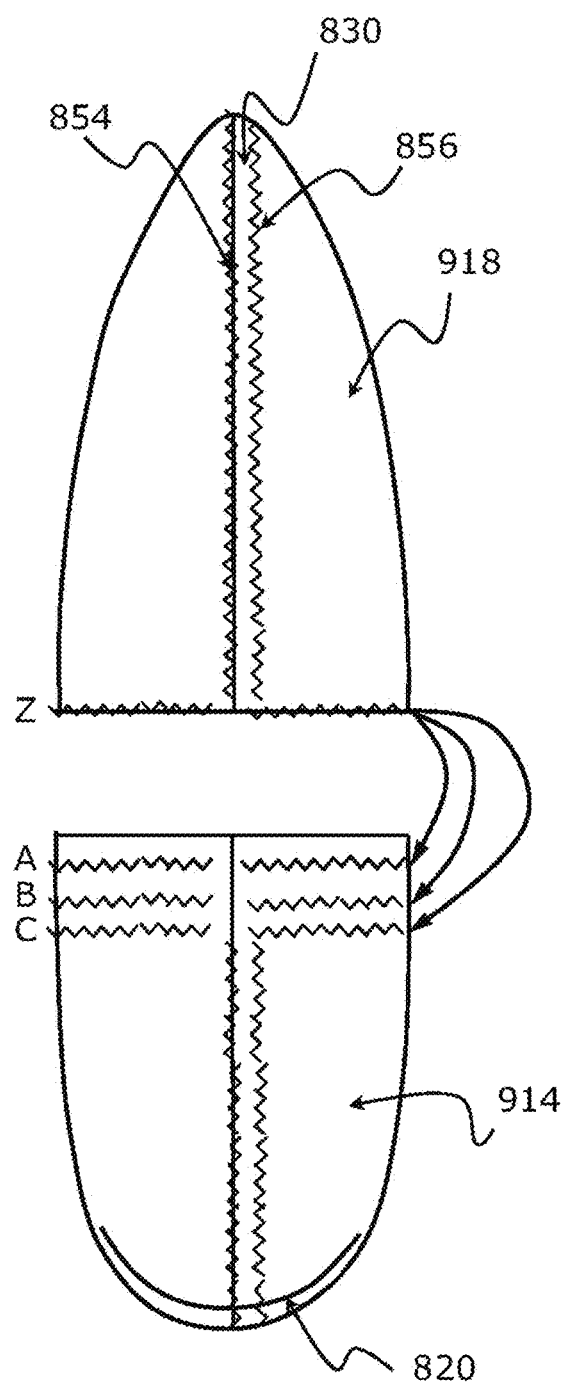
FIG. 7B is an exploded view of the cover for a sports board according to the example of FIG. 7A.

FIGS. 7A and 7B illustrate a further example of the cover for a sports board. In this example, an expandable panel 830 is arranged in the longitudinal direction of the enclosure 810 in the manner described above in relation to FIGS. 6A and 6B. However, in this example, the expandable panel 940 arranged extending across the width of the enclosure 810 does not comprise the corrugated or concertina section described above in relation to FIGS. 6A and 6B. Instead, the expandable panel 940 in the widthways direction is an overlapping section.

In FIGS. 7A and 7B, the enclosure 810 is comprised of two shell portions 914, 918. The first and second shell portions 914, 918 are shaped having a cavity to receive slightly more than half a sports board. Each shell portion 914, 918 comprises an expandable panel 830 arranged in the direction of the length of the board as described above.

To form the enclosure, the two shell portions 914, 918 are arranged having their inner surfaces facing, such that a first shell portion 914 is receive within the cavity of the second shell portion 918. In this way, the cavities within the first 914 and second 918 shell portion join to provide a cavity to contain the board. When the first shell portion 914 is received within the cavity of the second shell portion 918, the edge regions at the open sides of the first and second shell portions overlap 945. By inserting the first shell portion 914 in to the second shell portion 918 by a greater extent, the overlapping region 945 is increased and the overall size of the cavity within the enclosure 810 is reduced. In this way the overlapping portion 945 represents the expandable panel 940.

The overlapping portion further comprises a plurality of zips A, B, C, Z. A first zip fastener comprising a first set of interlocking teeth Z arranged at the open edge of the second shell portion 918 which surrounds the edge region of the first shell portion 914. A number of zip fasteners A, B, C having teeth for interlocking with the first zip fastener Z are arranged at intervals in the edge region of the first shell portion 914. The plurality of zips A, B, C are each arranged to couple with the first zip Z, so as to maintain the first shell portion 914 in position relative to the second shell portion 918. In this way, the extent of the overlap 945 of the first and second shell portion can be maintained.

In use, the user adjusts the overlap 945 of the first 914 and second 918 shell portion by moving the first 914 and second 918 shell portions relative to each other, for instance by pushing the two shell portions 914, 918 further together to increase the region of overlap 945. The user selects a zip from the plurality of zips A, B, C to which the first zip Z may be coupled. The zip A, B, C may be selected in order to set the overlap of the first 914 and second 918 shell portion in a suitable position to provide a cavity to receive a particular length of sports board.

Figure 8A:
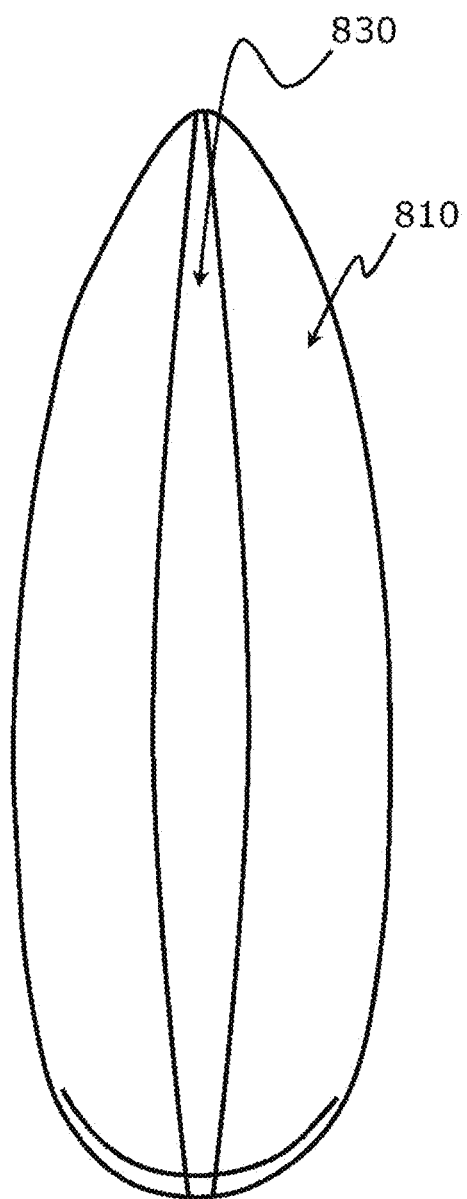
FIG. 8A is a schematic view of a still further example of a cover for a sports board.
Figure 8B:
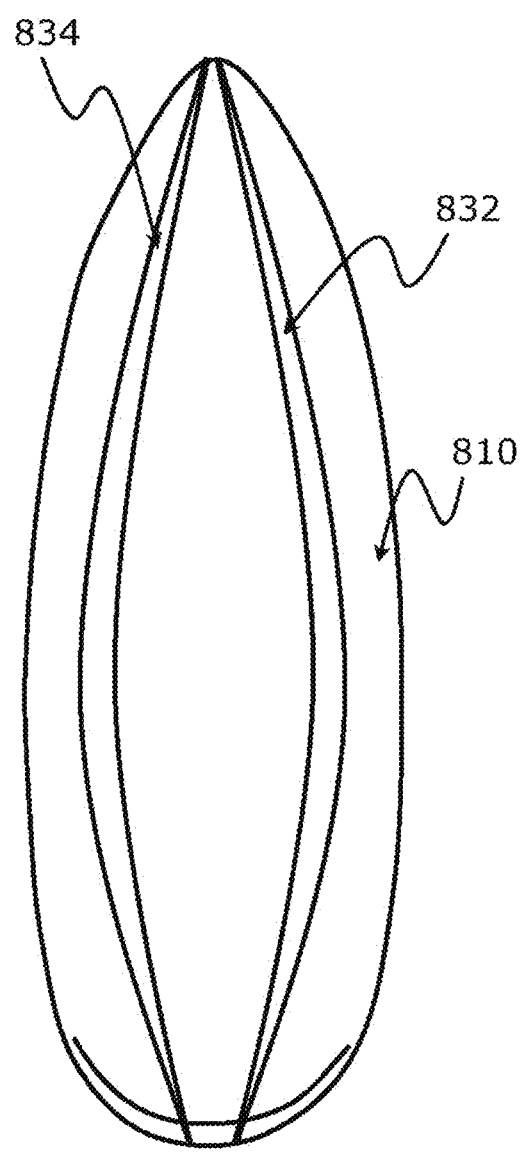
FIG. 8B is a schematic view of another example of a cover for a sports board.

FIGS. 8A and 8B show two further examples for a cover for a sports board having an adjustable size. FIGS. 8A and 8B show a cover in which the enclosure 810 comprises expandable panels arranged in the longitudinal direction of the board. In the illustrated embodiments, an expandable panel is provided in only one dimension. In FIG. 8A, there is a single expandable panel 830. However, more than one expandable panel 832, 834 may be included at the enclosure as shown in FIG. 8B. Advantageously, including more than one expandable panel arranged in the same direction allows additional flexibility in the expansion of the dimensions of the cover.

Although FIG. 8B shows two expandable panels 832, 834 both arranged in the longitudinal direction in respect of the board, the enclosure 810 could instead comprise two or more expandable panels arranged to extend across the width of the cover. In a further example, the enclosure may comprise both two or more expandable panels in the longitudinal direction and in the width-ways directions.

In the examples of FIGS. 8A and 8B, the expandable panels may be formed of a panel having corrugations and pleats as shown in FIG. 6B. The expandable panels also may comprise associated fasteners.

In the examples of FIGS. 6A, 6B, 7A, 7B, 8A and 8B the expandable panel is at least partially formed of flexible material. This allows the expandable panel to be gathered, pleated or folded in order to expand or retract the expandable panel. However, the remaining portions of the enclosure may be formed of a rigid, semi-rigid or flexible protective material. For example, the enclosure may comprise four concave portions having a U-shaped cross-section that each encloses approximately a quarter of the board. The four concave portions may then be joined by the more flexible expandable panels. Alternatively, the whole of the enclosure may comprise a more flexible material cover which is not rigid (for example, in the manner of a soft-shell case), with the described expansion panels formed therein. However, whether the enclosure is comprised of rigid shell portions or a softer casing, the enclosure provides a durable and robust protective layer enclosing the sports board.

Furthermore, although the examples of FIGS. 6A, 6B, 7A, 7B, 8A and 8B show a zipper or zip fastener to secure the expandable panel in position, other types of fastener may be used. For example, Velcro may be used, such that the "hook" portion of the Velcro is secured along the edge of each pleat or fold of the concertina, to be coupled to the "loop" portion of the Velcro arranged elsewhere at the expandable panel. Alternatively, straps, or buckles and straps may be arranged to encircle the enclosure to hold the expandable panel in a folded formation. In a further alternative, a strap and buckle can be provided wherein the buckle is connected to the enclosure at a first side of the expandable panel, and the strap is connected to the enclosure at a second side of the expandable panel, opposite the first side. Coupling of the strap and buckle and subsequent tightening of the strap allows the corrugated section of the expandable panel to be drawn together. The corrugated section of the expandable panel may naturally form folds as the fastener is pulled together, rather than having a predetermined position for the folds. As such, a strap and buckle configuration may be useful to allow greater flexibility in the change of size of the dimensions of the cover. In particular, the fastener can be tightened at a strap and buckle until the expandable panel is retracted to tightly conform to the length and/or width of the sports board.

Use of srPP

Self-reinforcing PolyPropylene (srPP) fabric is a particularly advantageous material for use in a bag or cover for sports equipment. In particular, the material is both high-strength and lightweight. The material may be layered for additional strength, or may be used as panels of a single layer of material. A particular example of srPP is Armordon™.

Figure 9:
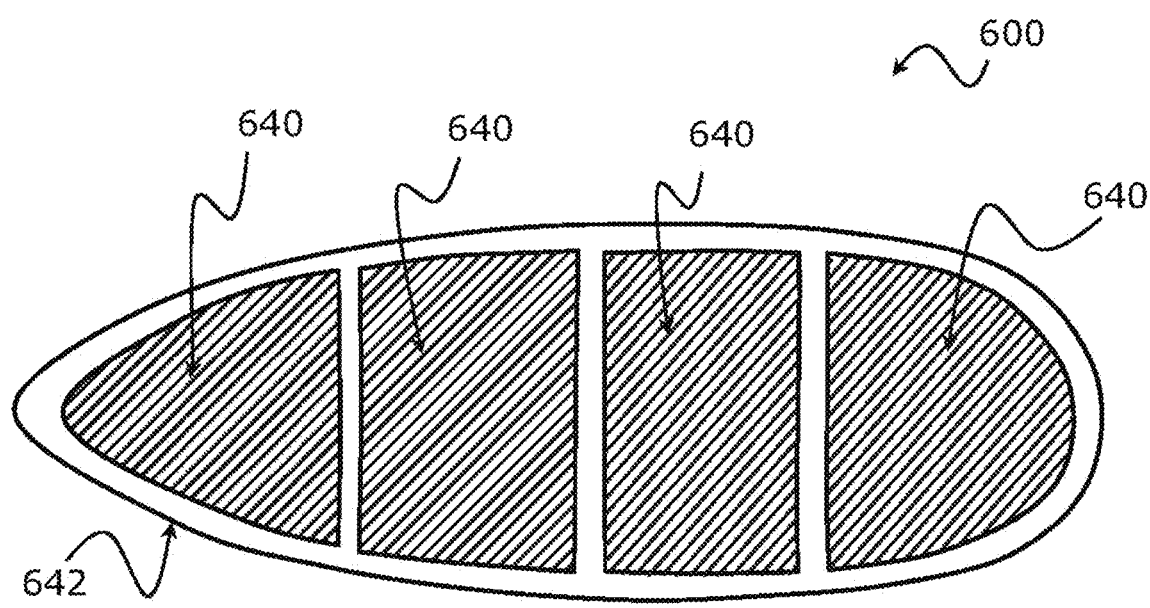
FIG. 9 is a plan view of a cover for a sports board incorporating srPP panels.

FIG. 9 illustrates a board cover 600 including srPP panels. The panels of srPP 640 are sown into the body of the board cover 600. The skilled person will understand that although a board cover is shown in the example of FIG. 9, covers for other types of sports equipment may comprise the same features and attributes.

FIG. 9 shows a board cover including four srPP panels 640 arranged within one face of the board cover 600. The skilled person will understand that the opposing surface of the board cover 600 includes a similar arrangement of srPP panels 640. Furthermore, srPP panels 640 can be included in various configurations in the side walls of the board cover. Alternative embodiments may include a greater or fewer number of srPP panels 640 arranged within the walls of the board cover 600. In some embodiments, a single srPP panel or layer may extend substantially across the full area of the face of the board cover 600.

Figure 10A:
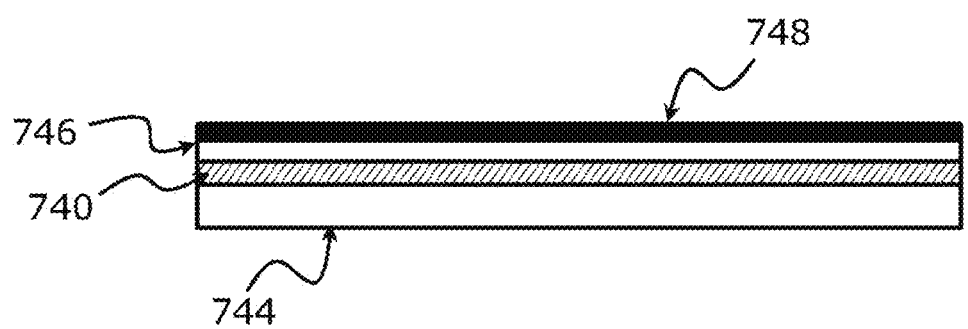
FIG. 10A is a cross-sectional view of a wall of a cover incorporating srPP.

As shown in FIG. 10A, in a particular embodiment the board cover comprises an outer layer 748 and a plurality of inner layers (for example including a thin dense foam layer 746 and an innermost soft material wadding layer 744). In the illustrated example, the outer layer 748 is a fabric cover providing an attractive appearance. The srPP layer 740 is arranged directly inside the outermost layer. An innermost layer 744 is resilient and provides a cushioning for the board, and a dense foam layer 746 provides support and structural integrity to the cover without adding to much additional weight. The inner layer 744 may be especially deformable, in order that the board is held securely in position and protected from damage. The resilient, deformable layers 744 and 746 may be formed of ePP.

The srPP layer 740 is arranged in regions of the cover between the inner and outer layers. The srPP layers or panels 740 may be retrofitted to the cover 600 (in other words, fitted within an existing board cover) or may be fitted at the time of manufacture of the board cover 600. The srPP panels 740 provide a high-strength layer or barrier, which effectively protects the board from damage.

The features of the board cover of FIG. 10A may be applied to covers for other types of hobby equipment.

Figure 10B:
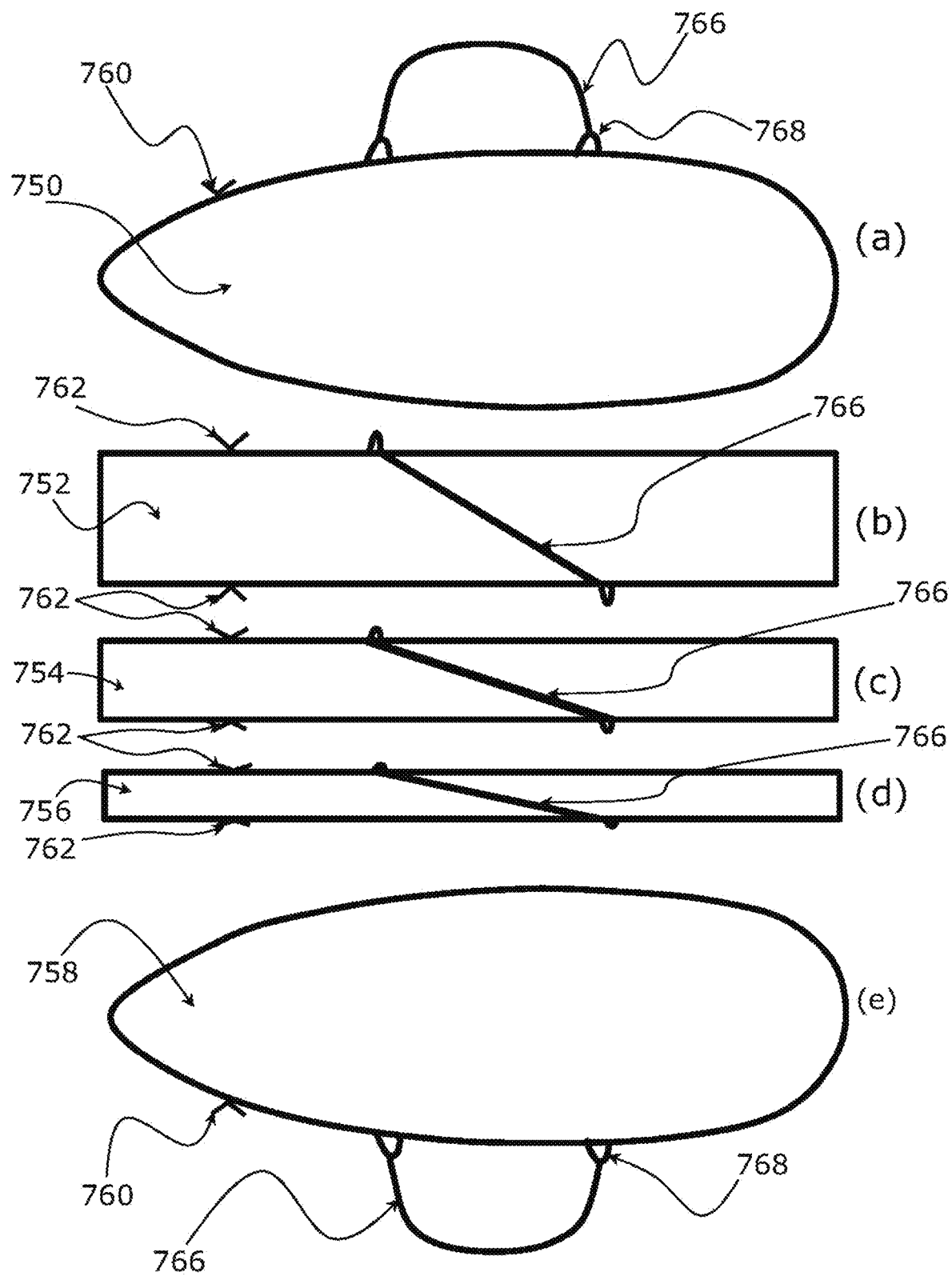
FIG. 10B is a schematic view of an embodiment of a case or cover incorporating srPP.

FIG. 10B shows a case or cover for sports equipment including interchangeable rail sections or side panels. In this particular example, the case may be for sports boards, but a similar configuration of case could be used for cases for other types of equipment.

FIG. 10B(a) shows a first 'bottom' panel 750 of the case. FIGS. 10B(b), (c) and (d) each show different interchangeable side panels 752, 754, 756 of different sizes. FIG. 10B(e) shows a 'top' panel 758. The outer edges of each of the top and bottom panel comprise zips 760, arranged around the full perimeter or circumferential edge of each of the top and bottom panels. These zips can connect with zips 762 at the top and bottom edge of each of the interchangeable side panels 752, 754, 756. Zipping together the top 758 and bottom 750 panel with the selected interchangeable side panel 752, 754, 756 forms the case or cover, having an inner cavity therein. A perspective view of the cover or case having all of the top 758, bottom 750 and at least one of the side panels 756 joined is shown as FIG. 10C.

Use of the interchangeable side panels or rail sections 752, 754, 756 allows the user to change the depth of the bag and its internal cavity, so that a different number of items, or a different size of item can be placed within. In the particular example of a board bag shown in FIG. 10B, the user can choose the depth of side panel or rail band 752, 754, 756 for the particular amount of boards to be packed within the case, i.e. 2, 4, 6 boards. It will be understood that more than one interchangeable side panel 752, 754, 756 could be used in conjunction with the top 758 and bottom 750 panels.

Each of the top 758, bottom 750 and side 752, 754, 756 panels may comprise a combination of ePP or srPP. Although to provide the most robust protection all of the panels will be formed using the superior combination of srPP and ePP, some of the panels may not contain these materials (for example, to save weight, or costs). Use of the interchangeable side panels or rail sections 752, 754, 756 also allows the user to choose how much protection they require around the contents, and how much money the user is willing to spend on selecting an ePP and srPP top, bottom and side rails, or any combination of these. For example, this allows the user to mix up the different types of panel to save weight and only protect where they feels the items within the case (such as sports boards) are vulnerable.

Figure 10C:
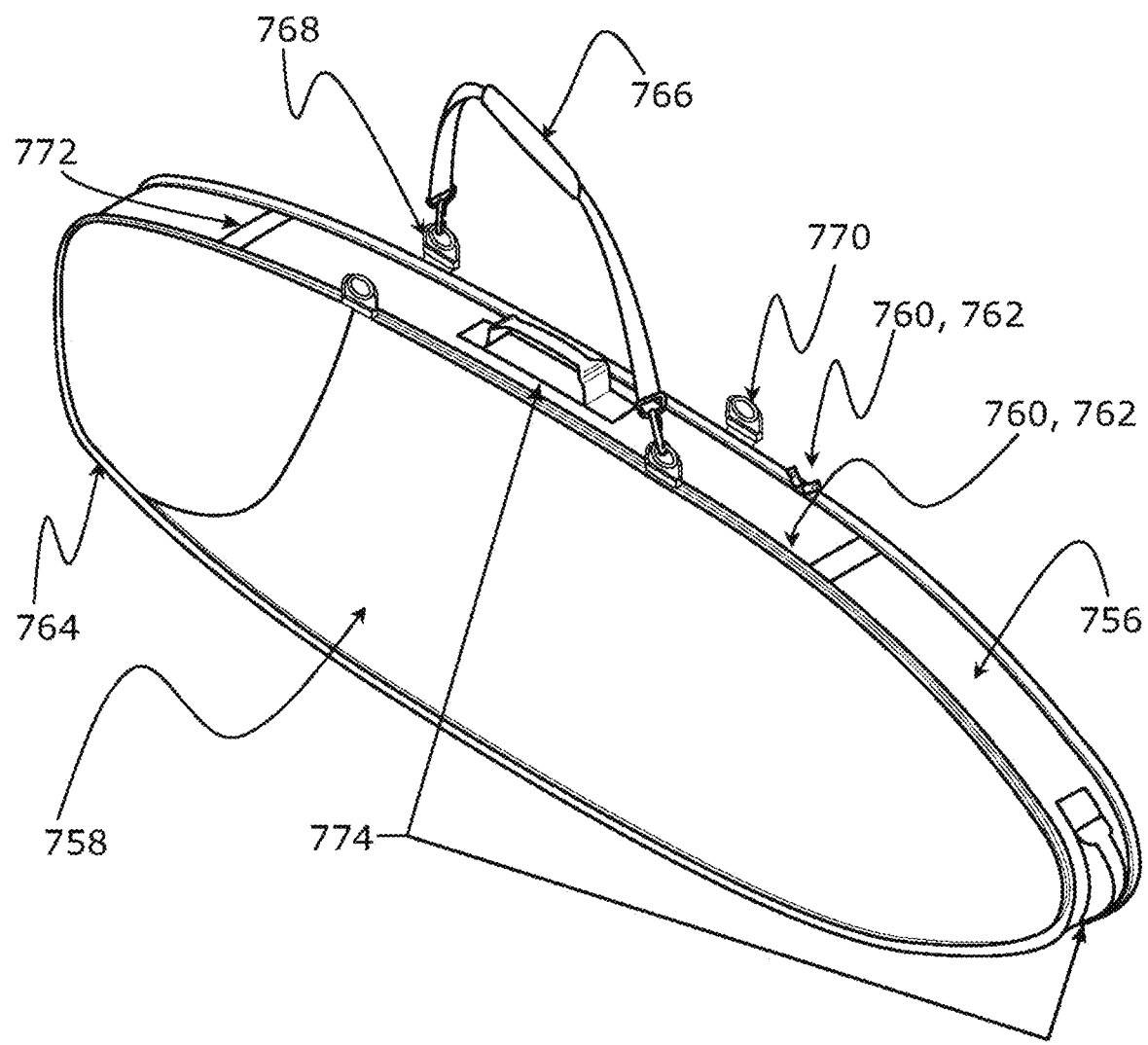
FIG. 10C is a perspective view of the embodiment of a case or cover of FIG. 10B.

A number of additional, optional features can also be seen within the case, cover or bag of FIG. 10B and/or FIG. 10C. For example, soft handles 774 are provided for aiding the user to carry the case. Velcro locating straps 764 may be placed on the rear and underside, to attach removable wheels to the bag. A removable shoulder strap 766 is provided to attach to buckles 768 at the bag. Furthermore, lifting buckles 770 may be provided at the side of the bag, for attaching additional straps. Reinforcing sections 772 may be arranged at the interchangeable side panels.

Vents (not shown) may also be embedded into the panels, to allow moisture to be released from within the cavity of the bag. In further examples, straps (not shown) may be provided around the bag, with loops at the outer surface of the panels to retain said straps. Furthermore, an opening may be arranged at one end of the bag, to allow an easier access to the inner cavity. For example, in the example shown, a zipped opening ca be provided at the nose or tail of the board bag. Within the bag, dividers may be provided, or additional padding can be arranged to protect certain areas of the bag (for instance, to protect the more vulnerable nose and tip of a sports board, when the case is a board bag).

Use of a Combination of Materials

In a particular example, it is particularly advantageous to use a combination of polypropylene materials within a case, bag, box or packaging item. For example, a combination of srPP and ePP may be used. Such combinations of material can give superior protection for fragile items such as sports equipment, hobby equipment, fragile industrial equipment, medical equipment and consumer delivery operations. For instance, the described combination of materials may be more robust but lightweight than alternative construction materials previously used for such packaging products and that are currently available to the consumer.

Figure 11:
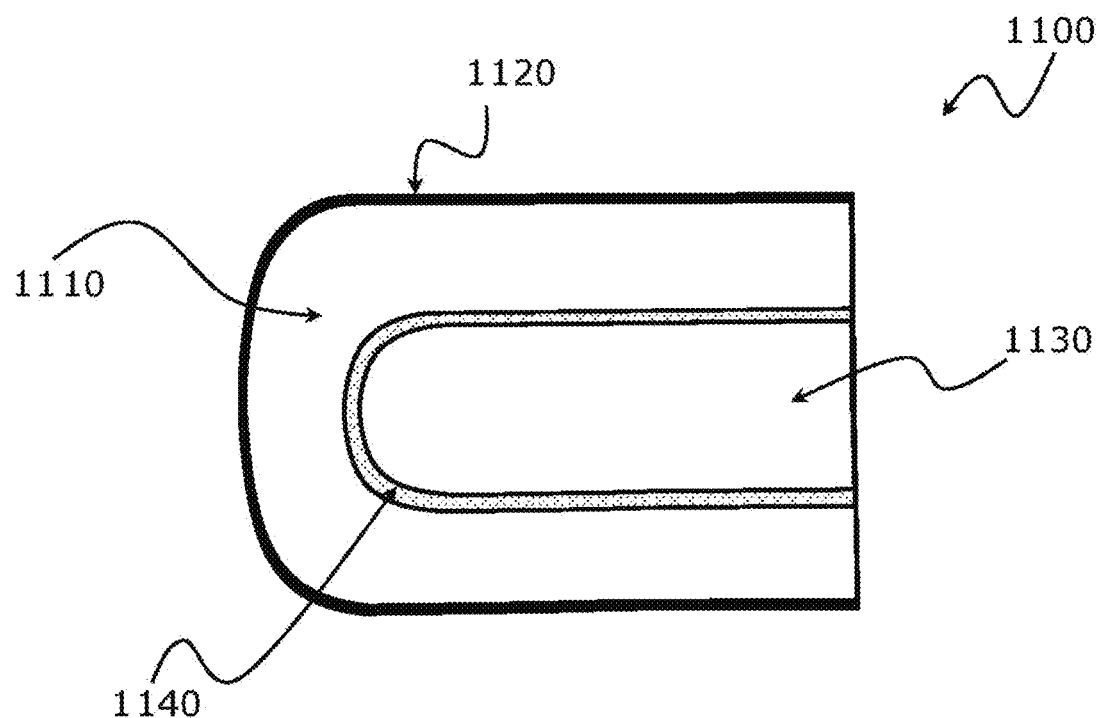
FIG. 11 is a cross-sectional view of a case comprising an inner portion of ePP and an outer layer of srPP.

FIG. 11 shows a cross-sectional view of a portion of a case 1100 comprising an inner portion formed of srPP 1110 and an outer layer formed of ePP 1120. The inner portion 1110 is shaped to define a cavity 1130. The cavity 1130 is shaped to receive part or a portion of an item, in this case a piece of sports equipment, such as a sports board. The outer layer 1120 is arranged around or surrounding the inner portion 1110.

In the example of FIG. 11, the cross-section shows only a portion of the case. In the example of FIG. 11, a similar construction of materials would extend around the whole of the item (in this case a sports board). In this way, the inner portion, outer layer and the case overall encloses the sports board. However, in an alternative, the portion of the case shown in FIG. 11 could be combined with a fabric, cloth or case of other materials in other regions of the case, so that the illustrated portion covers only the nose of a sports board (for example). In this way, a cover can be constructed that includes sections of srPP outer and ePP inner to cover or protect only the most delicate parts of the item, incorporated into a case having a more common structure.

The example of FIG. 11 further comprises a lining layer 1140. The lining layer 1140 is arranged in the inner surface of the inner portion 1110, so as to line the wall of the cavity 1130. The lining layer 1140 provides an extra level of protection or cushioning to an item within the cavity 1130. It may also prevent scratching of the surface of the item, for example. The lining layer 1140 may be fabric or felt or another soft layer. Although a lining layer 1140 is shown in FIG. 11, it will be understood that the lining layer may not be present in some examples.

The self-reinforcing material srPP is particularly advantageous for use within the manufacture of cases, bags or enclosures for transportation, storage and packaging more generally. This is because srPP successfully disperses the energy of impacts at its surface. In particular, through the reinforcing fibres the energy can be dispersed across a larger area and potentially through the whole srPP panel. Therefore, not only is the energy from impacts dispersed through the ePP inner portion, but also across the srPP material.

Testing on a case comprising a srPP outer layer and an ePP inner layer has shown good results for robustness under impact. The claimed combination of materials has been shown to withstand damage around eight times more effectively than use of standard bags using ethyl vinyl acetate (EVA). This is as a result of the combination of materials in particular. However, introduction of ePP in place of EVA alone appears to show three times more improvement in damage resistance.

Figure 12:
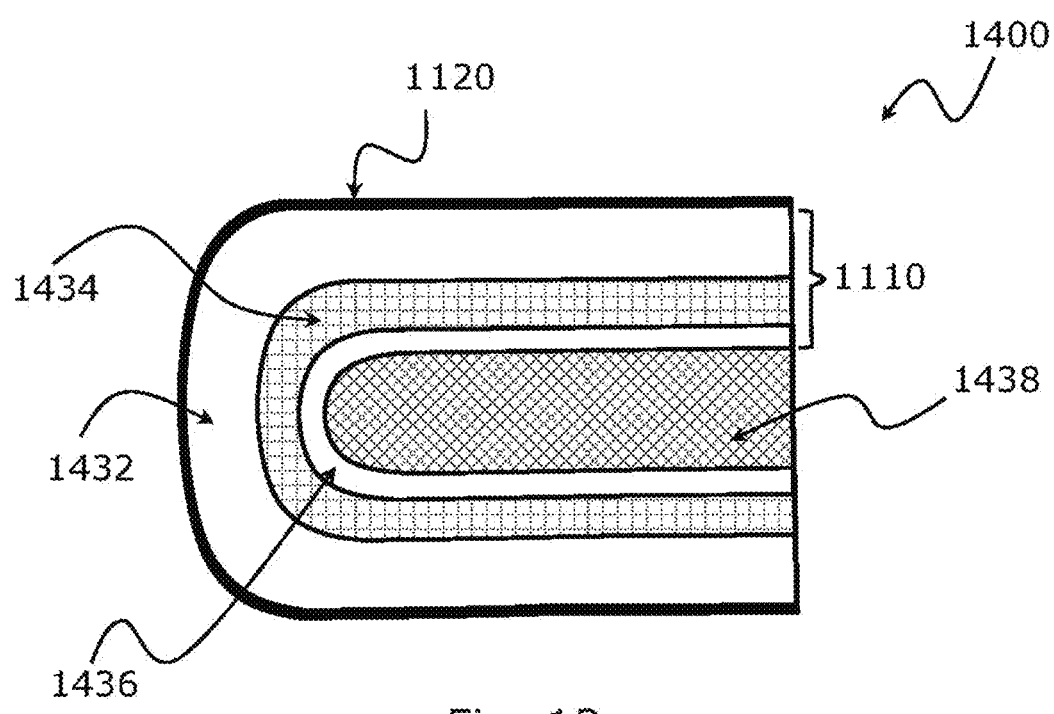
FIG. 12 is a cross-sectional view of a second example of case comprising an inner portion of ePP and an outer layer of srPP.

FIG. 12 shows a cross-section of an example portion of a case 1400. The case portion includes a plurality of layers. An outer layer 1120 comprises a robust outer shell. For example, the outer layer 1120 is comprised of self-reinforcing PolyPropylene (srPP) or another reinforced material. The outer layer 1120 is designed to be high-strength, and yet be lightweight and as thin as possible.

Within the cavity of the outer shell 1120, at least one resilient layer is provided to form an inner portion 1110. In the example of FIG. 4, the inner layers include a dense foam layer 1432, together with a medium resilience foam layer 1434 and a softer and more compressible inner wadding material layer 1436. The innermost material layer 1436 is malleable and conformable to the shape of the item 1438 held within the case. As such, the inner layers 1432, 1434, 1436 cushion and hold the board in place. At least one of the dense foam layer 1432 or the medium resilience foam layer 1434 comprise ePP, although is some examples both these layers are formed of ePP having different densities. The innermost layer 1436 may also be a low density, compressible ePP. A lining layer could also be used (not shown).

Although the srPP is considered within this embodiment as forming a layer outside of (or to cover an outer surface of) the ePP layer, the srPP layer could be used to form a layer inside of (or within) the ePP layer. Furthermore, an srPP layer could be arranged between two or more layers of the ePP material.

Method of Manufacturing a Packaging Article Including srPP and ePP

The case may be manufactured by bonding the srPP outer layer 1120 and the ePP inner portion 1110 in a number of ways.

Figure 13:
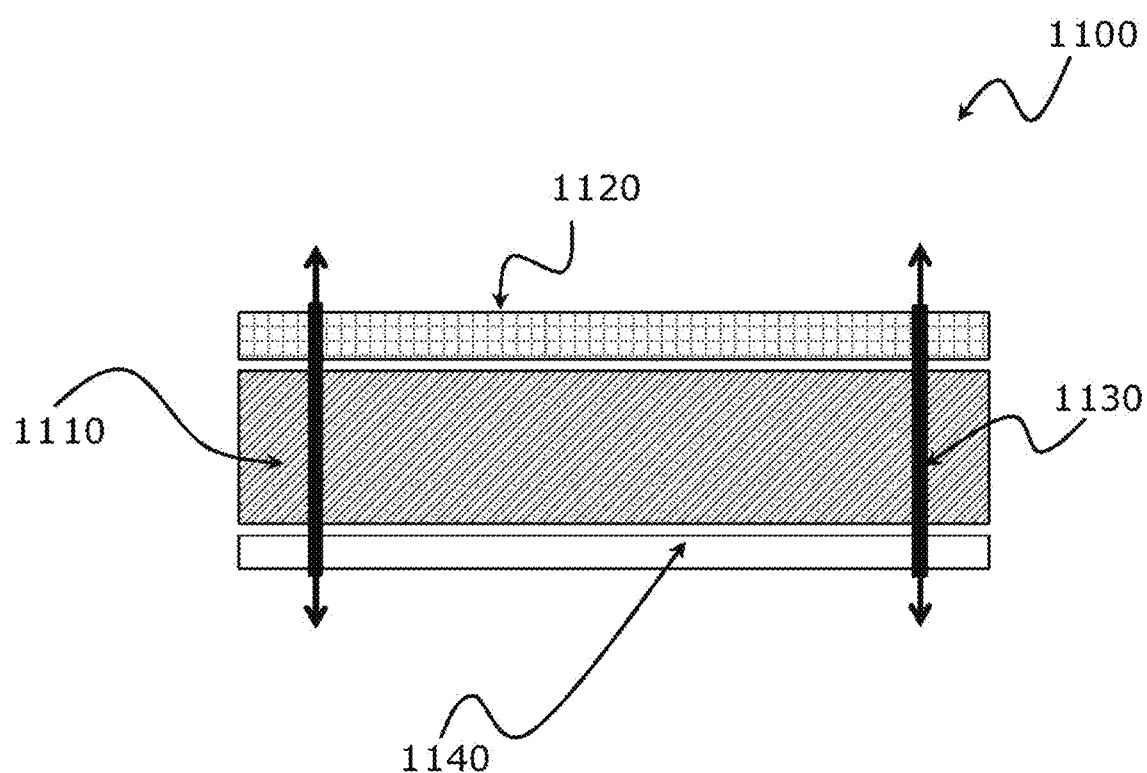
FIG. 13 is a schematic view of a first method of manufacture of the case of FIG. 11.

In a particular example illustrated in FIG. 13, the srPP outer layer 1120 and the ePP inner portion 1110 are loosely coupled and then sewn together. In this way, each stitch 1210 is applied through the inner portion and the outer layer. Advantageously, the reinforcing fibres of srPP of the outer layer 1120 are not interwoven in the same way as some other types of reinforced materials, so SRPP can be stitched through without the thread pulling or damaging the reinforcing fibres.

In a similar method, rivets or staples could be used to connect together the srPP outer layer and ePP inner portion. This method has the same benefits as described above in relation to stitching. In particular, the srPP material is particular suitable for techniques in which a fastener or bonding element is inserted through the material layers. This is because, unlike most other reinforced materials, the reinforcing fibres do not become damaged or pulled out of shape during the process of stitching, riveting or stapling. The ePP inner portion and srPP outer layer may also be glued together, by application of an adhesive layer therebetween.

Methods using sewing, riveting and stapling allows formation of complex shapes for the case. A plurality of layers of ePP or layers of other material may also be incorporated into the walls of the case using this manufacturing technique. It also avoids the requirement for costly and pre-made moulds for manufacture of the claimed case.

Figure 14:
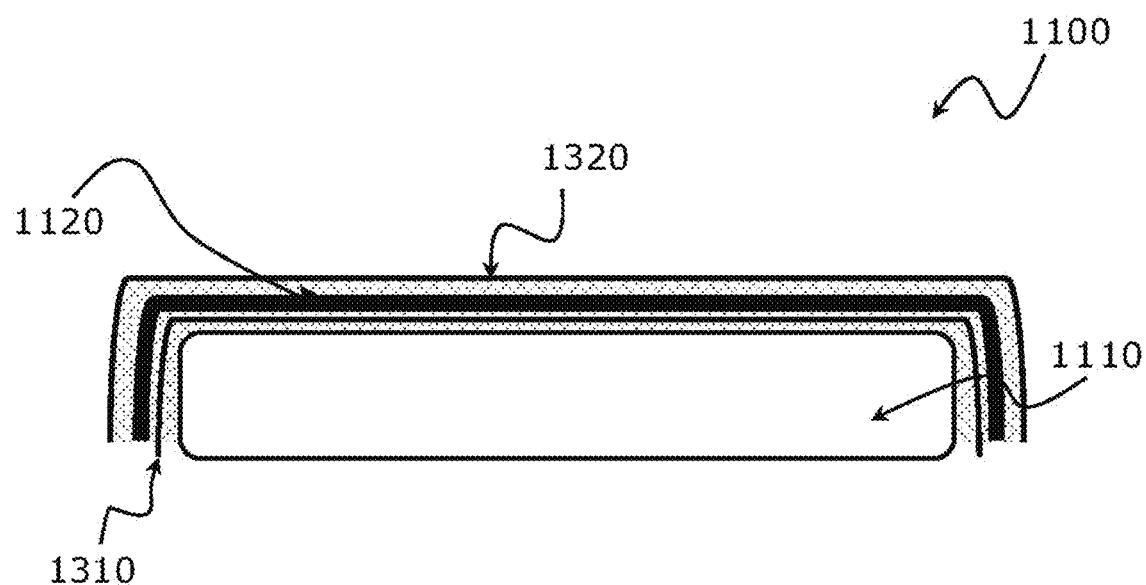
FIG. 14 is a schematic view of a second method of manufacture of the case of FIG. 11.

FIG. 14 shows an alternative for the method of manufacture of the case. In this example, the inner portion and the outer layer are thermoformed in moulds 1320 as separate parts, allowing manufacture of complex shapes. The inner portion 1110 and the outer layer 1120 are then bonded using an adhesive layer 1310. In some cases, it may not be necessary to use an adhesive layer 1310 when thermoforming the inner portion 1110 and outer layer 1120, as the bonding may be accomplished through a compression fitting. Using this method, a rigid or semi rigid shape for the case can be formed.

Figure 15:
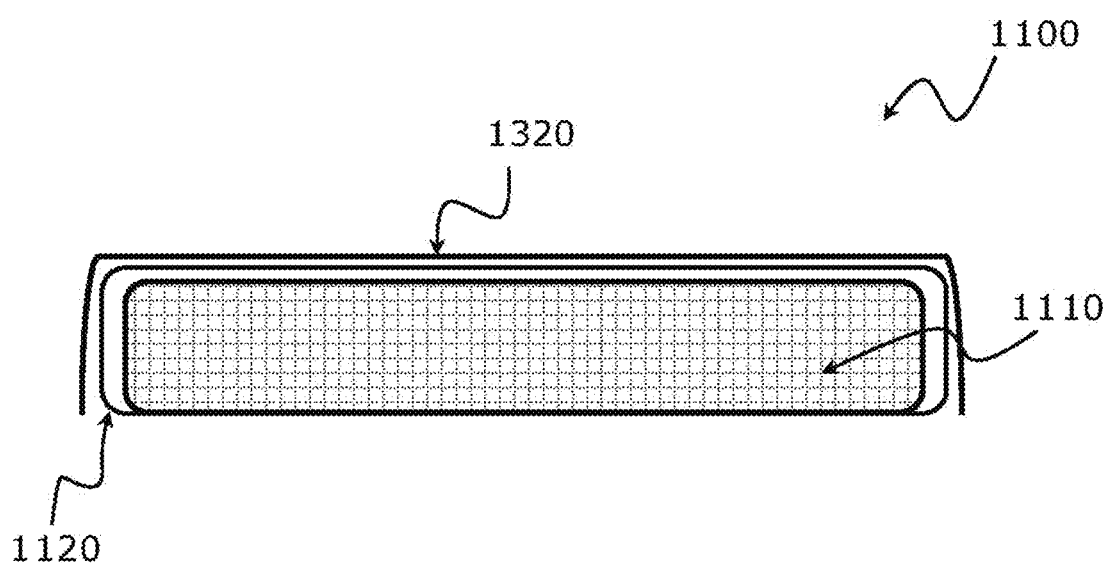
FIG. 15 is a schematic view of a third method of manufacture of the case of FIG. 11

FIG. 15 shows a further alternative for the method of manufacture of the case. In this example, the materials are shaped in a mould 1320 and bonded together under pressure and heat. This creates a thermal bond, in order to bond the inner portion 1110 and outer layer 1120. Such a method of manufacture may result in combination material sheets or complex shapes in thicknesses of between 8 and 50 mm. This could be used to form an encapsulating box or case for protecting the goods or items contained therein.

Many combinations, modifications or alterations to the features of the above embodiments will be readily apparent to the skilled person and are intended to form part of the invention.

As will be understood by the person skilled in the art, FIGS. 9 to 15 show only a limited number of layers. However, the case may include further layers, either intervening the srPP and ePP layer, or outside the outer srPP layer. Nevertheless, a ePP layer will always be arranged 'within' the outer layer, such that the srPP provides protection to the outermost surface of the ePP inner portion.

In some embodiments, the ePP inner portion may comprise multiple layers, each having different thickness and density. In one example, the ePP outermost layer of the plurality of layers has a greater density that the next adjacent ePP layer, with the innermost ePP layer having the lowest density. This provides protection and cushioning to the item within the case, so that the outermost ePP layers provides greater rigidity, resilience and protection than the innermost ePP layer, but that the innermost ePP layer provides less resilience and so greater cushioning to the item. The plurality of layers may be bonded together using riveting, sewing, stapling, and adhesive layer or a thermal bond, in the manner described above.

In other examples, the complete case made according to the construction described above also comprising an opening. The opening provides access to the cavity within the inner portion, and allows insertion or removal of the item within the case. The opening may be closable by any type of fastening. In particular examples, the fastener may be a zip or Velcro.

Furthermore, any of the concave portions, shell portions or enclosures described above in relation to the adjustable bags shown in FIGS. 1 to 8 can be formed according to the combination of materials using ePP and srPP, as described above in relation to FIGS. 9 to 15.

A Further Example of an Adjustable Case or Cover

Figure 16:
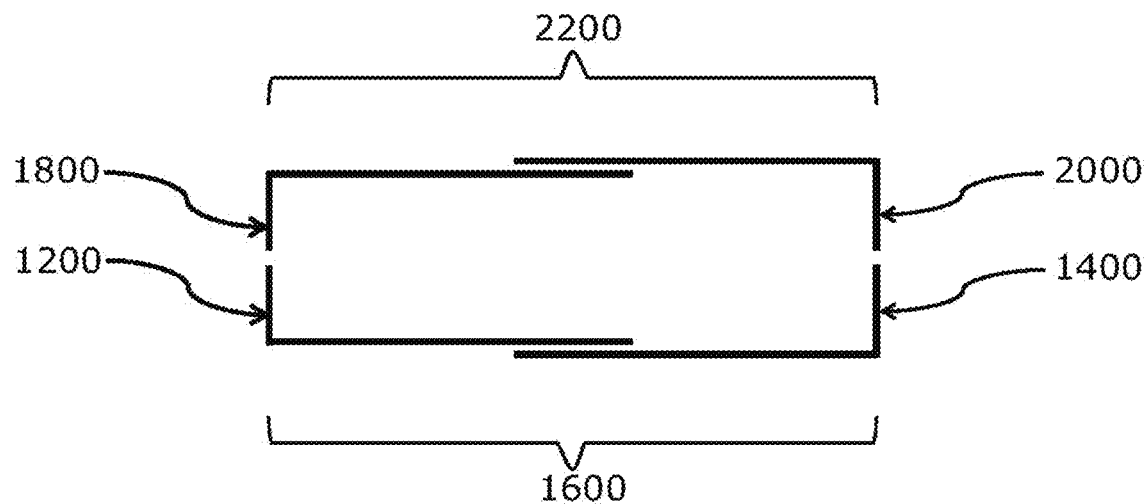
FIG. 16 is a cross-sectional view of a case formed of a first and second telescoping enclosure section, each having two portions.

FIG. 16 shows a simplified, cross-sectional view of the case. In particular, the example of FIG. 16 shows four portions or parts. The first 1200 and second 1400 portion together form a first telescoping enclosure section 1600. The third 1800 and fourth 2000 portion together form a second telescoping enclosures section 2200.

The first and second portions each have an inner face that is recessed, so as to form a cavity. The cavity may be considered a recess in the inner face, having a closed face at one end of the recess and an open end at the opposite end of the recess. The first and second portions are arranged so that their open ends overlap, with both inner faces arranged in parallel (although displaced with respect to the other) and facing in a common direction. In this way, an amount of the first portion is receiving within the cavity of the second portion. This arrangement creates the telescoping characteristic of the first telescoping enclosure section, as changing the amount of overlap between the first and second portion, or changing the amount by which the first portion is received within the second portion, changes the dimension of the first telescoping enclosure section and the volume therein. In particular, the telescoping nature of the first telescoping enclosure section would change the length of the section and volume of the cavity therein.

The third and fourth portion has a similar configuration to the first and second portion described above. The third and fourth portion are arranged to overlap so as to form the second telescoping enclosure section. To form the case, the first and second telescoping enclosure sections are arranged so that the inner faces of the first and third, and second and fourth portions face each other. In this way, the cavities within each of the four portions join to create an inner cavity for containing goods. The size and dimensions of the inner volume can be changed by adjusting the telescoping enclosure sections.

Figure 17A:
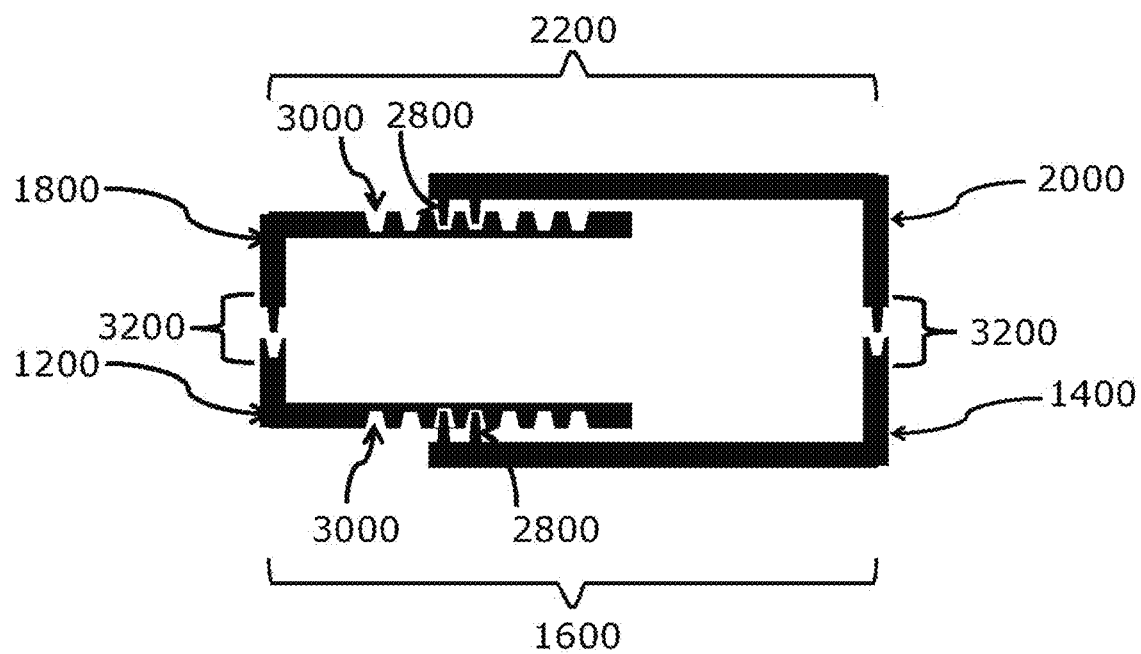
FIG. 17A is a cross-sectional view of a further example of a case formed of a first and second telescoping enclosure section.

FIG. 17A shows a particular example of a fastening mechanism that can be used between the first 1200 and second 1400 portion and/or the third 1800 and fourth 2000 portion to secure the first portion 1200 relative to the second portion 1400, and/or the third portion 1800 relative to the fourth portion 2000. In this case, protrusions 2800 are formed on the inner surface of the second 1400 and fourth 2000 portions, which are arranged to fit into or cooperate with recesses 3000 at the first 1200 and third 1800 portions, respectively. As can be seen from FIG. 17A, many recesses 3000 are provided at the first and third portions, which allows the relative arrangement of the first 1200 and second 1400, and the third 1800 and fourth 2000 portions respectively, providing the telescoping characteristic of each telescoping enclosure section.

The protrusions 2800 and recesses 3000 of FIG. 17A may be dowels and receiving holes, or may be ridges and valleys, or any other type of shapes designed to cooperate and fit together. The protrusions 2800 and recesses 3000 may fit together closely, so as to provide a compression fastening or 'push-fit' between the first 1200 and second 1400 portion and the third 1800 and fourth 2000 portion. Moreover, although in this case the protrusions are shown on the second 1400 and fourth 2000 portions and the recesses on the first 1200 and third 1800 portions, the protrusions could be arranged on the first 1200 and third 1800 portions so as to cooperate with recesses on the second 1400 and fourth 2000 portions.

Although protrusions and recesses are shown as suitable fastening mechanisms, other fastening mechanisms could be used to secure the first and second portion, or the third and fourth portion relative to each other. For example, the protrusions could be replaced by strips of Velcro, configured to mate with cooperating strips of Velcro arranged in the place of the recesses shown in FIG. 17A. Alternatively, buckles or zips could be used.

FIG. 17A also shows protrusions and recesses 3200 in the walls of the first and third portions respectively. In particular, a protrusion is arranged in the edge of the wall of the first portion and a recess is arranged at the opposing edge of the wall of the third portion. The protrusion and recesses 3200 can cooperate and can fit together to provide a compression fitting between the first and third parts.

Protrusions and recesses 3200 can also be arranged at the equivalent edges of the fourth and second portions. In this way the second and fourth portions can be arranged to couple together. When the protrusions of the first and second portion are arranged to fit within the recesses at the edges of the third and fourth portion, then the first and second telescoping enclosure sections are coupled.

Figure 17B:
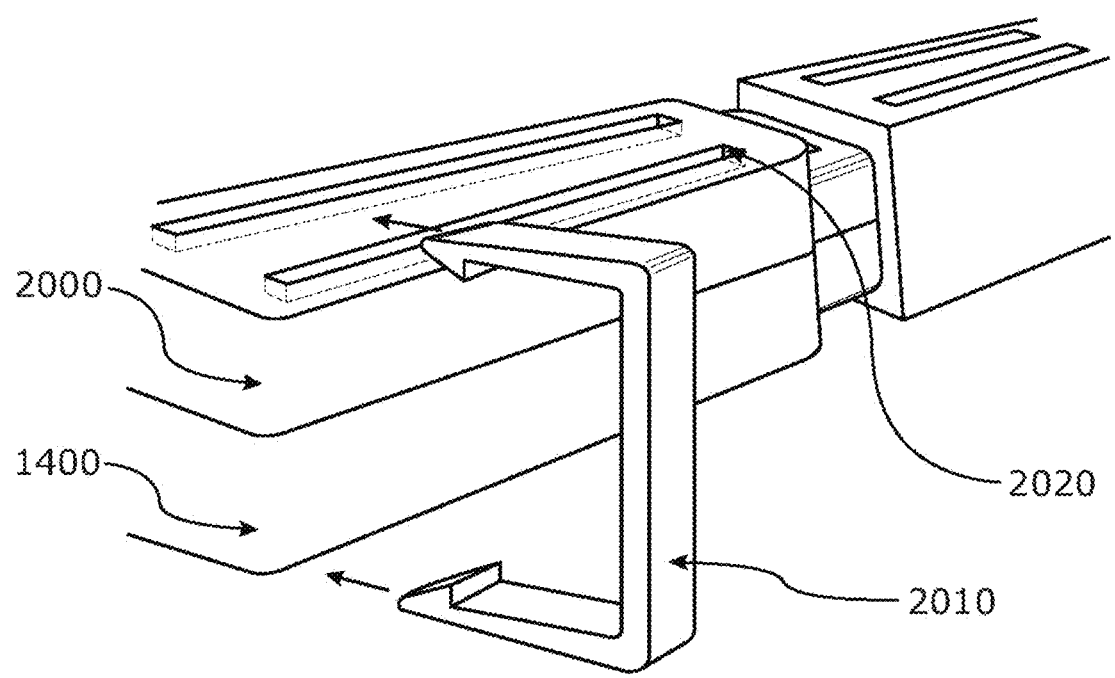
FIGS. 17B and 17C are perspective views and cross-sectional views of further examples of a case formed of a first and second telescoping enclosure section.
Figure 17C:
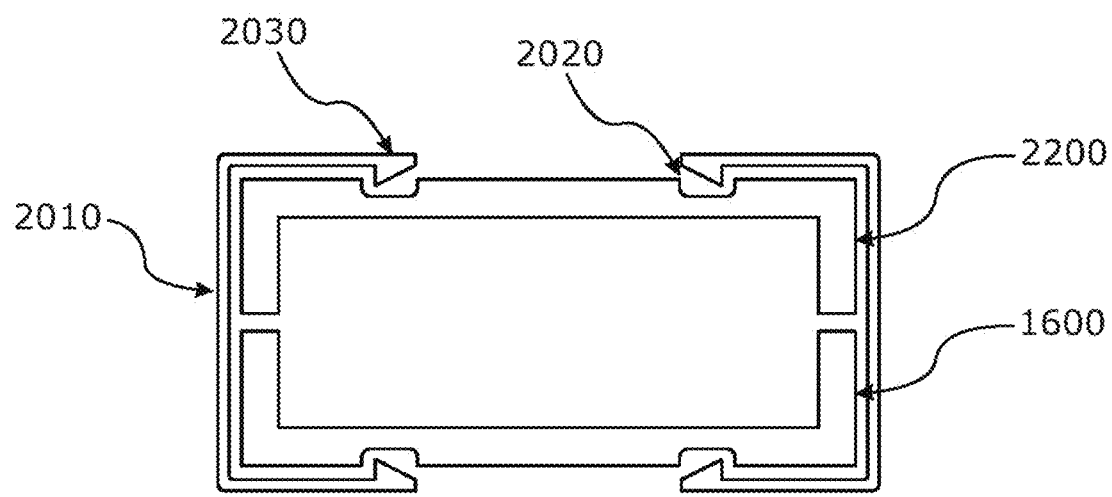

FIGS. 17B and 17C show a further example of a fastening used to couple the first telescoping enclosure portion and the second telescoping enclosure section. FIG. 17B shows a perspective view of the case, and FIG. 17C shows a cross-sectional view. In this figure the cross-section of FIG. 17C is perpendicular to the cross-section through the case that is shown in FIG. 17A.

In FIG. 17B and FIG. 17C it can be seen that a C-clip 2010 is fitted around two portions of the case, which each comprise part of the first 1600 and second 2200 telescoping enclosure section. The C-clip 2010 can be pushed to fit around the sides of the portions of the first 1600 and second 2200 telescoping enclosure sections to hold the portions together. Protrusions 2030 at the C-clip 2010 are arranged to fit into channels 2020 located on the outer surface of each of the portions of the first 1600 and second 2200 enclosure portions. The C-clip 2010 may be slightly resilient, so as to bend slightly during removal and placement of the clip.

Figure 18:
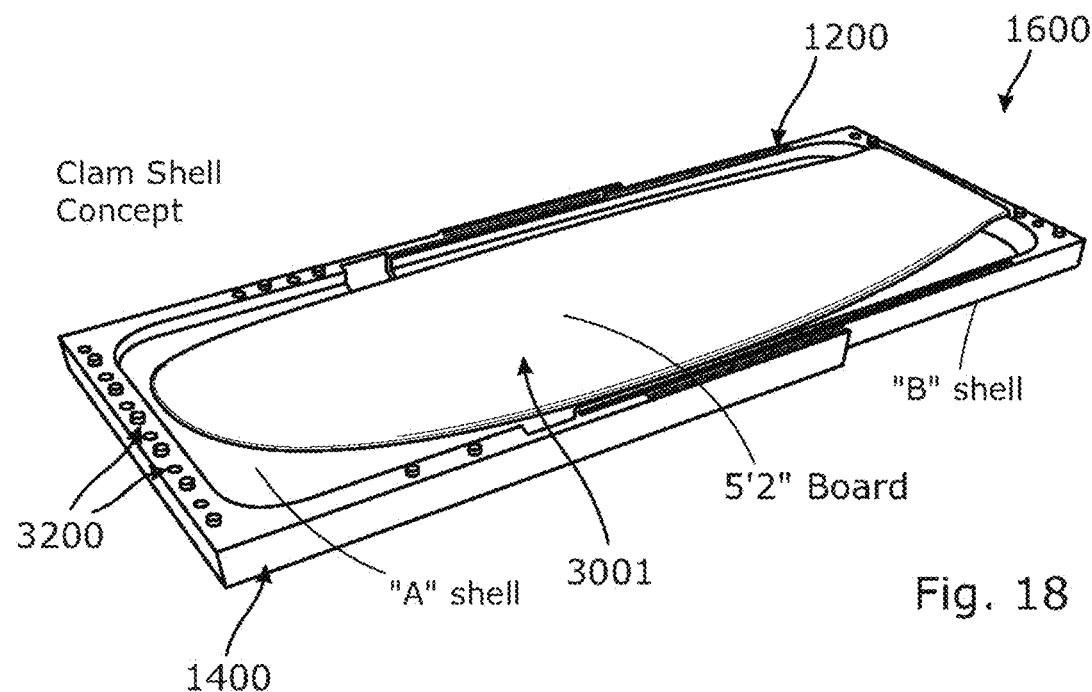
FIG. 18 is a perspective view of the first telescoping enclosure section of a case.

A simple example of the case can be seen at FIG. 18. FIG. 18 shows a 3D CAD drawing of the first telescoping enclosure section 1600 of the case according to the invention. A sports board 3001 is shown within the cavity of the first telescoping enclosure section.

In FIG. 18, the 'A' shell represents the second portion 1400 of the first telescoping enclosure section, and the 'B' shell represents the first portion 1200 of the first telescoping enclosure section. A similar arrangement forms the second telescoping enclosure section (not shown).

It can be seen that in the arrangement of the first telescoping enclosure section the 'B' shell could be changed so that the extent of overlap between the 'A' shell and the 'B' shell is further increased, in order to reduce the size of the cavity. Alternatively, the 'A' shell and the 'B' shell could be moved further apart, so as to reduce the size of the cavity. In this way, the size of the cavity is easily adjustable.

Protrusions and recesses 3200 for coupling the first and second telescoping enclosure section can also be seen in FIG. 18.

Figure 19:
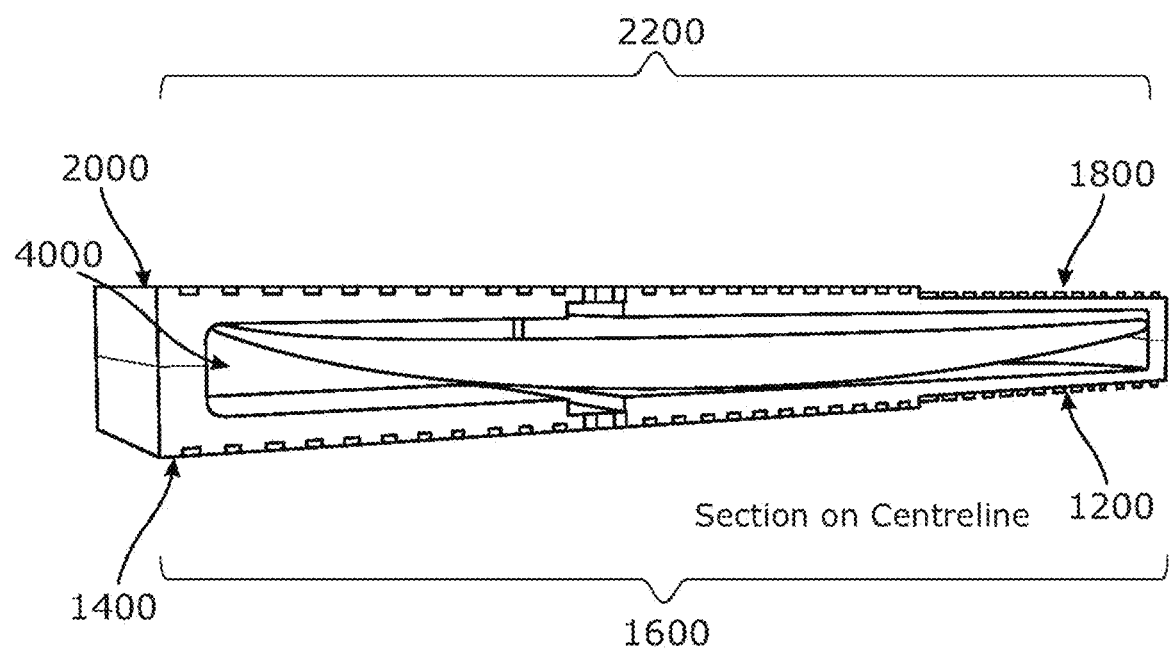
FIG. 19 is a cross-sectional view of a case formed of a first and second telescoping enclosure section.

A first and second telescoping enclosure section as shown in FIG. 18 can be joined to enclose, as shown in FIG. 19, a cavity 4000 for containing goods. As can be seen in FIG. 4, the inner faces of the first telescoping enclosure section 1600 and the second telescoping enclosure section 2200 face each other. The first telescoping enclosure section 1600 and the second telescoping enclosure section 2200 are bought together, until the inner cavity 4000 is enclosed. The dimensions of the inner cavity 4000 can be changed by moving apart the first portion 1200 with respect to the second portion 1400, and the third portion 1800 with respect to the fourth portion 2000.

Figure 20:
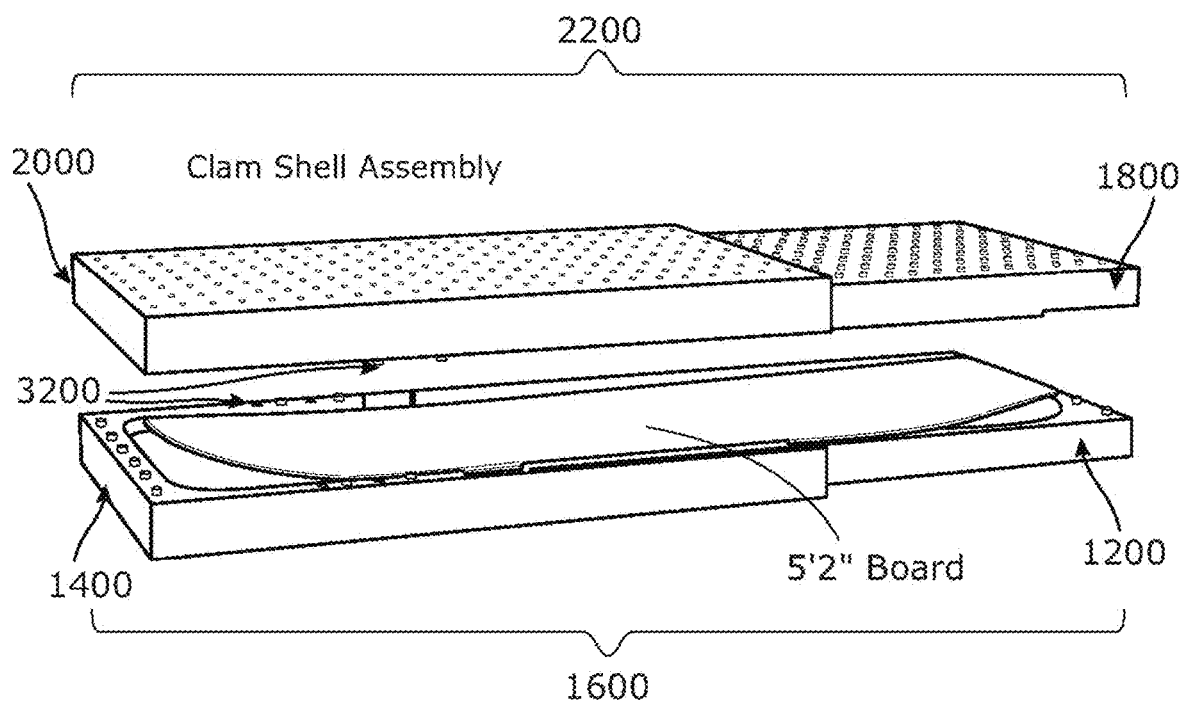
FIG. 20 is a further view of the case of FIG. 19.

FIG. 20 shows the first telescoping enclosure section 1600 spaced apart from the second telescoping enclosure section 2200, prior to joining to form the inner cavity. The case illustrated in FIG. 20 shows an example of the protrusions and recesses 3200 at the opposing faces of the first 1600 and second 2200 telescoping enclosure sections. When the first 1600 and second 2200 telescoping enclosure sections are joined to close the inner cavity, said protrusions and recesses 3200 can be connected together in order to fasten, couple or join the first 1600 and second 2200 telescoping enclosure sections. Said protrusions and recesses 3200 can be pushed together to give a compression fitting, so as to securely fasten the first telescoping enclosure section 1600 to the second telescoping enclosure section 2200.

Figure 21:
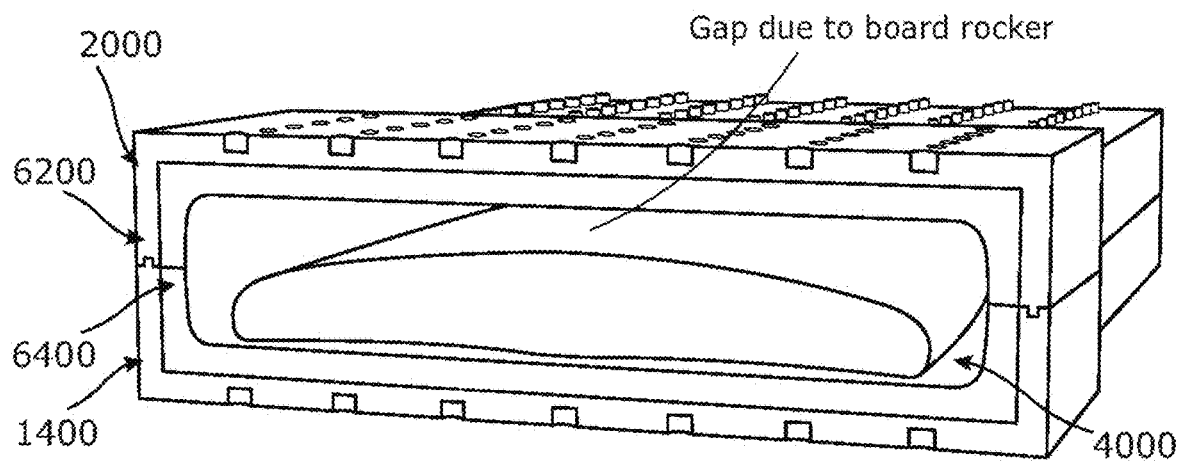
FIG. 21 is a cross-sectional view of the case of FIGS. 19 and 20.

FIG. 21 shows a cross-section through the case containing a sports board. In particular, FIG. 21 shows a cross-section through the second 1400 and fourth portion 2000. It can be seen that both the second 1400 and fourth 2000 portion consist of at least two layers. An outer layer 6200 is made from a more rigid and robust material. An inner layer 6400 is comprised of a softer or more resilient material, in order to cushion or hold the items within the inner cavity 4000.

Figure 22:
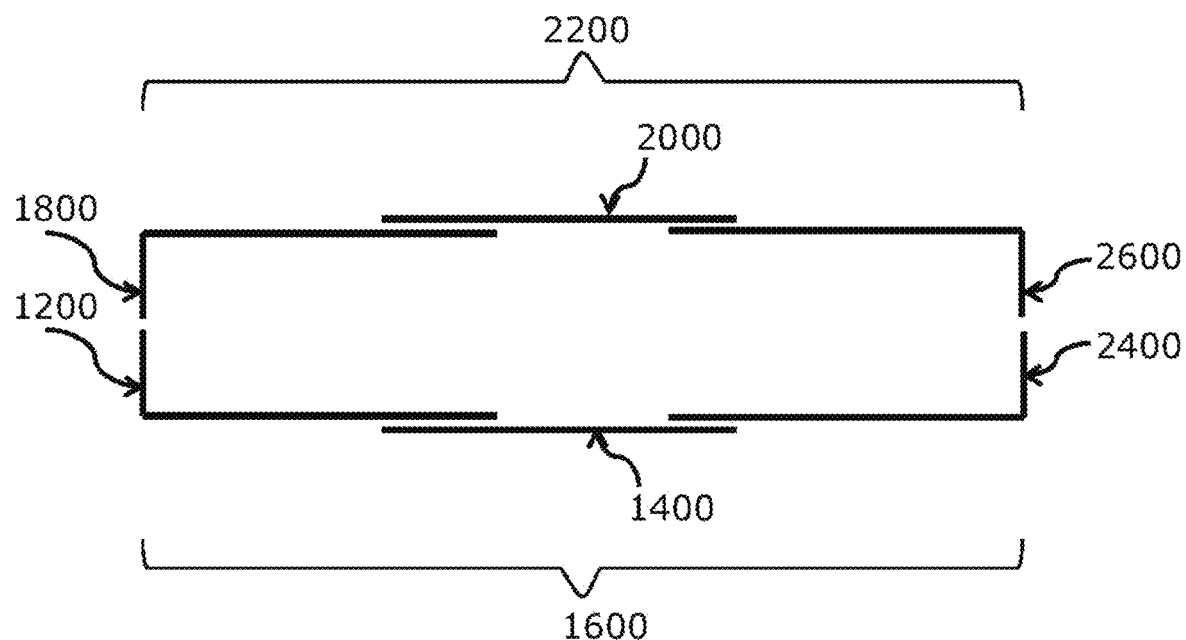
FIG. 22 is a cross-sectional view of a case formed of a first and second telescoping enclosure section, each having three portions.

FIG. 22 shows a simplified, cross-sectional view of a case according to the invention, wherein the first telescoping enclosure section 1600 comprises a fifth portion 2400, and the second telescoping enclosure section 2200 comprises a sixth portion 2600. Considering the first telescoping enclosure section 1600, the fifth portion 2400 has an inner surface, in which is defined a cavity. The fifth portion 2400 partly overlaps with the second portion 1400, so as to be partially received by the cavity of the second portion 1400. In this way, the second portion 1400 is arranged 'outside' the first 1200 and fifth 2400 portions.

The fifth portion 2400 cooperates with the second portion 1400 so as to telescope. In other words, moving the second portion 1400 relative to the fifth portion 2400 causes the length of the first telescoping enclosure section 1600 and the inner cavity to change dimensions. Increasing the overlap between the second 1400 and fifth portion 2400, for example, will decrease the length of the first telescoping enclosure section 1600 and therefore the dimension of the inner cavity. Note that the first telescoping enclosure section 1600 is formed from each of the first 1200, second 1400 and fifth 2400 portions, and that the dimensions of the inner cavity can be changed by adjusting the overlap of the first 1200 and second 1400 portion and/or the second 1400 and fifth 2400 portion.

The second telescoping enclosure section 2200 of FIG. 22 comprises the third 1800, fourth 2000 and sixth 2600 portion, which are equivalent to the first 1200, second 1400 and fifth 2400 portion of the first telescoping enclosure section 1600. The sixth portion 2600 has an inner surface defining a cavity, and is arranged to overlap the fourth portion 2000, such that the sixth portion 2600 is partially received within the cavity of the fourth portion 2000. The amount by which the third 1800 and sixth 2600 portions overlap with or are received within the fourth portion 2000 define the dimensions of the second telescoping enclosure section 2200 and the inner cavity. By adjusting the third 1800 and sixth 2600 portion relative to the fourth portion 2000, the telescoping nature of the second telescoping enclosure section 2200 is established.

Figure 23:
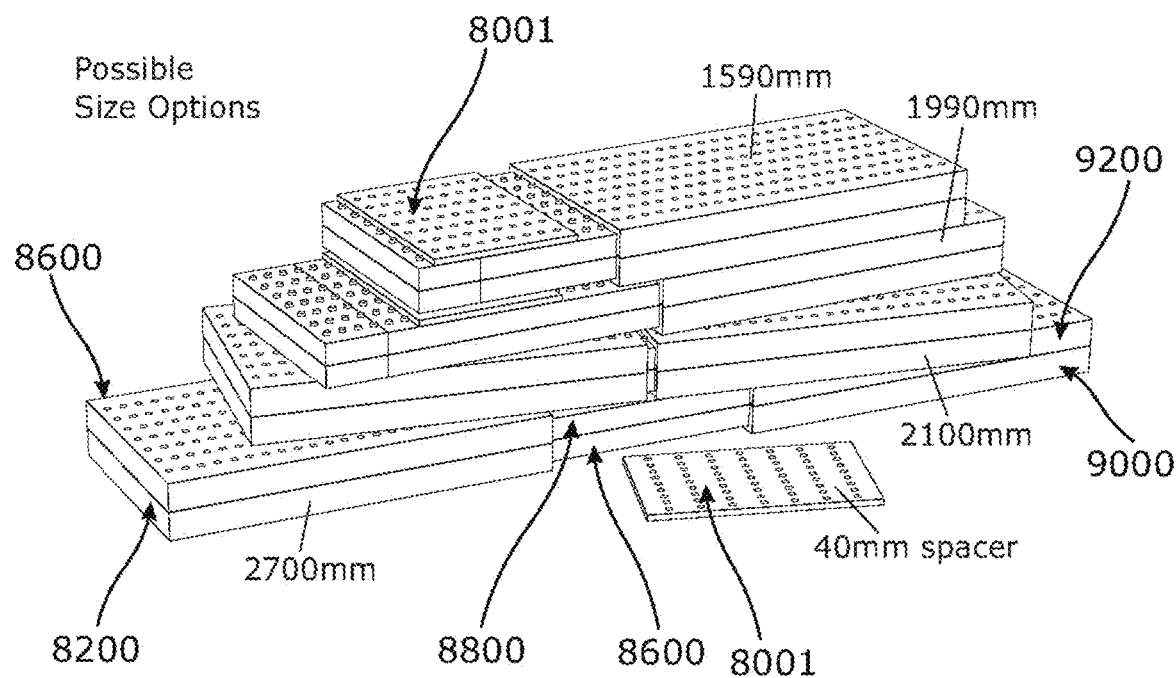
FIG. 23 is a perspective view of an arrangement of a plurality of cases according to the invention.

As will be understood by the skilled person, the arrangement of the first, second and fifth portion of the first telescoping enclosure section, and the third, fourth and sixth portion of the second telescoping enclosure section could be inverted. In other words, the first telescoping enclosure section could be arranged so that the first and fifth portions overlap opposing ends of the second portion, but so that the first and second portions are arranged on the 'outside'. In other words, in this configuration the second portion would be received within the cavity of the first portion, as well as within the cavity of the fifth portion. Similar alternative arrangements of the third, fourth and sixth portions can be configured to form the second telescoping enclosure section. In FIG. 23, for example, the case at the bottom of the stack shows this configuration of the first 8200, second 8400, third 8600, fourth 8800, fifth 9000 and sixth 9200 portion.

In a further alternative, the second portion may overlap the first and fifth portion, such that the first portion is received within the cavity of the second portion, and the second portion is receive within the cavity of the fifth portion. Similar alternative arrangements of the third, fourth and sixth portions can be configured to form the second telescoping enclosure section.

FIG. 23 also shows spacers 8001 arranged on the telescoping enclosure sections. These fill the space caused by overlap of the first and second portions, for example, or the third and fourth portions when the cases are stacked. This helps the cases to stack for transportation without unnecessary strain on the case.

Figure 24:
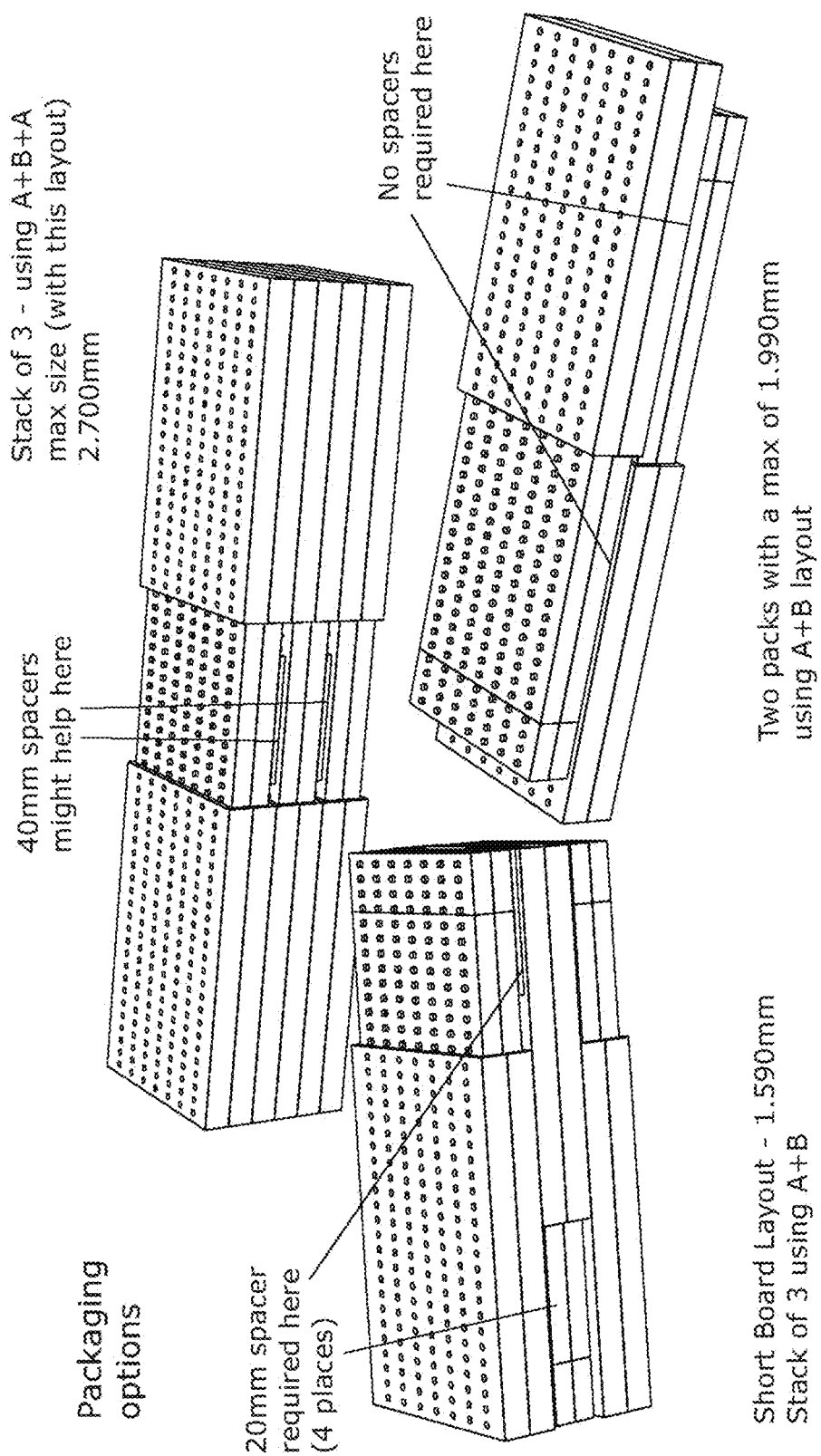
FIG. 24 is a perspective view of further arrangements of a plurality of cases according to the invention.

FIG. 24 shows an alternative example of the stacked cases. It can be seen that protrusions and recesses at the outer surface of the first and second telescoping enclosure sections of the case can interlock. This helps the stability of the cases during transportation. In particular, the outer surfaces of the portions forming the first and second telescoping enclosure sections of a first case are shaped so as to interlock with shaping on the outer surfaces of a telescoping enclosure section of a case stacked on top. FIG. 23 also shows various arrangements for a stack of the cases of the claimed invention.

Figure 25:
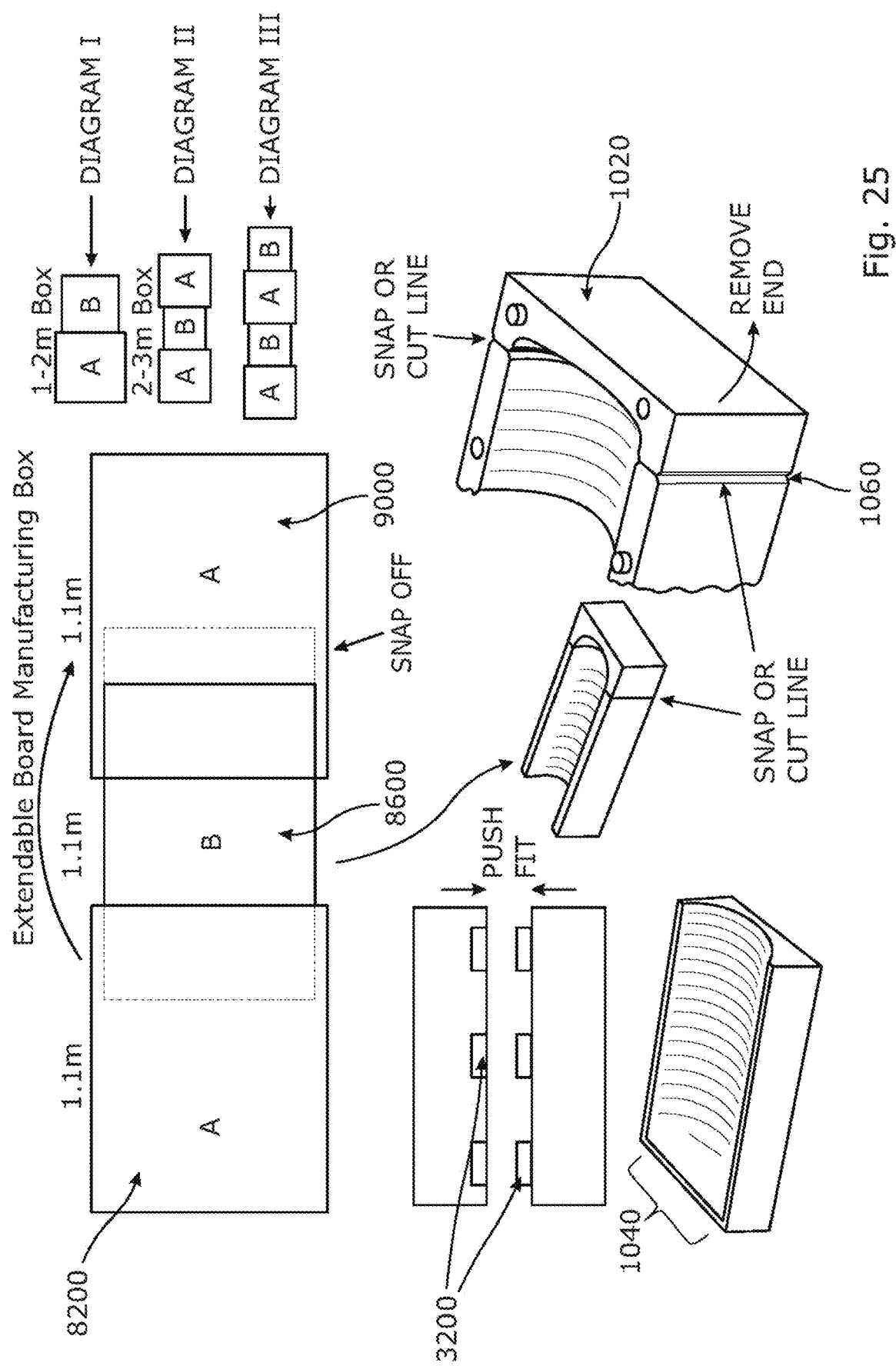
FIG. 25 shows a number of schematic views of a case.

FIG. 25 illustrates further examples of the extendable case of the present invention having a first and second telescoping enclosure section. In this case, the first portion 8200 overlaps with the second portion 8600, and the fifth portion 9000 overlaps with the second portion 8600, such that the second portion 8600 is received within the cavity of each of the first 8200 and fifth 9000 portions. Movement of the first 8200 and fifth 9000 portions relative to the second portion 8600 causes a change in the length of the case.

As demonstrated in FIG. 25, a case can be formed using any number of portions, so that each portion (type A or B) overlaps to received (type B), or to be received by (type A) each other portion. In this way, a case can be formed of any number of modular parts to suit the dimensions required by the user. For example, Diagram I shows a case having a first telescoping enclosure section formed of a first and second portion as discussed above in relation to FIG. 16. Diagram II shows a case having a first telescoping enclosure section formed of a first, second and fifth portion as discussed above in relation to FIG. 23. Diagram III shows a case having a first telescoping enclosure section formed of a first, second, fifth and seventh portion, which each overlap to be telescoping, and so as to provide an adjustable volume for the defined inner cavity. In this case, the second telescoping enclosure section would comprise a third, fourth, sixth and eighth portion.

FIG. 25 further illustrates the push fit protrusions and recesses 3200 at the edge of the first telescoping enclosure section and second telescoping enclosure section, as discussed above in relation to FIGS. 17A and 20. FIG. 25 also shows ridges or surface formations on the inner surface of the telescoping enclosure section, which can be used to hold an item within the inner cavity securely in place.

FIG. 25 further shows an example of a removable end piece 1020 for a portion of the telescoping enclosure section. An end portion of the telescoping enclosure section (such as a first or fifth portion) may have a semi-closed end 1040 to the open cavity, at the opposite end of the cavity from the region overlapping another portion. In a particular example, the semi-closed end 1040 may be removable, for easy removal or retrieval of goods within the inner cavity. In the event that case is not intended for further re-use, the removable end piece 1020 could be snapped off, or cut off, and a guide line 1060 could be provided to assist in such a purpose.

Figure 26:
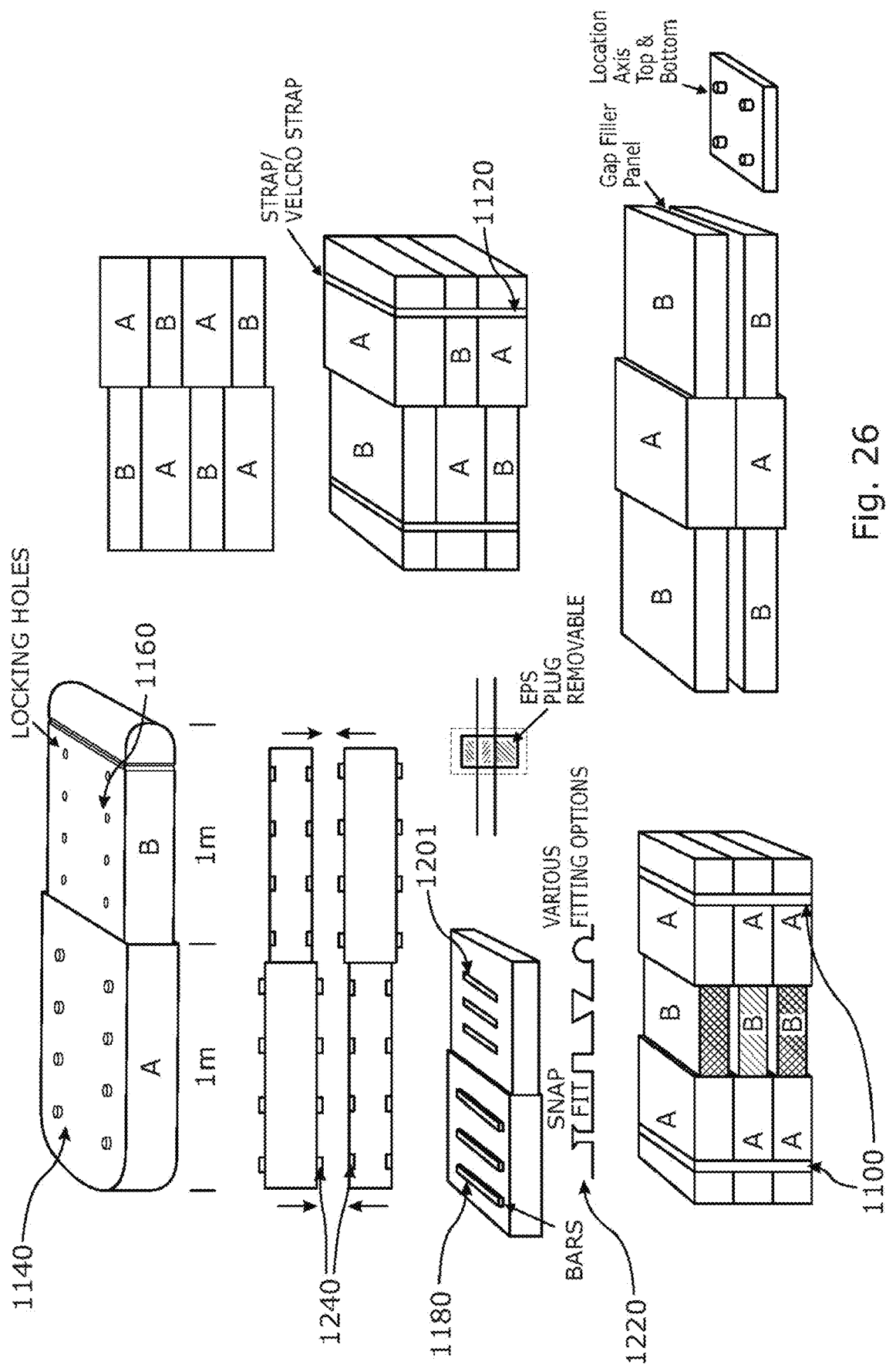
FIG. 26 shows a number of schematic views of arrangements of a plurality of cases and their fixing means.

FIG. 26 shows various configurations for stacks of cases according to the claimed invention, in a similar manner to those shown in FIG. 24. Various fastening mechanisms can be used to couple stacks of the cases. For example, a strap 1100 could be used to hold the stack of cases firmly together. In an alternative, Velcro strips 1120 could be used on the outer surface of the telescoping enclosure sections of each case, which, when coupled hold the stack of cases firmly in place. In a further, preferred alternative protrusions and recesses 1240 can be formed on the outer surface of the telescoping enclosure sections, which can engage and cooperate to hold the stack of cases in place. In one example, rods or bumps 1140 can be formed on the outer surface of the telescoping enclosure section, which, when the cases are stacked, interlock with holes 1160 at the outer surface of another telescoping enclosure section. In a second example, the protrusions and recesses are formed by ridges 1180 at an outer surface of the telescoping enclosure section, which fit into cooperating valleys 1201 in the outer surface of a telescoping enclosure section of another case. The protrusions may have many various shapes, for example with different cross-sections 1220.

Figure 27:
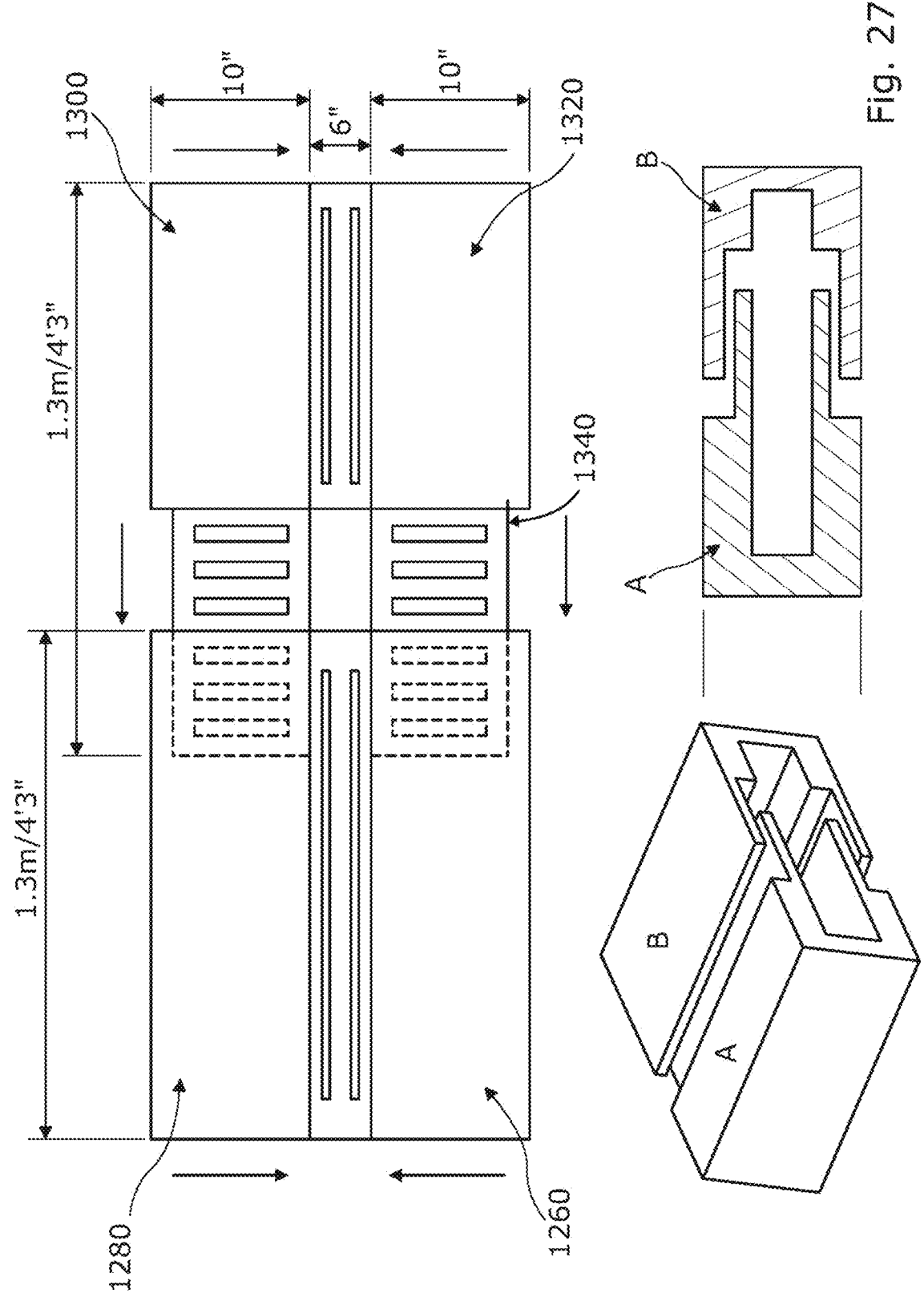
FIG. 27 shows a further example of a case having telescoping enclosure sections.
Figure 28:
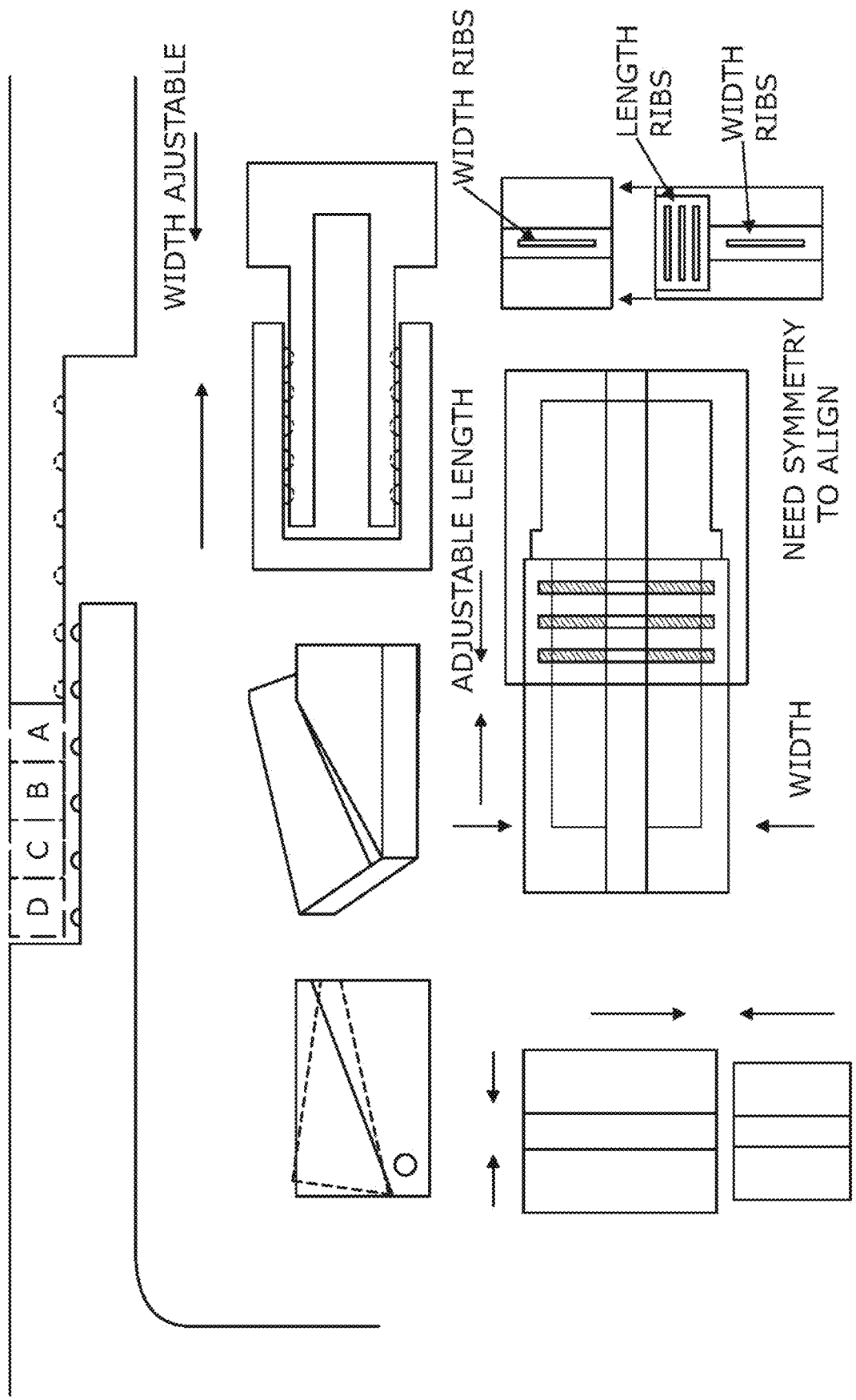
FIG. 28 shows further views of the fasteners used between portions of the case.
Figure 29:
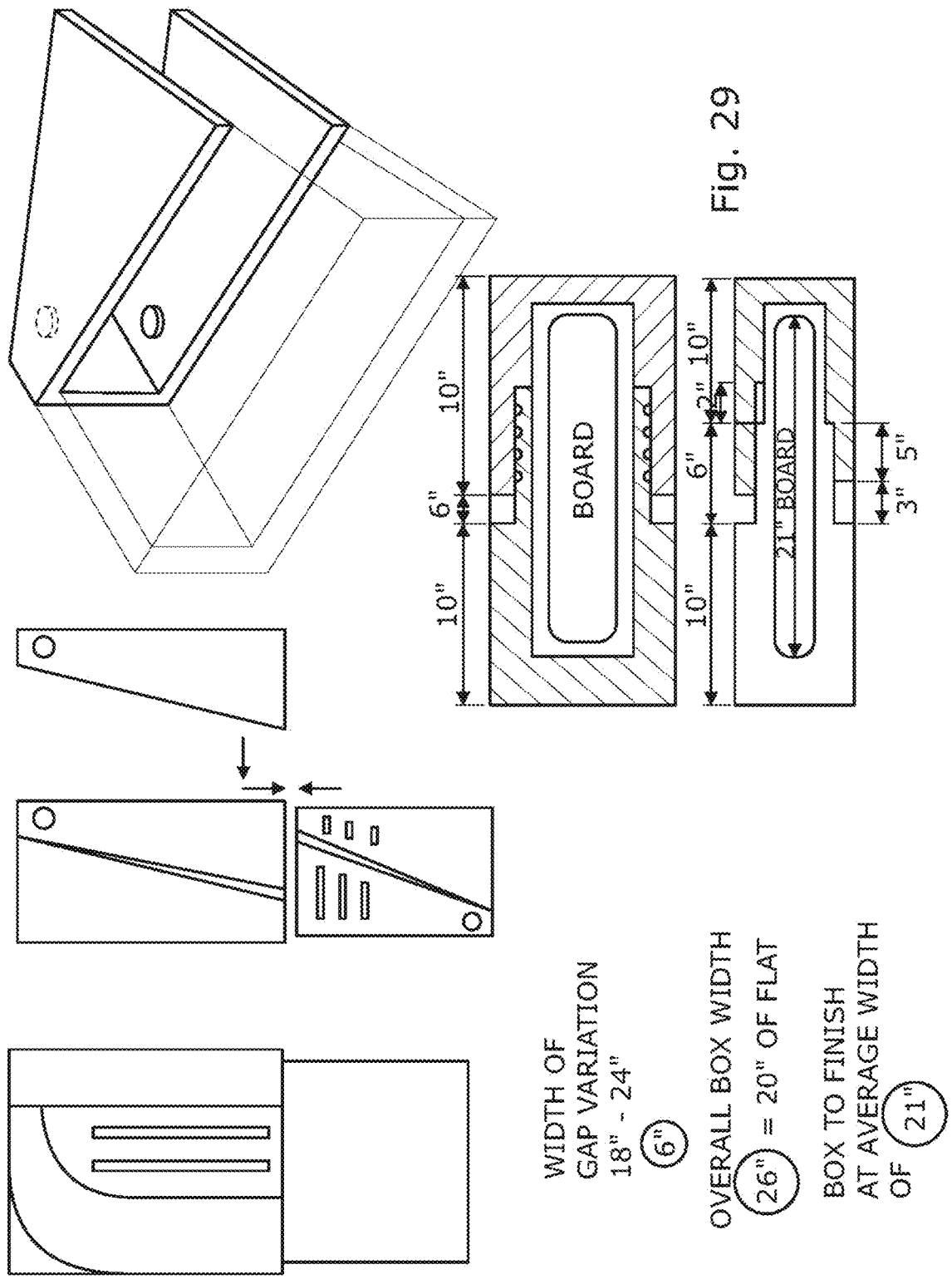
FIG. 29 shows a further example of a case having telescoping enclosure sections.

FIG. 27 shows a further example, in which the first 1260, second 1280, third 1300 and fourth 1320 portions all overlap, in order to provide a case that can adjust in both length and width. Dimensions shown in FIG. 27 are for illustrative purposes only. Snap in panels could be used to cover the adjustable portion 1340 of the case, especially if these would otherwise be open and leave the goods within the cavity of the case exposed. As illustrated at FIGS. 27, 28 and 29, various arrangements for the first, second, third and fourth portions of the telescoping enclosure sections, as well as for the protrusions and recesses at the overlapping regions of the first and second, and the third and fourth portion of the telescoping enclosure sections can be envisaged.

Figure 30:
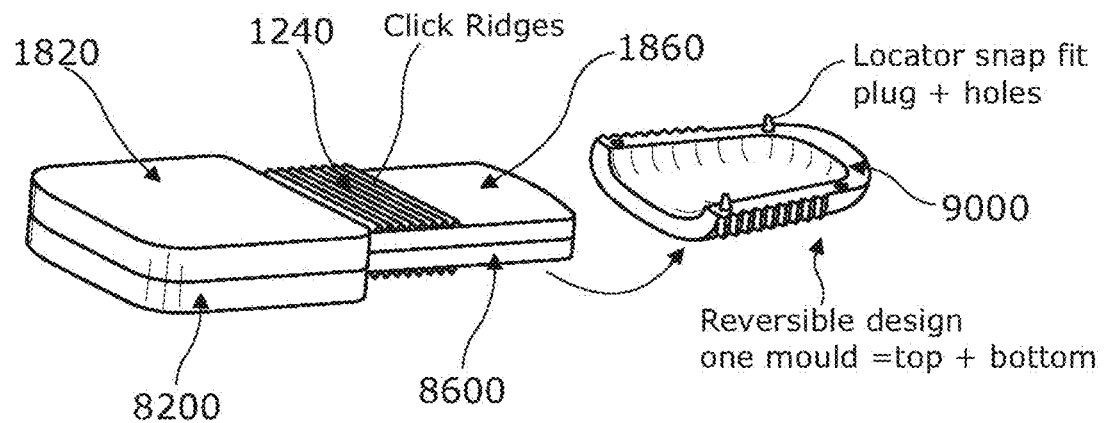
FIG. 30 shows a perspective view of a case formed of a first and second telescoping enclosure section, each having three portions.

FIG. 30 shows a further example of a partly disassembled case according to the present invention. In this case, the second 8600 and fourth 1860 portion of the first and second telescoping enclosure sections, respectively, overlap with the first 8200 and fifth 9000, and the third 182 and sixth (not shown) portion respectively. The portions overlap so that the second 8600 and fourth 1860 portions are received, respectively, within the cavity of the first 8200 and fifth 9000 or the third 1820 and sixth 1900 portions. The case is shown in a semi-deconstructed configuration, wherein the fifth 9000 portion is not fitted into place. The sixth portion is not shown. FIG. 30 further demonstrates protrusions and recesses 1240 for keeping the portions in position relative to their respective overlapping portions.

Figure 31:
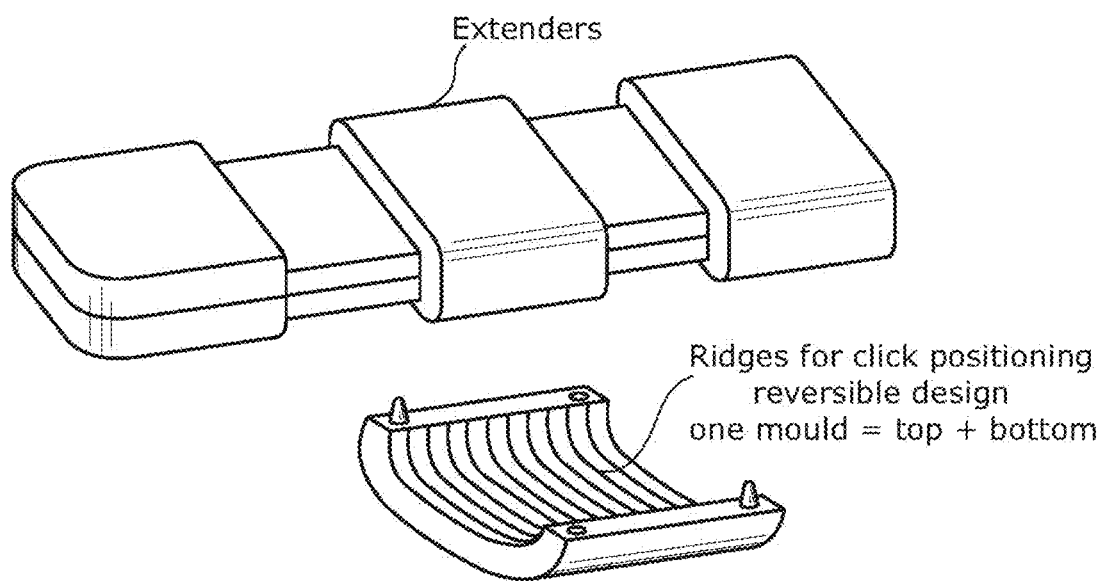
FIG. 31 shows a case formed of a first and second telescoping enclosure section, each having five portions.

FIG. 31 shows a configuration for the first and second telescoping enclosure section including a number of additional portions. The skilled person will appreciate that the modular nature of the case as described allows the case to be further extended by adding additional overlapping, telescoping portions. In this way, the dimensions of the inner cavity are further extendible.

Figure 32:
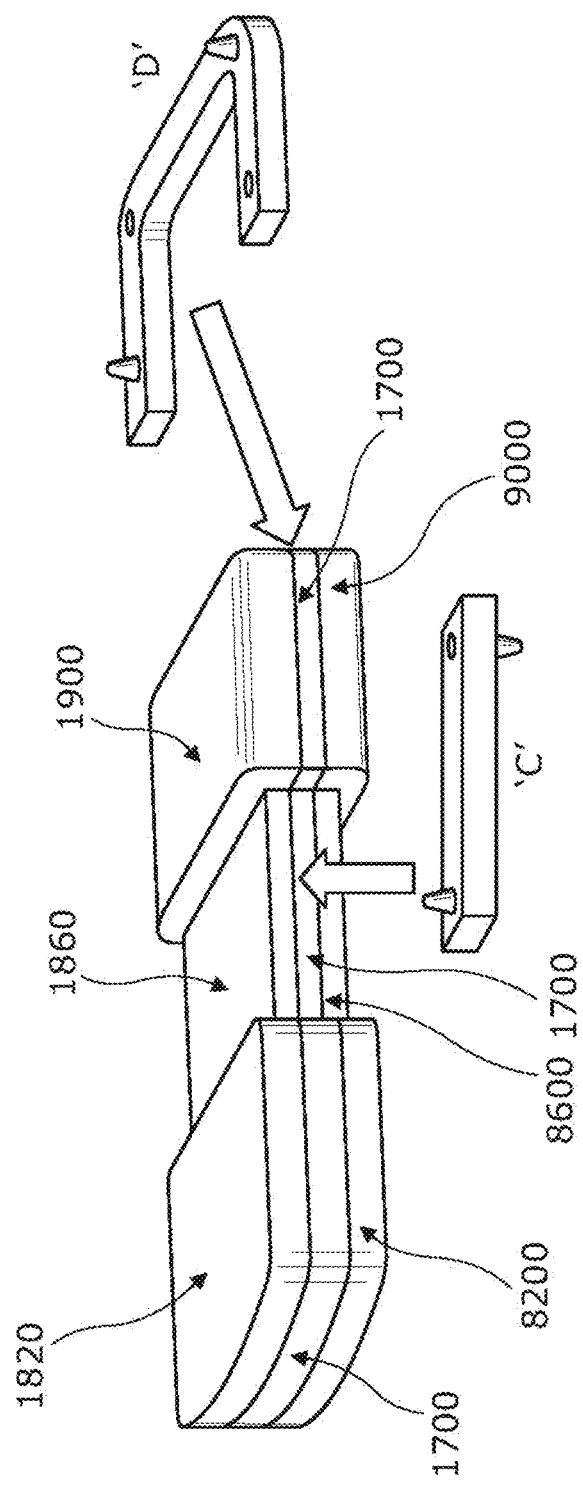
FIG. 32 shows a case formed of a first and second telescoping enclosure section and further including expansion sections.

FIG. 32 shows an example of the described case including expansion sections 1700. In this example, the expansion sections 1700 comprise additional spacers included within the walls of the case between the first 8200 and third 1820 portion of the first and second telescoping enclosure sections, as well as between the second 8600 and fourth 1860 portion of the first and second telescoping enclosure sections. A further spacer is included between the fifth 9000 and sixth 1900 portion of the first and second telescoping enclosure section. In this way, the depth of the cavity within the case can be adjusted, as well as the length (which is adjustable using the telescoping mechanism). The dimensions of the expansion section may be selected to provide an inner cavity having a specific size. For example, the expansion section may be used to provide an inner cavity that tightly fits multiple sports boards, securely and without additional packaging.

The expansion section may be formed of one piece. In the example of FIG. 32, the expansion section is formed of a number of segments. Examples of the expansion sections 1700 are shown removed from the assembled case as segments 'C and 'D'. Segment 'C' is configured to be inserted between the second 8600 and fourth 1860 portion, for example. Segment 'D' is configured to be inserted between the fifth 9000 and sixth 1900 portion, for example.

Figure 33:
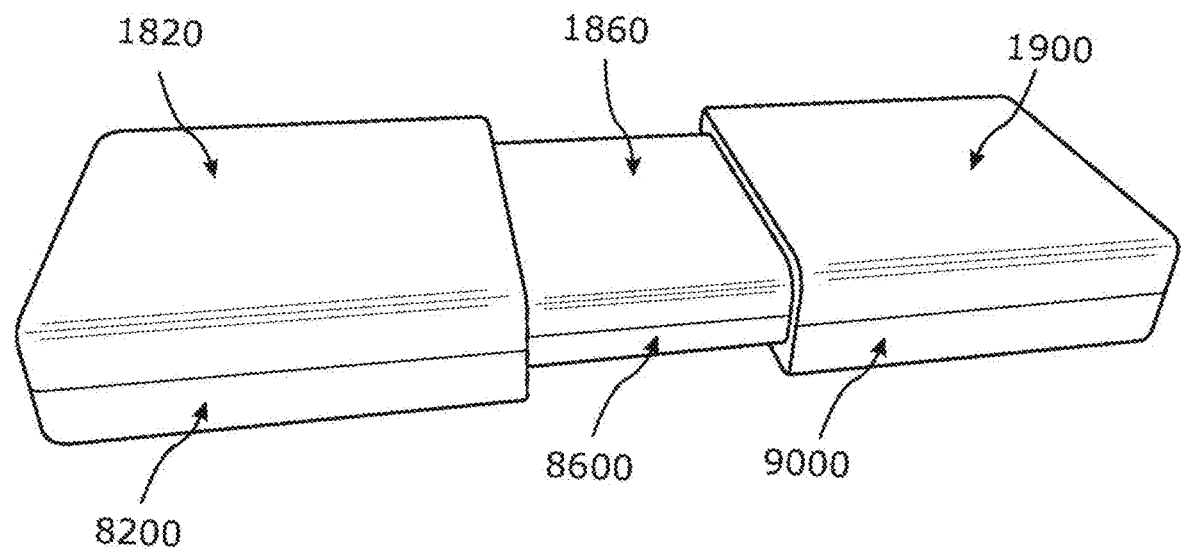
FIG. 33 is a perspective view of a case formed of a first and second telescoping enclosure section, each having three portions.

FIGS. 33 to 39 each represent further examples and aspects of the described case. In particular, FIG. 33 shows the case in an assembled form, wherein the first telescoping enclosure section comprises three parts (a first 8200, second 8600 and fifth 9000 portion) and the second telescoping enclosure section comprises three parts (a third 1820, fourth 1860 and sixth 1900 portion).

Figure 34A:
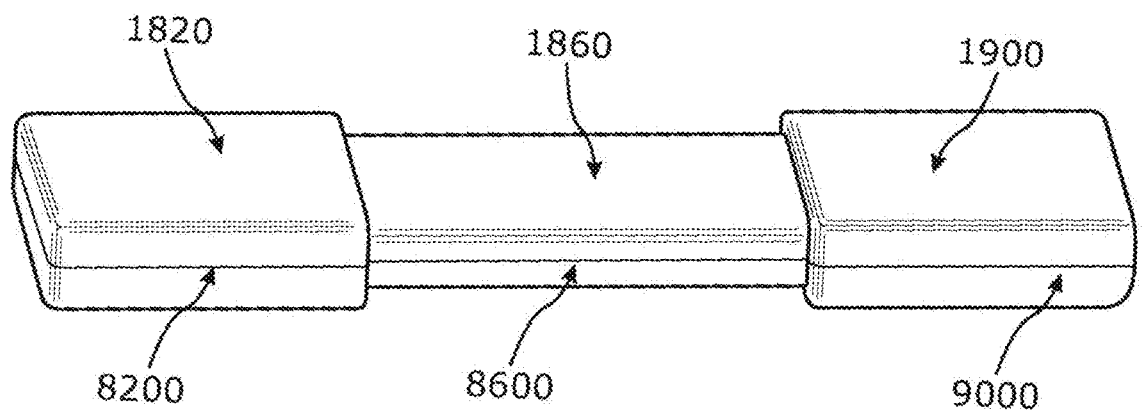
FIGS. 34A and 34B show perspective views of the case of FIG. 33 in different configurations.
Figure 34B:
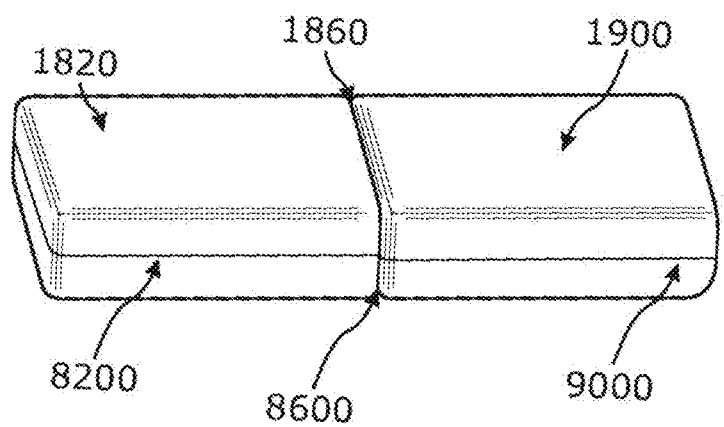

FIGS. 34A and 34B show the case of FIG. 33 having the telescoping enclosure sections in two different configurations. The configuration of FIG. 34A shows the first 8200 and third 1820, and the fifth 9000 and sixth 1900 portions arranged so that the minimum possible overlap to the respective second 8600 and fourth 1860 portions are provided. This provides the maximum length of the case, and the maximum length for the inner cavity. The configuration of FIG. 34B shows the first 8200 and third 1820, and the fifth 9000 and sixth 1900 portions arranged so that the maximum possible overlap to the second 8600 and fourth 1860 portions are provided. This provides the minimum length of the case, and the minimum length for the inner cavity.

Figure 35:
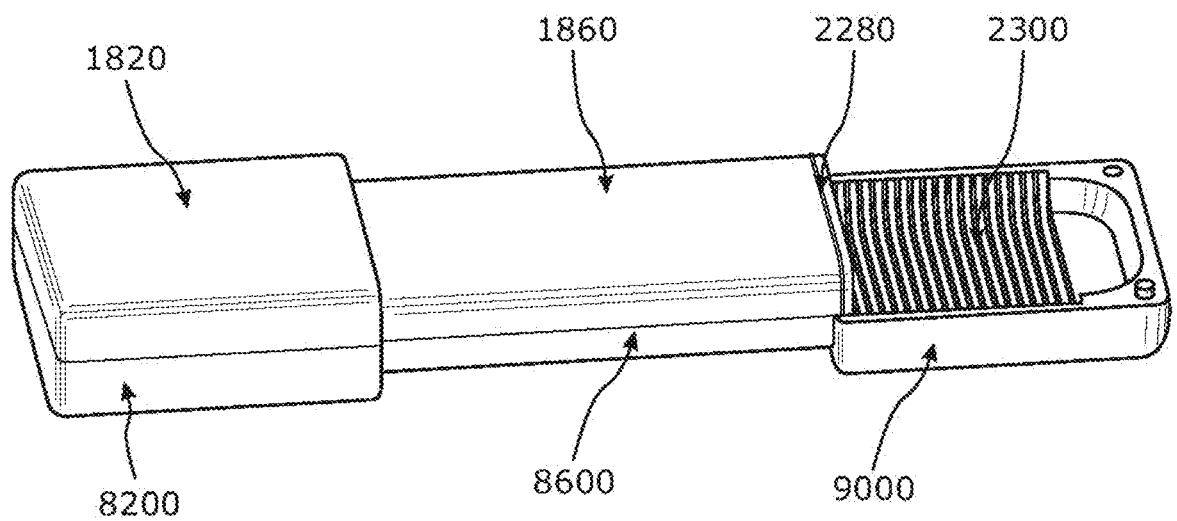
FIG. 35 shows a partially exploded view of the case of FIGS. 33, 34A and 34B.
Figure 36:
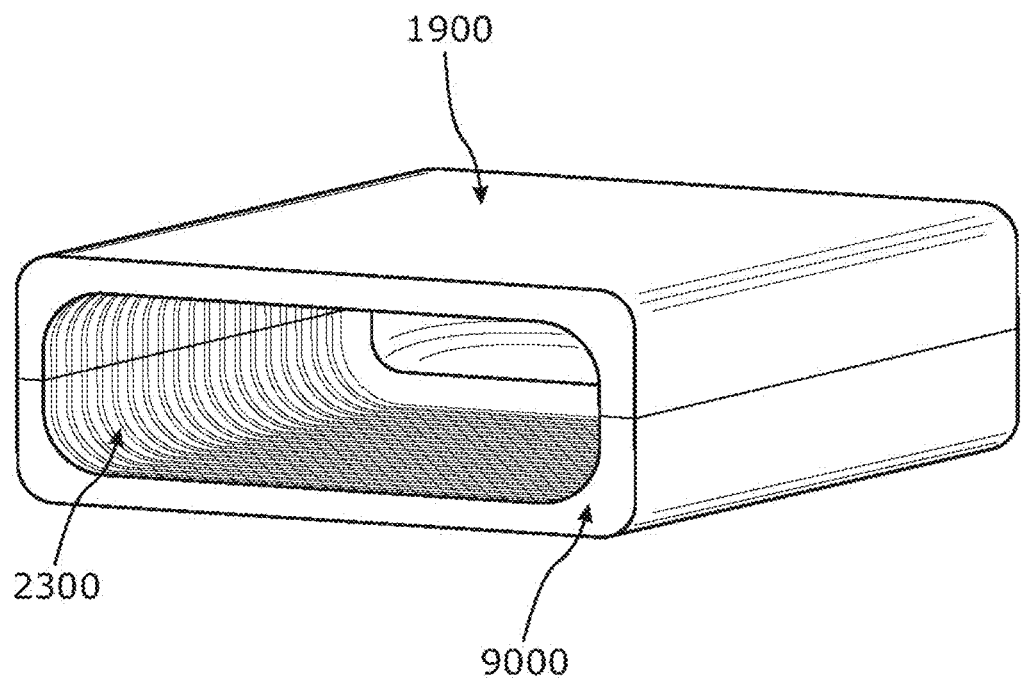
FIG. 36 shows a cross-sectional view of the case of FIGS. 33, 34A, 34B, and 35.

An example of the protrusions 2280 and depressions 2300 holding each portion of the telescoping enclosure sections together can be seen at FIG. 35. It can be seen that ridges 2280 on the second portion 1860 fit into recesses 2300 at the fifth portion 9000. The fifth portion 9000 contains many recesses, so the length of the cavity can be adjusted by sliding the fifth portion 9000 so as to increase its overlap with the second portion 8600. Similar ridges and recesses would be present on each of the portions of the case. The ridges and recesses 2300 within the closed cavity formed by the coupling of the fifth 9000 and sixth 1900 portion, for instance, can also be seen in FIG. 36.

Ideally, the case contains a first and second telescoping enclosure sections that can comprise any number of portions. For instance, FIG. 37 shows each of the first 1600 and second 2200 telescoping enclosure sections having three overlapping portions. This results in the dimensions of the cavity within the case being highly adjustable. In particular, FIG. 37 illustrates a cross-section through the case, wherein the first telescoping enclosure section 1600 comprises a second portion 8600, which overlaps with both a first 8200 and fifth 9000 portion to define an open cavity (as shown in FIG. 38). The second telescoping enclosure section 2200 comprises a fourth portion 1860, arranged to overlap with a third 1820 and sixth 1900 portion so as to provide an open cavity. The first 1600 and second 1600 telescoping enclosure sections are then coupled together in FIG. 38 (so that the inner faces of each telescoping enclosure section face each other), in order to enclose an inner cavity. FIG. 39 shows an exploded, part disassembled view of the portions of the case described in relation to FIG. 37.

Figure 40:
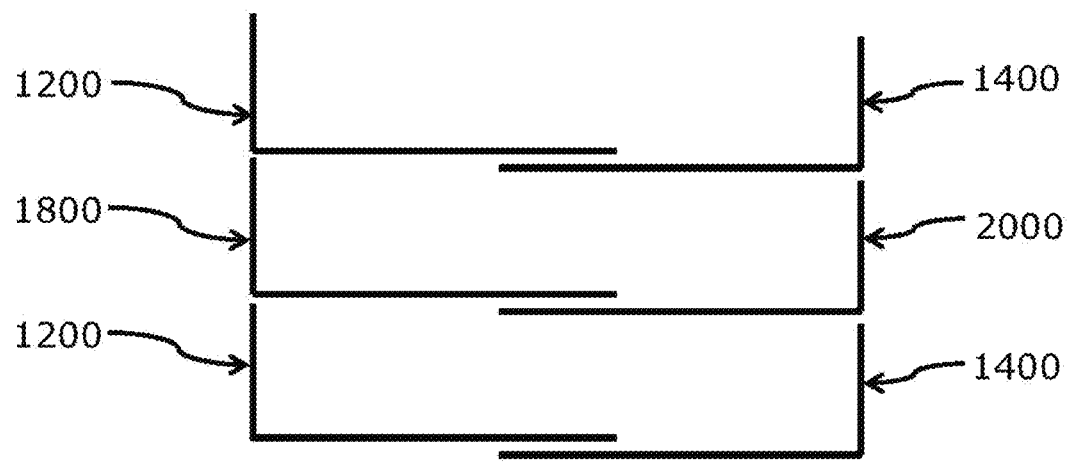
FIG. 40 shows a further example of a case.

FIG. 40 shows a further configuration for a stack of cases. In this configuration, the first 1200, 1400 and second 1800, 2000 telescoping enclosure sections are arranged so that the inner faces of each portion 1200, 1400, 1800, 2000 face in the same direction, and the cavities defined by the first 1200, 1400 and second 1800, 2000 telescoping enclosure section do not couple, but instead stack. This configuration may be beneficial to carry bulk numbers of goods, each individually protected in a telescoping portion. In particular, this configuration reduces the packaging material required per item.

Figure 41:
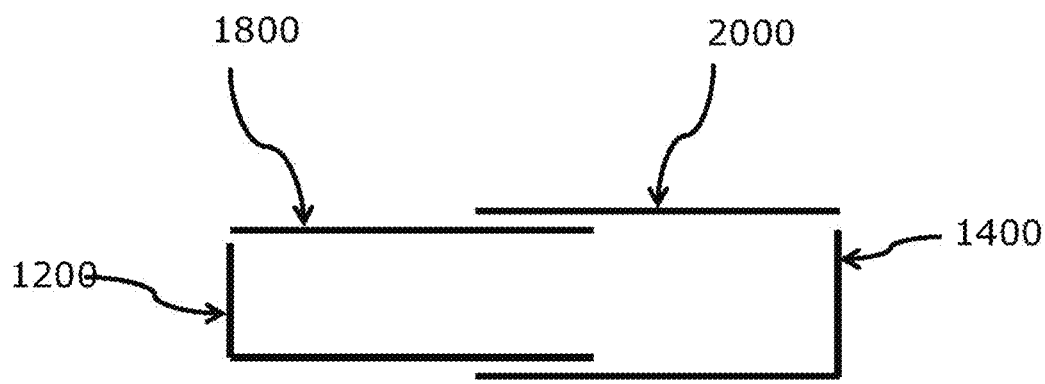
FIG. 41 shows a further example of a case.

FIG. 41 shows a still further configuration for the case. In this case, the second telescoping enclosure section 1800, 2000 does not define an inner cavity, but is instead a relatively flat lid or cover for the cavity defined by the first telescoping enclosure section 1200, 1400. The second telescoping enclosure section 1800, 2000 is arranged to close the open cavity defined within the first telescoping enclosure section 1200, 1400.

Almost any width or length of case could be formed using the described invention. The dimensions of the case can be adjusted, for instance to accommodate different sports equipment. In a particular example, the case could be used to accommodate different kiteboards, snowboards, skis, surfboards, windsurfer boards or stand-up paddle boards. However, any type of goods could be contained within the case.

Any choice of materials could be used to manufacture the case. For instance, the first and second telescoping enclosure sections may be formed of expanded polystyrene (ePS). This could allow the case to be reusable for a small number of uses (for instance, up to five uses). For more prolonged use (such as professional sportsmen traveling often and transporting their own equipment) expanded polypropylene (ePP) could be used. This would allow many re-uses of the case. The portions could be manufactured using appropriate moulding techniques.

In particular examples, each portion of the first and second telescoping enclosure sections will comprise various layers. For example, the inner layer may be soft and resilient, whereas the outermost layer may be more robust and resistant to damage. The first and second telescoping enclosure sections may comprise reinforced composite, such as self-reinforced polypropylene (srPP). For instance, the portions may have layered structures as described above with reference to FIG. 11 or 12.

Figure 42A:
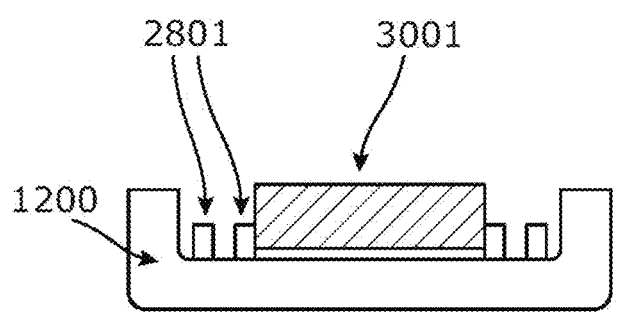
FIGS. 42A and 42B show examples of retainers used within the described case.
Figure 42B:
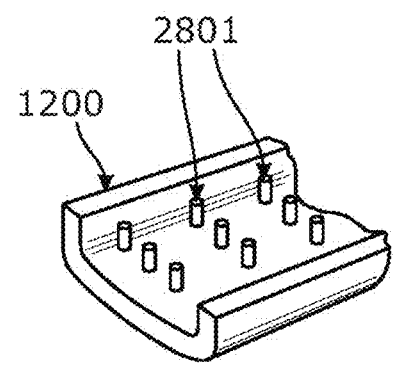

FIGS. 42A and 42B show examples of retainers used within the case. FIG. 42A shows a cross-sectional view of a portion 1200 of a telescoping enclosure portion, with an item 3001 placed within the open cavity. Lugs 2801 are formed at the inner surface of the portion 1200, lining the wall of the inner cavity. The lugs 2801 protrude from the inner surface of the portion. The item 3001 can be arranged to fit between the lugs 2801, so that the lugs 2801 are laterally compressed around the shape of the item. In this way, the lugs 2801 retain the item in place and prevent movement of the item within the case.

Upon first use, the lugs 2801 may be provided across the inner surfaces of each portion of the first and second telescoping enclosure portions. The lugs 2801 may be evenly spaced or spread across the inner surface of the telescoping enclosure portions, or may be arranged in higher concentration at some areas of the surface (for example, toward the edges). FIG. 42B shows a perspective image of a portion 1200 of a telescoping enclosure portion. The inner surface comprises a number of lugs 2801. Particular lugs may be removed (or 'snapped-off') by the user of the box, in order to provide an arrangement of lugs 2801 that most closely fits the shape of a particular item to be stored or carried in the case.

Figure 43A:
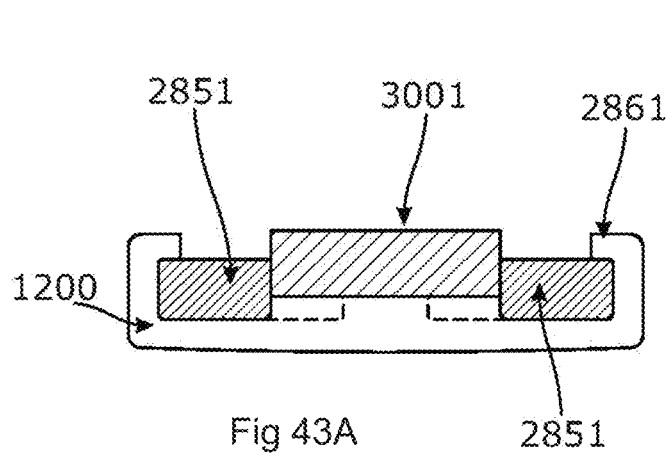
FIGS. 43A and 43B show alternative examples of retainers used within the described case.
Figure 43B:
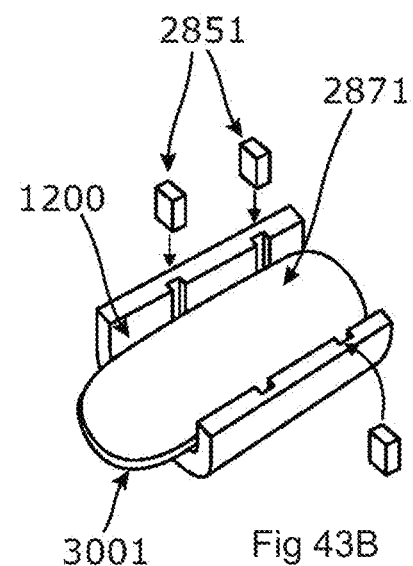

FIGS. 43A and 43B show an alternative example for the retainers. FIG. 43A shows a cross-section through a portion 1200 of a telescoping enclosure section. In this example, wedges 2851 (for instance, comprised of foam) can be placed between the walls of the cavity within the portion 1200 of the telescoping enclosure portion and the item 3001. The wedges 2851 can be held in place around the item 3001 by location of each wedge into a channel formed at the walls of the cavity. The channel may be formed to provide a lip 2861 at the upper rim of the cavity defined by the portion 1200. The wedges 2851 are appropriately sized to fit tightly into any gap between the item and the walls of the cavity, in order to avoid lateral movement of the item within the case.

FIG. 43B shows a perspective view of a portion 1200 of the case having an item 3001 (in this case a sports board) arranged therein. Here, the wedges 2851 can be arranged to fit into vertical channels 2871 formed at the walls of the cavity defined by the portion 1200. The number and size of wedges 2851 can be selected by the user to firmly hold the item within the box into place.

As the skilled person will appreciate, any number of combinations of the described and illustrated features may be used. The case may take any shape or dimension.

Further Description of the Invention with Respect to Examples of FIGS. 18 to 21 & 23 to 24

The invention aims to develop a flexible packaging system. This system is to allow the best protection for goods in transit using foam "clam shells". The shells will be broken down into smaller parts that fit together to form a complete case. Here, a particular embodiment of the invention is discussed with reference to FIGS. 18 to 21 and 23 to 24. This embodiment considers a case or packaging for the particular example of a surfboard, although other goods could be used.

The range of surfboard sizes mean that several clam shell components may be needed to allow for any given length. The claimed solution requires the minimum number of standard components with maximum protection and ease of assembly.

Beneficially, the claimed system also allows several packaged boards to be assembled together into a robust single unit to maximize the protection of each board.

Description

The clam shell system or case may be made up of only two main components (A & B, as shown in FIG. 18), where one can slide within the other to allow for different board lengths. The clam shell principal is that two identical halves push together or clip together, to form a complete enclosure for the board. With this product there will be features on the mating faces of the clam shell halves that hold the halves together by friction (such as a force fit) or it may be that a fastener device could be introduced to hold the halves together. In an example, one of the clam shells (B) can have a break-off closed end so that is can be used as in intermediary part with two sets of the other parts (A), at either end to provide an extended length.

The two clam shells have interlocking features such as bosses and holes, which are arranged so that, as they are assembled together, each male and female feature will mate with the other corresponding half.

If several boards are to be shipped together, stacked on top of each other and because the two components, A and B are different thicknesses (because one slides inside the other), it may be necessary to introduce an additional flat component (such as a spacer) to fill the gaps and keep the "stack" stable.

The current proposed system suggests that, where several packs are shipped together, they are held together with a strap system. Features can be included to locate the straps, to prevent movement and to position the straps in the best areas for support. Also features on the outer surfaces of the packaging could interlock with the other packs to keep the stack stable.

Requirements or preferable features for the system or case are:

1.1.1. One clam shell pair must "slide" within the other to provide a range of lengths
1.1.2. Features such as bosses and holes will be used to lock the parts together
1.1.3. The internal size of the packaging will assume a common board width of 23"
1.1.4. The minimum width of the foam on the sides of the boards will be 25 mm
1.1.5. The minimum width of the foam at the end of the boards will be 50 mm
1.1.6. The minimum width of the foam at the top and bottom will be 20 mm
1.1.7. The cases will be stackable
1.1.8. An additional component may be required to fill gaps between packaging
1.1.9. Materials: Urethane foam, ePP, ePS-TBA
1.1.10. The cases may be recyclable.
1.1.11. The cases could be returnable.
1.1.12. Features may be provided inside the packaging to fill airspace created around the goods within the cavity.
1.1.13. There may be provision for particular board parts such as the fins.
1.1.14. Materials can be used to maintain a stable temperature for goods within the case.

Design/Manufacturing Options

The clam shell or case components can be made from a ridged urethane foam but the finish and density will have a bearing on the overall shape and wall thickness. If the finished packaging is to be very rigid, using dense, heavy foam, to support the vulnerable rails and the thin nose and tail of the surfboard, for example, consideration must be given for additional foam support within the clam shells. This may be a softer or springy foam to allow the board to move slightly within the packaging to absorb shocks and allow for external damage to the foam clam shells. Using a dense heavy foam will increase weight and may increase costs.

If, on the other hand, a less dense and more compliant foam is used, the packaging may offer more impact protection but in general the structure may be somewhat weakened and leave the outward appearance prone to surface damage.

If recycling is an issue and/or if the packaging is to be returnable for re-use, then maintaining a good external shape will be important. The design of any interlocking features, both between clam shell halves and between packaged boards will be driven by the strength of the foam used and by the need to reuse components.

The invention claimed is:

1. A transportable case for containing an item, comprising:
    an inner portion, formed of expanded polypropylene (ePP), defining a cavity for receiving at least part of the item; and
    an outer layer, formed of self-reinforcing polypropylene (srPP), arranged to cover at least part of an outer surface of the inner portion;
    wherein the outer layer formed of srPP comprises 2 to 8 consolidated thermoformed layers of srPP.

2. The transportable case of claim 1, wherein the outer layer formed of srPP comprises 2 to 6 consolidated thermoformed layers of srPP.

3. The transportable case of claim 1, wherein the inner portion is formed by moulding the ePP material.

4. The transportable case of claim 1, wherein the inner portion comprises a plurality of layers of ePP.

5. The transportable case of claim 4, wherein a first layer of the plurality of layers of ePP has a higher density than a second layer of the plurality of layers of ePP.

6. The transportable case of claim 1, wherein at least a part of the inner portion and the outer layer are bonded together by at least one fastening mechanism selected from the group comprising: stitches, rivets, or staples.

7. The transportable case of claim 1, wherein at least a part of the inner portion and the outer layer are bonded together by at least one fastening mechanism selected from the group comprising: an adhesive layer, a thermal bond, a compression fitting.

8. The transportable case of claim 1, further comprising a closable opening to the cavity.

9. The transportable case of claim 1, wherein the case is a soft case, a cover, a bag or a box.

10. The transportable case of claim 1, wherein the item is sports equipment, a musical instrument or photography equipment.

11. A method for manufacturing a transportable case for containing an item, comprising:
   forming an inner portion of expanded polypropylene (ePP), defining a cavity for receiving the item; and
   forming an outer layer of self-reinforcing polypropylene (srPP), arranged to cover at least part of an outer surface of the inner portion,
   wherein forming the outer layer comprises forming the outer layer from 2 to 8 consolidated thermoformed layers of srPP.

12. The method of claim 11, wherein forming the outer layer comprises forming the outer layer from 2 to 6 consolidated thermoformed layers of srPP.

13. The method of claim 11, further comprising, bonding together at least a part of the inner portion and the outer layer.

14. The method of claim 13, wherein the step of bonding comprises at least one of: stitching, riveting, sewing, stapling.

15. The method of claim 13, wherein the step of bonding comprises at least one of: thermally boding, applying an adhesive layer, or arranging a compression fitting.

16. The method of claim 11, wherein forming the inner portion comprises further comprises shaping the inner portion to form a cavity substantially conforming to the shape of at least part of the item.

17. The method of claim 11, wherein shaping the inner portion comprises forming the inner portion in a mould.

18. The method of claim 11, wherein the inner portion comprises a plurality of layers of ePP.

19. The method of claim 18, wherein a first layer of the plurality of layers of ePP has a higher density than a second layer of the plurality of layers of ePP.

20. The method of claim 11, further comprising forming a closable opening to the cavity.

* * * * *